US008603652B2

(12) United States Patent
Ishiguro et al.

(10) Patent No.: US 8,603,652 B2
(45) Date of Patent: Dec. 10, 2013

(54) MAGNETIC RECORDING MEDIUM

(75) Inventors: Tadashi Ishiguro, Minami-ashigara (JP); Katsumi Araki, Minami-ashigara (JP); Kenichi Nakamura, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 312 days.

(21) Appl. No.: 13/043,692

(22) Filed: Mar. 9, 2011

(65) Prior Publication Data

US 2011/0274947 A1 Nov. 10, 2011

(30) Foreign Application Priority Data

Mar. 10, 2010 (JP) ................................. 2010-052518

(51) Int. Cl.
*G11B 5/716* (2006.01)

(52) U.S. Cl.
USPC ...................................................... 428/840.5

(58) Field of Classification Search
None
See application file for complete search history.

(56) References Cited

U.S. PATENT DOCUMENTS

| 4,582,757 A | 4/1986 | Miyoshi et al. |
| 2009/0258254 A1* | 10/2009 | Omura et al. ................. 428/840 |

FOREIGN PATENT DOCUMENTS

| JP | 04-081256 B2 | 2/1985 |
| JP | 02-007223 A | 1/1990 |
| JP | 02-141925 A | 5/1990 |
| JP | 09-115134 A | 5/1997 |
| JP | 09-270115 A | 10/1997 |
| JP | 2005-222644 A | 8/2005 |

* cited by examiner

*Primary Examiner* — Holly Rickman
*Assistant Examiner* — Linda Chau
(74) *Attorney, Agent, or Firm* — Sughrue Mion, PLLC

(57) ABSTRACT

An aspect of the present invention relates to a magnetic recording medium comprising on one surface of a nonmagnetic support a nonmagnetic layer containing a nonmagnetic powder and a binder and a magnetic layer containing a ferromagnetic powder and a binder in this order, as well as comprising a backcoat layer on the other surface of the nonmagnetic support. The nonmagnetic layer is a radiation-cured layer formed by curing with radiation a given radiation-curable composition, and the backcoat layer comprises filler particles with an average primary particle diameter, D50, ranging from 0.05 to 1.0 μm, the filler particles being selected from the group consisting of organic polymer particles and inorganic colloidal particles.

12 Claims, 2 Drawing Sheets

MAGNETIC RECORDING MEDIUM

CROSS-REFERENCE TO RELATED APPLICATIONS

This application claims the benefit of priority under 35 USC 119 to Japanese Patent Application No. 2010-052518, filed on Mar. 10, 2010, which is expressly incorporated herein by reference in its entirety.

BACKGROUND OF THE INVENTION

1. Field of the Invention

The present invention relates to a magnetic recording medium, and more particularly, to a magnetic recording medium affording both good electromagnetic characteristics and high reliability.

2. Discussion of the Background

As minicomputers, personal computers, and office computers such as work stations have become widespread in recent years, considerable research has been conducted in the field of magnetic recording into magnetic tapes (known as "data backup tapes") for recording computer data as external memory media. The magnetic tapes that are employed for such applications are required to be of high reliability and capable of running stably for extended periods.

As the information that is being recorded has become more diverse and increased in quantity in recent years, data backup tapes with high recording capacities have been commercialized. Achieving a high recording capacity in a tape requires reducing the spacing between the magnetic layer and the magnetic head. For example, when large protrusions and indentations are present on the surface of the magnetic layer, a drop in output occurs due to spacing loss. This compromises electromagnetic characteristics by causing dropout, increasing the error rate, lowering the S/N ratio, and the like. Accordingly, it is necessary for the magnetic layer surface of a high-capacity data backup tape to be extremely smooth to achieve good electromagnetic characteristics.

In magnetic tapes, to lower the coefficient of friction, a backcoat layer having surface protrusions is widely provided on the opposite surface of the nonmagnetic support from the surface on which the magnetic layer is provided. Since magnetic tapes are normally wound up into rolls with cores, cassette hubs, or the like, the magnetic layer and the backcoat layer come into contact during the manufacturing process, during aging (thermoprocessing or the like), and during storage. This results in a phenomenon (known as "reverse transfer") whereby the shape of the irregularities on the backcoat layer surface is transferred to the magnetic layer surface. Reverse transfer reduces the surface smoothness of the magnetic layer.

Accordingly, it would be conceivable to smoothen the surface of the backcoat layer to reduce reverse transfer. However, when the surface smoothness of the backcoat layer is increased, it becomes difficult to ensure running stability due to a rise in the coefficient of friction during manufacturing steps involving contact with the surface of the backcoat layer, the coefficient of friction with the drive system, and the like; failed winding due to accompanying air in the process of winding the magnetic tape; and the like.

Under these circumstances, by way of example, Reference 1 (Japanese Unexamined Patent Publication (KOKAI) Heisei No. 2-7223), Reference 2 (Japanese Unexamined Patent Publication (KOKAI) Heisei No. 2-141925), Reference 3 (Japanese Unexamined Patent Publication (KOKAI) Heisei No. 9-270115), Reference 4 (Japanese Unexamined Patent Publication (KOKAI) Heisei No. 9-115134), Reference 5 (Japanese Examined Patent Publication (KOKOKU) Heisei No. 4-81256), and Reference 6 (Japanese Unexamined Patent Publication (KOKAI) No. 2005-222644), which are expressly incorporated herein by reference in their entirety, propose the incorporation of two or more types of carbon black of differing average particle diameters into the backcoat layer as a countermeasure to reverse transfer.

However, even with the techniques described in References 1 to 6, it is difficult to obtain data backup tapes that afford good electromagnetic characteristics and can be employed for extended periods with high reliability.

SUMMARY OF THE INVENTION

An aspect of the present invention provides for a magnetic recording medium that affords both good electromagnetic characteristics and high reliability.

The present inventors conducted extensive research into achieving the magnetic recording medium. As a result, they discovered that by combining a backcoat layer comprising filler particles with an average primary particle diameter (D50) of 0.05 to 1.0 μm, selected from the group consisting of organic polymer particles and inorganic colloidal particles, with a nonmagnetic layer in the form of a radiation-cured layer formed of the radiation-curable vinyl chloride copolymer containing the structural unit denoted by formula (1) described further below and the radiation-curable polyurethane resin obtained from starting materials containing a sulfonic acid (salt) group-containing polyol compound denoted by formula (2) described further below, it was possible to obtain a magnetic recording medium with little reverse transfer, good running stability, and little reduction in reproduction output following storage that had desirable characteristics as a data backup tape. The reasons for which the above magnetic recording medium can be achieved by such a combination will be set forth below.

(A) Backcoat Layer

Above-cited References 1 to 6 specify the particle diameter of the carbon black that is added to the backcoat layer. However, carbon black has a strong tendency to aggregate. Thus, in reality, an aggregate comprised of multiple aggregated particles is present in the backcoat layer, with almost no carbon black being present in the state of the specified particle diameter. As a result, even when microparticulate carbon black is employed, coarse protrusions of this aggregate are present in the backcoat layer, causing reverse transfer.

Accordingly, the present inventors conducted extensive research into filler particles that were capable of maintaining running stability without causing reverse transfer. As a result, they discovered that since organic polymer particles and inorganic colloidal particles had good dispersion stability, they could remain as primary particles in the backcoat layer without forming aggregates. The present inventors then conducted further extensive research based on this knowledge, discovering that it was possible to inhibit the drop in the surface smoothness of the magnetic layer due to reverse transfer by employing organic polymer particles or inorganic colloidal particles of prescribed average particle diameter as the filler particles in the backcoat layer.

(B) Nonmagnetic Layer as a Radiation-Cured Layer

As set forth above, data backup tapes are required to afford reliability in addition to enhanced surface smoothness of the magnetic layer. Accordingly, it is difficult to achieve a magnetic recording medium that is suitable as a data backup tape by means of just reverse transfer countermeasure (A) above.

Accordingly, the present inventors conducted extensive research into discovering a means of enhancing the reliability of the magnetic recording medium. They surmised that preventing seepage of nonmagnetic layer components might be related to enhancing the running stability of a magnetic recording medium and preventing fluctuation in reproduction output. This point will be further elaborated.

For example, when a lubricant component that is contained in the nonmagnetic layer seeps out of the nonmagnetic layer onto the magnetic layer, it precipitates onto the magnetic layer surface during thermoprocessing conducted to cure the magnetic layer and during storage, generating foreign matter on the surface of the magnetic layer. This foreign matter hinders stable running When extended storage is conducted with a head in contact with the medium, precipitation of the lubricant component causes the tape to stick to the medium. This causes material to adhere to the head, resulting in increased reproduction output fluctuation before and after storage.

By contrast, employing a nonmagnetic layer in the form of a radiation-cured layer was thought to have the effect of preventing the seepage of nonmagnetic layer components. In a particulate magnetic recording medium with a multilayered structure, interlayer mixing due to a portion of the nonmagnetic layer dissolving in the solvent contained in the magnetic layer coating liquid, poor curability of the nonmagnetic layer, and the like cause seepage of nonmagnetic layer components. The use of a radiation-cured layer as the nonmagnetic layer makes it possible to prevent or reduce dissolution in solvent contained in the magnetic layer coating liquid because irradiation with radiation causes the radiation-curable components in the nonmagnetic layer to polymerize and crosslink, attaining a high molecular weight.

(C) Combination of Specific Radiation-Curable Vinyl Chloride Copolymer and Radiation-Curable Polyurethane Resin Employing a radiation-cured layer as the nonmagnetic layer as set forth above was thought to have the effect of preventing seepage of nonmagnetic layer components. However, investigation by the present inventors did not yield the anticipated effect by simply employing a radiation-cured layer. Accordingly, the present inventors conducted further trial and error, resulting in the discovery that combination of the specific radiation-curable vinyl chloride copolymer and radiation-curable polyurethane resin set forth below yielded a highly reliable magnetic recording medium.

First, the reason for using specific radiation-curable vinyl chloride copolymer is as follows. Since the specific vinyl chloride copolymer can exhibit extremely good curability, it was presumed to contribute to the formation of a nonmagnetic layer with little seepage of nonmagnetic layer components. In reality, as indicated in Examples set forth further below, compared to the radiation-curable vinyl chloride copolymer described in Japanese Unexamined Patent Publication (KOKAI) No. 2004-352804, which is expressly incorporated herein by reference in its entirety, for example, the specific radiation-curable vinyl chloride copolymer has been confirmed to exhibit a higher degree of curability. Second, the reason for using a specific radiation-curable polyurethane resin as the accompanying polyurethane resin is to ensure running stability and prevent fluctuation in reproduction output. This is thought to occur because when an accompanying polyurethane resin with poor adsorption to nonmagnetic powder is employed, the released polyurethane resin forms a precipitate on the surface of the medium. The above polyurethane resin is employed because it exhibits good adsorption to nonmagnetic powders. The reason for combining the vinyl chloride copolymer with the polyurethane resin is that the vinyl chloride copolymer alone cannot readily impart the flexibility required of a magnetic recording medium.

The present invention was devised based on the above knowledge.

An aspect of the present invention relates to a magnetic recording medium comprising on one surface of a nonmagnetic support a nonmagnetic layer containing a nonmagnetic powder and a binder and a magnetic layer containing a ferromagnetic powder and a binder in this order, as well as comprising a backcoat layer on the other surface of the nonmagnetic support, wherein the nonmagnetic layer is a radiation-cured layer formed by curing with radiation a radiation-curable composition, the radiation-curable composition comprises a radiation-curable vinyl chloride copolymer containing a structural unit denoted by formula (1) and a radiation-curable polyurethane resin obtained from starting materials containing a sulfonic acid group containing- or sulfonate group-containing polyol compound denoted by formula (2):

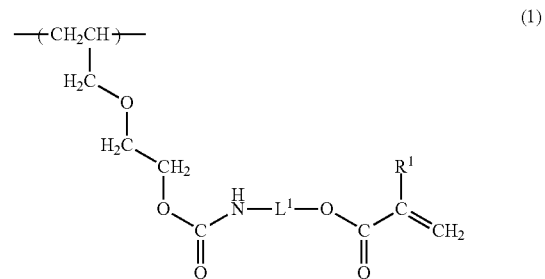

wherein, in formula (1), $R^1$ denotes a hydrogen atom or a methyl group, and $L^1$ denotes a divalent linking group denoted by formula (2a), formula (3), or formula (4):

wherein, in formula (4), $R^{41}$ denotes a hydrogen atom or a methyl group:

wherein, in formula (2), X denotes a divalent linking group; each of $R^{101}$ and $R^{102}$ independently denotes an alkyl group containing at least one hydroxyl group and equal to or more than two carbon atoms or an aralkyl group containing at least one hydroxyl group and equal to or more than eight carbon atoms; and $M^1$ denotes a hydrogen atom or a cation: and the backcoat layer comprises filler particles with an average primary particle diameter, D50, ranging from 0.05 to 1.0 μm, the filler particles being selected from the group consisting of organic polymer particles and inorganic colloidal particles.

The filler particles may be present in the backcoat later as substantially primary particles.

The particle size distribution value, D25/D75, of the filler particles may be equal to or lower than 2.0.

The inorganic colloidal particles may be silica colloidal particles.

The organic polymer particles may be those comprising as a structural component at least one selected from the group consisting of acrylic, styrene, divinylbenzene, benzoguanamine, melamine, formaldehyde, butadiene, acrylonitrile, and chloroprene.

The organic polymer particles may be those obtained by conducting emulsification polymerization while inducing adsorption of a crosslinkable or polymerizable monomer to seed particles in an aqueous dispersion containing seed particles.

The radiation-curable vinyl chloride copolymer may further comprise a structural unit denoted by formula (5):

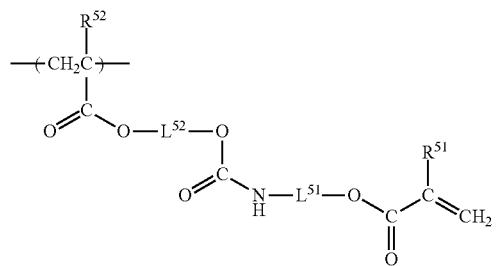

(5)

wherein, in formula (5), each of $R^{51}$ and $R^{52}$ independently denotes a hydrogen atom or a methyl group, $L^{51}$ denotes the divalent linking group denoted by the above formula (2a), formula (3), or formula (4), and $L^{52}$ denotes a divalent linking group.

The radiation-curable vinyl chloride copolymer may further comprise a cyclic ether structure.

The radiation-curable vinyl chloride copolymer may further comprise a polar group selected from the group consisting of a sulfonic acid group, a sulfonate group, a sulfuric acid group, and a sulfate group.

The backcoat layer may have a thickness ranging from 0.2 to 0.6 μm.

The nonmagnetic layer may further comprise a lubricant component.

The lubricant component may be selected from the group consisting of fatty acids and their derivatives.

The present invention can provide a magnetic recording medium that has a magnetic layer of good surface smoothness, permits stable running, prevents reproduction output fluctuation, has a high degree of reliability, and is suitable as a data backup tape.

Other exemplary embodiments and advantages of the present invention may be ascertained by reviewing the present disclosure and the accompanying drawing.

BRIEF DESCRIPTION OF THE DRAWINGS

The present invention will be described in the following text by the exemplary, non-limiting embodiments shown in the figure, wherein.

DETAILED DESCRIPTION OF THE EMBODIMENTS

Figure 1:
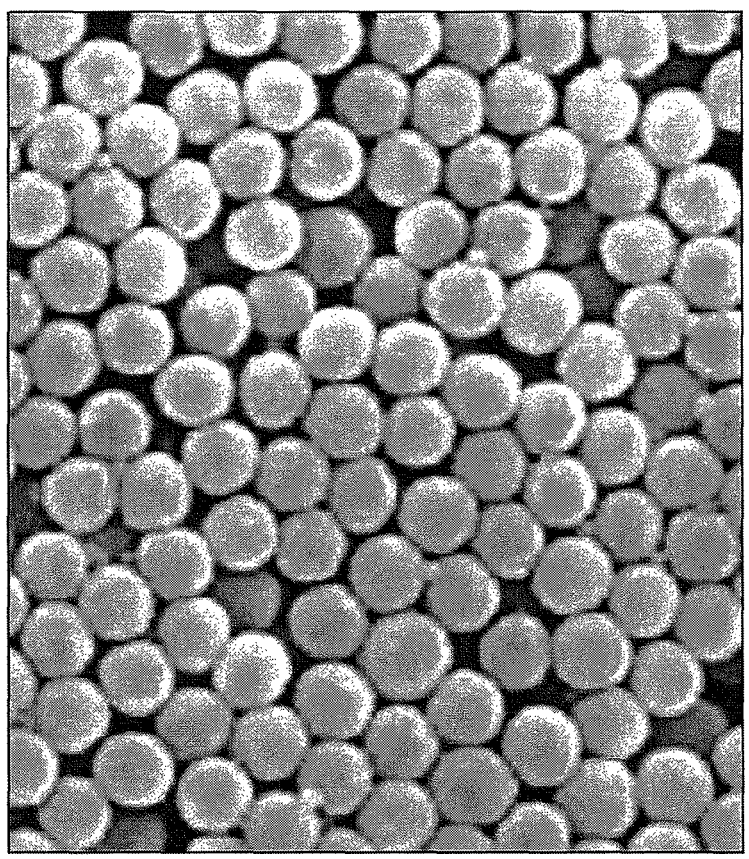
FIG. 1 is a scanning electron microscope photograph of the organic polymer particles (polymer particles Y-1) employed in Examples.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

The magnetic recording medium of the present invention comprises on one surface of a nonmagnetic support a nonmagnetic layer containing a nonmagnetic powder and a binder and a magnetic layer containing a ferromagnetic powder and a binder in this order, as well as comprising a backcoat layer on the other surface of the nonmagnetic support. The magnetic recording medium of the present invention comprises, as the nonmagnetic layer, a radiation-cured layer formed by curing with radiation a radiation-curable composition comprising a radiation-curable vinyl chloride copolymer containing the structural unit denoted by formula (1) described further below and a radiation-curable polyurethane resin obtained from starting materials containing a sulfonic acid (salt) group containing polyol compound denoted by formula (2) described further below, and the backcoat layer comprising filler particles with an average primary particle diameter, D50, ranging from 0.05 to 1.0 μm, selected from the group consisting of organic polymer particles and inorganic colloidal particles. Thus, as set forth above, it is possible to prevent reverse transfer, ensure running stability, and prevent reproduction output fluctuation.

The magnetic recording medium of the present invention will be described in greater detail below.

Radiation-Curable Vinyl Chloride Copolymer

In the magnetic recording medium of the present invention, the radiation-curable vinyl chloride copolymer that forms the nonmagnetic layer comprises the structural unit denoted by formula (1) below:

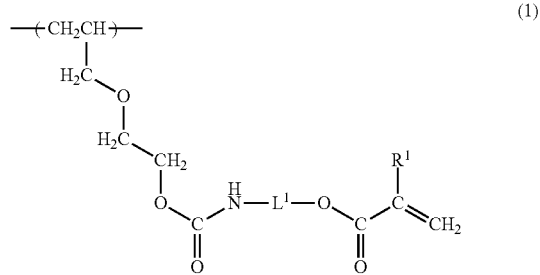

In formula (1), $R^1$ denotes a hydrogen atom or a methyl group, and $L^1$ denotes a divalent linking group denoted by formula (2a), formula (3), or formula (4):

 (2a)

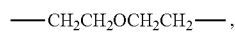 (3)

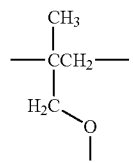 (4)

In formula (4), $R^{41}$ denotes a hydrogen atom or a methyl group.

The radiation-curable vinyl chloride copolymer having the structural unit denoted by formula (1) can exhibit good curability when exposed to radiation, permitting the prevention of seepage of nonmagnetic layer components. The high curability is attributed to the fact that the radiation-curable functional groups incorporated are highly reactive and the structure has adequate flexibility. That is, the present inventors presume that in the structure denoted by formula (1), the fact that the (meth)acryloyloxy group enclosed in the round frame was a particularly highly reactive group among various radiation-curable functional groups, and the fact that the portion linking it to the main chain enclosed in the square frame had adequate flexibility to allow the formation of a crosslinked structure are why the radiation-curable vinyl chloride copolymer could exhibit good curability when exposed to radiation. In contrast, it is thought that, even though resins in which highly reactive radiation-curable functional groups have been incorporated have structures that are rigid, the radiation-curable functional groups are unable to adequately approach each other, making it difficult for a crosslinked structure to form.

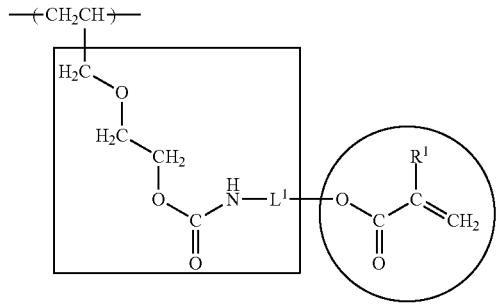

(Details of formula (1) will be described further below.)

The above radiation-curable vinyl chloride polymer (also referred to as the "copolymer A", hereinafter) will be described in detail below.

Copolymer A is a vinyl chloride copolymer comprising a radiation-curable functional group that can undergo a curing (crosslinking) reaction when exposed to radiation. At least one of the radiation-curable functional groups is a (meth)acryloyloxy group comprised in the structural unit denoted by formula (1). As stated above, it is presumed that in Copolymer A, a highly reactive (meth)acryloyloxy group is bonded to the main chain through a linking portion of suitable flexibility, thereby exhibiting high curability when exposed to radiation.

In the present invention, the term "(meth)acryloyloxy group" is to be construed as including both methacryloyloxy and acryloyloxy groups, and the term "(meth)acrylate is to be construed as including both methacrylate and acrylate.

Copolymer A can also comprise a group other than a (meth)acryloyloxy group as a radiation-curable functional group. Examples of such radiation-curable functional groups that are desirable in terms of reactivity are radical polymerizable carbon-carbon double-bond groups, with acrylic double-bond groups being preferred. In this context, the term "acrylic double-bond groups" refers to residues of acrylic acids, acrylic acid esters, amide acrylates, methacrylic acids, methacrylic acid esters, and amide methacrylates.

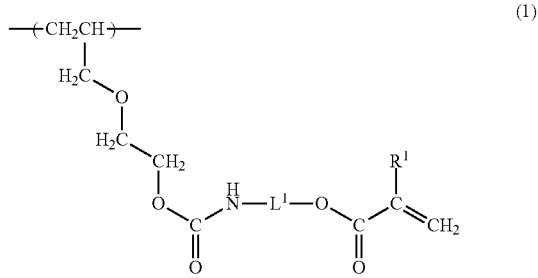

Formula (1) will be described in greater detail below.

In formula (1), $R^1$ denotes a hydrogen atom or a methyl group. A high degree of curability can be achieved regardless of whether $R^1$ denotes a hydrogen atom or a methyl group. From the perspective of availability, $R^1$ desirably denotes a methyl group.

In formula (1), $L^1$ denotes a divalent linking group denoted by formula (2a), formula (3), or formula (4), below. In formula (4), $R^{41}$ denotes a hydrogen atom or a methyl group. From the perspective of availability, $R^{41}$ desirably denotes a hydrogen atom. Although varying with the system being employed, from the perspective of curability, the divalent linking groups denoted by formula (3) and formula (4) are generally desirable. From the perspective of cost, the divalent linking groups denoted by formulas (2a) and (3) are desirable.

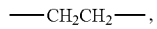  (2a)

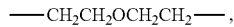  (3)

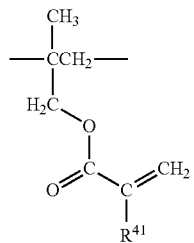  (4)

From the perspective of further increasing curability during exposure to radiation, the structural unit denoted by formula (1) desirably constitutes equal to or more than one mole percent of all polymerizing units (100 mole percent) in Copolymer A. The upper limit of the content of the structural unit denoted by formula (1) in Copolymer A is not specifically limited. However, by way of example, an adequate effect can be achieved at about equal to or less than 5 mole percent. In Copolymer A, the structural unit denoted by formula (1) desirably constitutes equal to or more than 1 mole percent and equal to or less than 50 mole percent of all polymerizing units (100 percent). Incorporating the structural unit denoted by formula (1) within the above range in Copolymer A makes it possible to achieve even higher curability.

Since Copolymer A is a vinyl chloride copolymer, a vinyl chloride-derived structural unit (the following structural unit) is contained along with the structural unit denoted by formula (1).

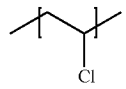

The content of the above structural unit derived from vinyl chloride in Copolymer A is not specifically limited. However, it desirably constitutes about 50 to 99 mole percent of all polymerizing units (100 mole percent).

Copolymer A can contain the structural unit denoted by formula (5) below. The incorporation of the structural unit denoted by formula (5) below can effectively enhance curability. Since the synthesis reaction of a copolymer containing the structural unit denoted by formula (5) is uncomplicated, this structural unit is desirable in terms of synthesis suitability.

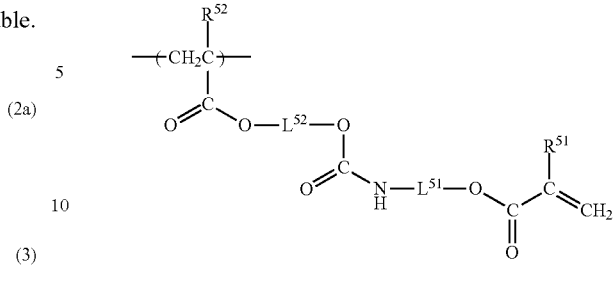  (5)

Formula (5) will be described below.

In formula (5), each of $R^{51}$ and $R^{52}$ independently denotes a hydrogen atom or a methyl group. High curability can be achieved regardless of whether $R^{51}$ and $R^{52}$ denote hydrogen atoms or methyl groups. From the perspective of availability, $R^{51}$ and $R^{52}$ desirably denote methyl groups. In formula (5), $L^{51}$ denotes the divalent linking group denoted by formula (2a), formula (3), or formula (4) described above.

In formula (5), $L^{52}$ denotes a divalent linking group. The divalent linking group denoted by $L^{52}$ is desirably an alkyleneoxy group or alkylene group with 1 to 25 carbon atoms, preferably an alkyleneoxy group or alkylene group with 1 to 20 carbon atoms, and more preferably, a methylene group, ethylene group, propylene group, butylene group, ethyleneoxy group, diethyleneoxy group, or triethyleneoxy group. These groups may comprise substituents. In such cases, the number of carbon atoms refers to the number of carbon atoms of the moiety excluding substituents.

Desirable substituents that can be incorporated into $L^{52}$ are alkyl groups having 1 to 20 carbon atoms. Among these, alkyl groups with 1 to 15 carbon atoms are desirable, alkyl groups with 1 to 10 carbon atoms are preferred, and alkyl groups with 1 to 7 carbon atoms are of greater preference. Taking into account starting materials, suitability to synthesis, and the like, specific examples of optimal substituents are methyl groups, ethyl groups, branched or linear propyl groups, branched or linear butyl groups, branched or linear pentyl groups, and branched or linear hexyl groups.

In Copolymer A, it is possible to incorporate, for example, the structural unit denoted by formula (5) in a proportion of equal to or more than 1 mole percent and equal to or less than 45 mole percent of all polymerizing units (100 mole percent). Incorporation of the structural unit denoted by formula (5) within the above-stated range in Copolymer A can further enhance curability.

Copolymer A can comprise a cyclic ether structure. The incorporation of a cyclic ether structure can effectively enhance stability during copolymer synthesis and curability under a variety of conditions. A cyclic ether structure is also effective as a functional group for introducing a polar group into the copolymer. The cyclic ether structure is desirably an oxirane ring, oxetane ring, tetrahydrofuran ring, tetrahydropyran ring, or crown ether; preferably an oxirane ring, oxetane ring, tetrahydrofuran ring, or tetrahydropyran ring; and more preferably, an oxirane ring, oxetane ring, or tetrahydrofuran ring. The cyclic ether structure can be contained, for example, on a side chain portion of the copolymer. An example of a desirable embodiment is the incorporation of a cyclic ether structure into the structural unit denoted by formula (8) below.

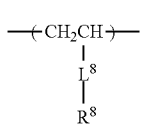
(8)

In formula (8), for example, $L^8$ denotes a divalent linking group, such as an oxyalkylene group in the form of —$CH_2OCH_2$—. $R^8$ denotes a cyclic ether structure, the details of which are as set forth above.

From the perspective of enhancing curability, Copolymer A desirably comprises from 1 to 100 cyclic ether structures per molecule. The content of the structural unit denoted by formula (8) above is, for example, desirably equal to or more than 1 mole percent and equal to or less than 45 mole percent of all polymerizing units (100 mole percent).

Polar groups are widely incorporated into magnetic recording medium binders to increase the dispersion of magnetic powder, nonmagnetic powder, and the like. Accordingly, from the perspective of suitability as a magnetic recording medium binder, the presence of a polar group in Copolymer A is desirable to enhance dispersibility. Examples of the polar group are hydroxyalkyl groups, carboxylic acid (salt) groups, sulfonic acid (salt) groups, sulfuric acid (salt) groups, and phosphoric acid (salt) groups. In the present invention, the term "sulfonic acid (salt) group" refers to substituents in which a in formula (A) below denotes 0, including the sulfonic acid group (—$SO_3H$) and sulfonate groups such as —$SO_3Na$, —$SO_3Li$, and —$SO_3K$. Further, the term "sulfuric acid (salt) group" refers to substituents in which a in formula (A) denotes 1, including the sulfuric acid group and sulfate groups in the same manner as above. The same applies to carboxylic acid (salt) groups, phosphoric acid (salt) groups, and the like.

(A)

In formula (A), M denotes a hydrogen atom or a cation; the symbol "*" denotes a bond position; and a denotes 0 or 1. When a=0 as set forth above, the substituent denoted by formula (A) is a sulfonic acid (salt) group. When a=1, the substituent denoted by formula (A) is a sulfuric acid (salt) group.

The cation may be an inorganic cation or an organic cation. The cation electrically neutralizes the —$(O)_aSO_3^-$ in formula (A); it is not limited to a monovalent cation, and may be a divalent or greater cation. The cation denoted by M is desirably a monovalent cation. When a cation of n-valence is employed, it means (1/n) mole of cations relative to the substituent denoted by formula (A).

The inorganic cations are not specifically limited. Alkali metal ions and alkaline earth metal ions are desirable, alkali metal ions are preferred, and $Li^+$, $Na^+$, and $K^+$ are of greater preference.

Examples of organic ions are ammonium ions, quaternary ammonium ions, and pyridinium ions.

M desirably denotes a hydrogen atom, alkali metal ion, quaternary ammonium ion, or pyridinium ion; preferably denotes a hydrogen atom, $Li^+$, $Na^+$, $K^+$, tetraalkylammonium ion, or pyridinium ion; and more preferably denotes $K^+$, a tetraalkylammonium ion, or a pyridinium ion.

An example of an embodiment of Copolymer A containing a sulfuric acid (salt) group is one that comprises the structural unit denoted by formula (6) below in which a sulfuric acid (salt) group has been substituted for the structural unit denoted by formula (1).

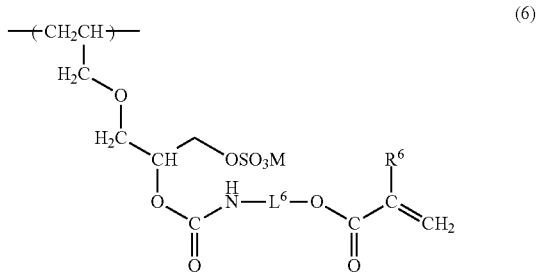
(6)

In formula (6), M denotes a hydrogen atom or a cation. The details are as set forth for M in formula (A).

In formula (6), $R^6$ denotes a hydrogen atom or a methyl group; $L^6$ denotes the divalent linking group denoted by formula (2a), formula (3), or formula (4) described above. The details regarding $R^6$ and $L^6$ in formula (6) are as set forth for $R^1$ and $L^1$ in formula (1).

In Copolymer A, for example, a sulfonic acid (salt) group can be incorporated in the structural unit denoted by formula (7).

(7)

In formula (7), $R^7$ denotes a hydrogen atom or a methyl group, and $L^7$ denotes a divalent linking group, desirably an optionally branched alkylene group having 1 to 7 carbon atoms. The alkylene group may comprise a substituent. The details of the substituent are as set forth for the substituents contained in $L^2$.

In formula (7), M denotes a hydrogen atom or a cation. The details are as set forth for M in formula (A).

However, Copolymer A is not limited to those comprising structural unit (6) or (7). It can comprise a polar group such as a sulfonic acid (salt) group or sulfuric acid (salt) group at any position. A description of the quantity of polar groups contained in Copolymer A will be given further below.

The method of synthesizing Copolymer A will be described next.

Copolymer A is a vinyl chloride copolymer containing a structural unit denoted by general formula (1) derived from the vinyl monomer. Thus, it is synthesized by copolymerizing at least a vinyl chloride monomer and vinyl monomer for introducing the structural unit denoted by general formula (1). In the copolymerization reaction, for example, other monomers, such as monomers for introducing the structural units denoted by general formulas (5) to (8) can be copolymerized. Examples of specific embodiments of the synthesis reaction are:

(A-1) the method of conducting a copolymerization reaction employed a monomer having a radiation-curable functional group as a starting material monomer;

(A-2) the method of copolymerizing the starting material monomers of the vinyl chloride copolymer in the presence of a compound containing a radiation-curable functional group; and (A-3) the method of incorporating a radiation-curable functional group onto the side chain of a vinyl chloride copolymer by means of a polymer reaction.

These embodiments can be combined as needed to obtain Copolymer A.

The following monomers are examples of starting material monomers that can be employed in each of the above embodiments: vinyl chloride, vinylidene chloride, optionally substituted (meth)acrylic acid, optionally substituted alkyl(meth)acrylates, optionally substituted aryl(meth)acrylates, optionally substituted (meth)acrylamides, (meth)acryloyl morpholines, aromatic hydrocarbon rings comprising vinyl groups (various styrenes), heteroaromatic rings comprising vinyl groups (vinylcarbazoles), maleic anhydride, derivatives thereof, fatty acid vinyl esters (various acetoxyethylenes), various benzoyloxyethylenes, optionally substituted alkyl allyl ethers, (meth)acrylonitrile, (meth)crotonnitrile, ethylene, butadiene, itaconic acid esters, crotonic acid esters, and vinyl pyrrolidones. In the above, the term (meth)acrylic acid includes both acrylic acid and methacrylic acid. The same applies to all terms containing "(meth)."

The following monomers are examples of monomers that are desirable in terms of ease of the synthesis reaction: vinyl chloride, vinylidene chloride, optionally substituted (meth)acrylic acid, optionally substituted (cyclo)alkyl(meth)acrylates having 1 to 25 carbon atoms, optionally substituted aryl(meth)acrylates having 1 to 25 carbon atoms, (meth)acrylamide, optionally substituted secondary or tertiary (cyclo)alkyl(meth)acrylamides having 1 to 25 carbon atoms, optionally substituted secondary or tertiary aryl(meth)acrylamides having 1 to 25 carbon atoms, optionally substituted (meth)acryloylmorpholines having 1 to 25 carbon atoms, substituted or unsubstituted aromatic hydrocarbon rings having 1 to 25 carbon atoms and comprising vinyl groups, substituted or unsubstituted heteroaromatic rings having 1 to 25 carbon atoms and comprising vinyl groups, maleic anhydride, substituted or unsubstituted partially esterified maleic acid having 1 to 25 carbon atoms, substituted or unsubstituted partially amidated maleic acid having 1 to 25 carbon atoms, itaconic acid, optionally substituted itaconic acid (cyclo)alkyl esters having 1 to 25 carbon atoms, optionally substituted itaconic acid aryl esters having 1 to 25 carbon atoms, crotonic acid, optionally substituted crotonic acid (cyclo)alkyl esters having 1 to 25 carbon atoms, optionally substituted crotonic acid aryl esters having 1 to 25 carbon atoms, optionally substituted acetoxyethylenes having 1 to 25 carbon atoms, optionally substituted benzoyloxyethylenes having 1 to 25 carbon atoms, optionally substituted alkyl allyl ethers, (meth)acrylonitrile, (meth)crotonnitrile, ethylene, butadiene, and vinylpyrrolidone.

Of these, the following monomers are examples of desirable monomers: vinyl chloride, vinylidene chloride, (meth)acrylic acid, optionally substituted (cyclo)alkyl(meth)acrylates having 1 to 20 carbon atoms, optionally substituted aryl(meth)acrylates having 1 to 20 carbon atoms, (meth)acrylamides, optionally substituted secondary and tertiary (cyclo)alkyl(meth)acrylamides having 1 to 20 carbon atoms, optionally substituted secondary and tertiary aryl(meth)acrylamides having 1 to 20 carbon atoms, optionally substituted (meth)acryloylmorpholines having 1 to 20 carbon atoms, substituted or unsubstituted aromatic hydrocarbon rings comprising vinyl groups and having 1 to 20 carbon atoms, substituted or unsubstituted heteroaromatic rings comprising vinyl groups and having 1 to 20 carbon atoms, maleic anhydride, substituted or unsubstituted partially esterified maleic acid having 1 to 20 carbon atoms, substituted or unsubstituted partially amidated maleic acid having 1 to 20 carbon atoms, itaconic acid, optionally substituted itaconic acid (cyclo)alkyl esters having 1 to 20 carbon atoms, optionally substituted itaconic acid aryl esters having 1 to 20 carbon atoms, crotonic acid, optionally substituted crotonic acid (cyclo)alkyl esters having 1 to 20 carbon atoms, optionally substituted crotonic acid aryl esters having 1 to 20 carbon atoms, optionally substituted acetoxyethylenes having 1 to 20 carbon atoms, optionally substituted benzoyloxyethylenes having 1 to 20 carbon atoms, optionally substituted alkyl allyl ethers having 1 to 20 carbon atoms, optionally substituted (meth)acrylonitriles having 1 to 20 carbon atoms, (meth)crotonnitrile, ethylene butadiene, and vinylpyrrolidone.

Of these, the following monomers are examples of preferred monomers: (meth)acrylic acid, optionally substituted methyl(meth)acrylates, ethyl(meth)acrylates, linear and branched propyl(meth)acrylates, linear and branched butyl(meth)acrylates, linear and branched pentyl(meth)acrylates, normal hexyl(meth)acrylate, cyclohexyl(meth)acrylate, normal heptyl(meth)acrylate, 2-ethyl hexyl(meth)acrylate, normal octyl(meth)acrylate, normal decyl(meth)acrylates, normal dodecyl(meth)acrylates, optionally substituted adamantyl(meth)acrylate, isobornyl(meth)acrylate, norbornane methyl(meth)acrylate, norbornene methyl(meth)acrylate, optionally substituted benzyl(meth)acrylate, naphthyl methyl(meth)acrylate, anthracene methyl(meth)acrylate, phenyl ethyl(meth)acrylate, optionally substituted phenyl (meth)acrylate, naphthyl(meth)acrylate, (meth)acrylamide, optionally substituted (di)methyl(meth)acrylamide, (di)ethyl(meth)acrylamide, linear and branched (di)propyl(meth)acrylamides, linear and branched (di)butyl(meth)acrylamides, linear and branched (di)pentyl(meth)acrylamide, (di) normal hexyl(meth)acrylamide, (di) cyclohexyl(meth)acrylamide, (di-) 2-ethylhexyl(meth)acrylamide, optionally substituted adamantyl(meth)acrylamide, noradamantyl(meth)acrylamide, optionally substituted benzyl(meth)acrylamide, naphthyl ethyl(meth)acrylamide, phenyl ethyl(meth)acrylamide, optionally substituted (di)phenyl(meth)acrylamide, naphthyl(meth)acrylamide, (meth)acryloyl morpholine, piperidyl acrylamide, pyrrolidyl acrylamide, (α-methyl-)styrene, styrene sulfonic acid (salt), chloromethyl styrene, vinylpyridine, vinylimidazole, vinyltriazole, maleic anhydride, itaconic acid, crotonic acid, optionally substituted methyl crotonate, ethyl crotonate, linear and branched propyl crotonate, linear and branched butyl crotonate, linear and branched pentyl crotonate, normal hexyl crotonate, cyclohexyl crotonate, normal heptyl crotonate, 2-ethylhexyl crotonate, normal octyl crotonate, normal decyl crotonate, normal dodecyl crotonate, optionally substituted adamantyl crotonate, isobornyl crotonate, norbornane methyl crotonate, norbornene methyl crotonate, optionally substituted benzyl crotonate, naphthyl methyl crotonate, anthracene methyl crotonate, phenyl ethyl crotonate, optionally substituted phenyl crotonate, naphthyl crotonate, optionally substituted acetoxyethylene, optionally substituted benzoyloxyethylene, 2-hydroxyethyl allyl ether, 2-hydroxypropyl allyl ether, 3-hydroxypropyl allyl ether, optionally substituted vinylcarbazole, vinylpyrrolidone, (meth)acrylonitrile, ethylene, butadiene, and (meth)crotonnitrile.

Use of the following monomers is desirable from perspectives relating to suitability to use in magnetic recording media, such as solubility in solvents and coating suitability: methyl(meth)acrylate, ethyl(meth)acrylate, normal propyl (meth)acrylate, isopropyl(meth)acrylate, normal butyl(meth)acrylate, isobutyl(meth)acrylate, sec-butyl(meth)acrylate, normal pentyl(meth)acrylate, isopentyl(meth)acrylate, vinyl acetate, vinyl alcohol, 2-hydroxyethyl(meth)acrylate, polyethylene glycol(meth)acrylate, 2-hydroxypropyl(meth)acrylate, 3-hydroxypropyl(meth)acrylate, polypropylene glycol (meth)acrylate, 2-hydroxyethyl allyl ether, 2-hydroxypropyl allyl ether, 3-hydroxypropyl allyl ether, p-vinylphenol, maleic acid, maleic anhydride, acrylic acid, methacrylic acid, glycidyl(meth)acrylate, allyl glycidyl ether, phosphoethyl (meth)acrylate, sulfoethyl(meth)acrylate, p-styrene sulfonic acid, 2-acrylamide-2-methylpropanesulfonic acid, and metal salts such as Na salts and K salts, ammonium salts, and pyridine salts thereof.

Examples of copolymerizing monomers that can be employed are the above monomers into which radiation-curable functional groups have been incorporated. The details of the radiation-curable functional groups are as set forth above.

Other hydrophilic monomers may be suitably employed as the above copolymerizing monomers. Monomers comprising phosphoric acid, phosphoric acid esters, quaternary ammonium salt, ethyleneoxy chains, propyleneoxy chains, sulfonic acid, sulfuric acid groups, carboxylic acid groups, salts thereof (such as metal salts), morpholinoethyl groups, and the like can be employed.

Examples of substituents that can be present in the above-described monomer are those comprising partial structures in the form of alkyl groups, alkoxy groups, aryl groups, aryloxy groups, acyl groups, acyloxy groups, alkoxycarbonyl groups, aryloxycarbonyl groups, arylcarbonyl groups, amino groups dialkylamino groups, alkylamino groups, halogen atoms, hydroxyl groups, carboxyl groups, cyano groups, furyl groups, furfuryl groups, oxetane rings, oxirane rings, furan rings, tetrahydrofuran rings, tetrahydrofuryl rings, alkylthio groups, trimethylsilyl groups, trifluoromethyl groups, carboxyl groups, thienyl groups, morpholino groups, morpholinocarbonyl groups, —OSO$_3$H groups, —SO$_3$H groups, phosphoric acid, phosphonic acid, phosphinic acid, and the like.

The following are desirable as the above substituents: substituents having partial structures in the form of alkyl groups having 1 to 20 carbon atoms, alkoxy groups having 1 to 20 carbon atoms, aralkyl groups having 1 to 20 carbon atoms, aryl groups having 1 to 20 carbon atoms, aryloxy groups having 1 to 20 carbon atoms, acyloxy groups having 1 to 20 carbon atoms, acyl groups having 1 to 20 carbon atoms, alkoxycarbonyl groups having 1 to 20 carbon atoms, aryloxycarbonyl groups having 1 to 20 carbon atoms, arylcarbonyl groups having 1 to 20 carbon atoms, amino groups, dialkylamino groups having 1 to 20 carbon atoms, alkylamino groups having 1 to 20 carbon atoms, halogen atoms, hydroxyl groups, carboxyl groups, cyano groups, furyl groups, furfuryl groups, oxetane rings, oxirane rings, furan rings, tetrahydrofuran rings, tetrahydrofuryl groups, tetrahydrofurfuryl groups, alkylthio groups, trimethylsilyl groups, trifluoromethyl groups, carboxyl groups, thienyl groups, morpholino groups, morpholinocarbonyl groups, —OSO$_3$H groups, —SO$_3$H groups, phosphoric acid, phosphonic acid, and phosphinic acid; halogen atoms; and the like.

Of these, the following are preferred as the above substituents: substituents having partial structures in the form of alkyl groups having 1 to 15 carbon atoms, alkoxy groups having 1 to 15 carbon atoms, aralkyl groups having 1 to 15 carbon atoms, aryl groups having 1 to 15 carbon atoms, aryloxy groups having 1 to 15 carbon atoms, acyloxy groups having 1 to 15 carbon atoms, acyl groups having 1 to 15 carbon atoms, alkoxycarbonyl groups having 1 to 15 carbon atoms, aryloxycarbonyl groups having 1 to 15 carbon atoms, arylcarbonyl groups having 1 to 15 carbon atoms, amino groups, dialkylamino groups having 1 to 15 carbon atoms, alkylamino groups having 1 to 15 carbon atoms, halogen atoms, hydroxyl groups, carboxyl groups, cyano groups, furyl groups, furfuryl groups, tetrahydrofuryl groups, tetrahydrofurfuryl groups, alkylthio groups, trimethylsilyl groups, trifluoromethyl groups, carboxyl groups, thienyl groups, morpholino groups, morpholinocarbonyl groups, —OSO$_3$H groups, —SO$_3$H groups, phosphoric acid, phosphonic acid, and phosphinic acid; halogen atoms; and the like.

The following are particularly preferred as the above substituents: substituents having partial structures in the form of methyl groups, ethyl groups, linear or branched propyl groups, linear or branched butyl groups, linear or branched pentyl groups, normal hexyl groups, cyclohexyl groups, normal heptyl groups, 2-ethylhexyl groups, normal octyl groups, normal decyl groups, normal dodecyl groups, methyloxy groups, ethyloxy groups, linear or branched propyloxy groups, linear or branched butyloxy groups, linear or branched pentyloxy groups, normal hexyloxy groups, cyclohexyloxy groups, normal heptyloxy groups, 2-ethylhexyloxy group, normal octyloxy groups, normal decyloxy groups, normal dodecyloxy groups, benzyl groups, phenethyl groups, naphthylmethyl groups, naphthylethyl groups, phenyl groups, naphthyl groups, phenyloxy groups, naphthyloxy groups, methylcarbonyloxy groups, ethylcarbonyloxy groups, linear or branched propylcarbonyloxy groups, linear or branched butylcarbonyloxy groups, linear or branched pentylcarbonyloxy groups, normal hexylcarbonyloxy groups, cyclohexylcarbonyloxy groups, normal heptylcarbonyloxy groups, 2-ethylhexylcarbonyloxy groups, normal octylcarbonyloxy groups, normal decylcarbonyloxy groups, normal dodecylcarbonyloxy groups, methylcarbonyl groups (acetyl groups), ethylcarbonyl groups, linear or branched propylcarbonyl groups, linear or branched butylcarbonyl groups, linear or branched pentylcarbonyl groups, normal hexylcarbonyl groups, cyclohexylcarbonyl groups, normal heptylcarbonyl groups, 2-ethylhexylcarbonyl groups, normal octylcarbonyl groups, normal decylcarbonyl groups, normal dodecylcarbonyl groups, methyloxycarbonyl groups, ethyloxycarbonyl groups, linear or branched propyloxycarbonyl groups, linear or branched butyloxycarbonyl groups, linear or branched pentyloxycarbonyl groups, normal hexyloxycarbonyl groups, cyclohexyloxycarbonyl groups, normal heptyloxycarbonyl groups, 2-ethylhexyloxycarbonyl groups, normal octyloxycarbonyl groups, normal decyloxycarbonyl groups, normal dodecyloxycarbonyl groups, benzoyl groups, naphthylcarbonyl groups, (di)methylamino groups, (di)ethylamino groups, linear or branched (di)propylamino groups, linear or branched (di)butylamino groups, linear or branched (di)pentylamino groups, (di)normal hexylamino groups, (di)cyclohexylamino groups, (di)normal heptylamino groups, (di)-2-ethylhexylamino groups, fluorine atoms, chlorine atoms, bromine atoms, hydroxyl groups, carboxyl groups, cyano groups, furyl groups, furfuryl groups, tetrahydrofuryl groups, tetrahydrofurfuryl groups, alkylthio groups, trimethylsilyl groups, trifluoromethyl groups, carboxyl groups, thienyl groups, morpholino groups, morpholinocarbonyl groups, —OSO$_3$H groups, —SO$_3$H groups, phosphoric acid, phosphonic acid, and phosphinic acid. Fluorine atoms, chlorine atoms, bromine atoms, and the like are preferred. These substituents may be further substituted with the above substituents.

The type and number of starting material monomers are not specifically limited other than that at least two monomers be employed in the form of vinyl chloride and a vinyl-based monomer for introducing the structural unit denoted by formula (1). In addition to these two monomers, for example, 1 to 12 monomers may be employed, 1 to 10 monomers are desirably employed in combination, and 1 to 8 monomers are preferably employed in combination. In the blending of starting material monomers, it suffices to determine the composition of the copolymer desired. The content of the vinyl chloride monomer in the starting material monomers is desirably equal to or more than 60 weight percent and equal to or less than 95 weight percent in that good mechanical strength can be achieved, good solvent solubility can be attained, and a suitable solution viscosity can be achieved, resulting in good dispersion.

In embodiments (A-2) and (A-3) above, examples of the radiation-curable functional group-containing compound that is used to introduce a radiation-curable functional group are: (meth)acrylic acid, glycidyl(meth)acrylate, hydroxyalkyl(meth)acrylate, 2-isocyanatoethyl(meth)acrylate, 2-methacryloyloxyethyl isocyanate, 2-(2-isocyanate ethyloxy)ethyl methacrylate, 2-acryloyloxyethyl isocyanate, 1,1-bis(acryloyloxymethyl)ethyl isocyanate, and other compounds containing carbon-carbon double bond groups.

Taking into account ease of synthesis, cost, and availability of starting materials, the method of synthesizing Copolymer A is desirably embodiment (A-3), in which a polymer reaction is used to incorporate a radiation-curable functional group. The vinyl chloride copolymer employed in this embodiment is not specifically limited. A vinyl chloride copolymer comprising an active hydrogen group such as a hydroxyl group or a primary or secondary amine within the molecule is desirable in that a radiation-curable functional group can be readily introduced into the side chain by reaction with an isocyanate compound comprising a radiation-curable functional group. Such a vinyl chloride copolymer can be synthesized by known methods employing, for example, the above monomers that are capable of the copolymerization.

As set forth above, Copolymer A can comprise a polar group such as a sulfonic acid (salt) group. A single polar group, or two or more polar groups, can be incorporated. The incorporation of multiple polar groups is sometimes desirable in that, compared to when only a single polar group is incorporated, solubility in solvents such as cyclohexanone that are employed in the field of magnetic recording media is sometimes enhanced. The polar group can be introduced into Copolymer A by a known method such as copolymerization or an addition reaction. Further, a sulfonic acid (salt) group-containing vinyl chloride copolymer can be converted to another sulfonate group-containing vinyl chloride copolymer by salt exchange. Further, a known method can be employed to remove the salt and obtain sulfonic acid group-containing vinyl chloride copolymer.

The synthesis reaction and reactions incorporating the radiation-curable functional group or polar group to obtain Copolymer A can be conducted by dissolving the starting material compounds in a solvent (reaction solvent), and heating, pressurizing, substituting nitrogen, and the like as needed. Commonly employed reaction conditions can be employed as the conditions for the above reaction, such as the reaction temperature and duration of the reaction.

A known reaction catalyst can be employed in the above reaction. Examples are amine catalysts, organic tin catalysts, and organic bismuth catalysts. Examples of amine catalysts are: diethylene triamine, N-methyl morpholine, tetramethyl hexamethylene diamine, dimethyl formamide, dimethyl acetamide, and N-methyl pyrrolidone. Examples of organic tin catalysts are dibutyltin dilaurate, dioctyltin dilaurate, dibutyltin didecanate, and dioctyltin didecanate. An example of an organic bismuth catalyst is bismuth tris(2-ethylhexanoate). An organic tin catalyst or an organic bismuth catalyst is desirably employed as the catalyst in the present invention.

The quantity of catalyst added is, for example, 0.00001 to 5 weight parts, desirably 0.0001 to 1 weight part, and preferably, 0.00001 to 0.1 weight part, relative to the total weight of the starting material compounds employed in the reaction.

A known solvent that is commonly employed in the above reactions can be selected as the reaction solvent. Examples are ketone solvents such as acetone, methyl ethyl ketone, and cyclohexanone; ester solvents such as methyl acetate, ethyl acetate, and ethyl lactate; ether solvents such as dioxane and tetrahydrofuran; aromatic solvents such as toluene and xylene; amide solvents such as N,N-dimethyl formamide, N,N-dimethyl acetamide, and N-methyl pyrrolidone; sulfoxide solvents such as dimethyl sulfoxide; methylene chloride; chloroform; and cyclohexane.

Following the synthesis reaction, purification and the like can be conducted by a known method as needed to obtain Copolymer A. The fact that the targeted copolymer has been obtained can be confirmed by a known identification method such as NMR. The use of methyl ethyl ketone, cyclohexanone, or a mixed solvent thereof, which are widely used in coating liquids for forming magnetic recording media, as the reaction solvent for the synthesis reaction makes it possible to employ the reaction solution following synthesis as is, or after adding an optional additive, as the coating liquid for forming a magnetic recording medium.

The various physical properties of Copolymer A will be described next.

(a) Average Molecular Weight, Molecular Weight Distribution

Copolymer A desirably has a weight average molecular weight of equal to or greater than 10,000 and equal to or less than 500,000 (in the present invention, "equal to or greater than 10,000 and equal to or less than 500,000" is also denoted as "10,000 to 500,000"; identical below), preferably 10,000 to 400,000, and more preferably, 10,000 to 300,000. A weight average molecular weight of equal to or greater than 10,000 is desirable in that the storage property of a coating layer formed using Copolymer A as binder will be good. A weight average molecular weight of equal to or less than 500,000 is desirable in that good dispersion can be achieved.

The molecular weight distribution (weight average molecular weight Mw/number average molecular weight Mn) of Copolymer A is desirably 1.00 to 5.50, preferably 1.01 to 5.40. A molecular weight distribution of equal to or lower than 5.50 is desirable in that the composition distribution can be narrow and good dispersion can be achieved. The weight average molecular weight and molecular weight distribution (Mw/Mn) normally change little or not at all before and after the reaction introducing a radiation-curable functional group and/or a polar group into the vinyl chloride copolymer.

(b) Glass Transition Temperature

The glass transition temperature (Tg) of Copolymer A is desirably 10 to 180° C., preferably 10 to 170° C. A glass transition temperature of equal to or higher than 10° C. is desirable in that a strong coating can be formed by curing with radiation, yielding a coating of good durability and storage property. When employing Copolymer A as a magnetic recording medium binder, a glass transition temperature of equal to or lower than 180° C. is desirable in that it can yield good calendering properties even when calendering is conducted after radiation curing and thus can yield a magnetic recording medium with good electromagnetic characteristics. The glass transition temperature (Tg) of the coating that is formed by radiation curing Copolymer A is desirably 30 to 200° C., preferably 40 to 160° C. A glass transition temperature of equal to or higher than 30° C. is desirable in that good coating strength can be achieved with enhanced durability and storage property. A coating with a glass transition temperature of equal to or lower than 200° C. is desirable in a magnetic recording medium in that good calendering properties and electromagnetic characteristics can be achieved.

(c) Polar Group Content

As set forth above, Copolymer A desirably comprises a polar group.

The content of the polar group in the radiation-curable vinyl chloride copolymer is desirably 1.0 to 3,500 mmol/kg, preferably 1.0 to 3,000 mmol/kg, and more preferably, 1.0 to 2,500 mmol.

A polar group content of equal to or higher than 1.0 mmol/kg is desirable in that adequate strength of adsorption to powder such as ferromagnetic powder and nonmagnetic powder can be achieved and good dispersion can be attained. A polar group content of equal to or lower than 3,500 mmol/kg is desirable in that good dissolution in solvent can be achieved. As set forth above, a polar group in the form of the sulfonic acid (salt) group or sulfuric acid (salt) group denoted by formula (A) is desirable. The content of polar groups selected from the group consisting of sulfonic acid (salt) groups and sulfuric acid (salt) groups is desirably equal to or greater than 10 mmol/kg and equal to or less than 2,000 mmol/kg from the perspective of achieving both dispersion and solvent solubility.

(d) Hydroxyl Group Content

Copolymer A desirably contains hydroxyl (OH) groups. The number of hydroxyl groups contained is desirably 1 to 100,000, preferably 1 to 10,000, per molecule. When the number of hydroxyl groups falls within this range, solubility in solvent can increase and good dispersion can be achieved.

(e) Radiation-Curable Functional Group Content

Copolymer A contains a (meth)acryloyloxy group in the form of the radiation-curable functional group in the functional unit denoted by formula (1), and can contain various other radiation-curable functional groups. The details of these radiation-curable functional groups are as set forth above. The content of the radiation-curable functional group in Copolymer A is desirably 1.0 to 4,000 mmol/kg, preferably 1.0 to 3,000 mmol/kg, and more preferably, 1.0 to 2,000 mmol/kg. A radiation-curable functional group content of equal to or higher than 1.0 mmol/kg is desirable in that a coating of high strength can be formed by radiation-curing. A radiation-curable functional group content of equal to or lower than 4,000 mmol/kg is desirable in that good calendering moldability can be achieved even when calendering is conducted after radiation-curing, and thus a magnetic recording medium with good electromagnetic characteristics can be achieved.

Specific examples of Copolymer A are given below. However, the present invention is not limited to the specific examples below. The numbers positioned to the right of the various structural units below denotes mole ratios of the various structural units to all polymerizing units in the copolymer.

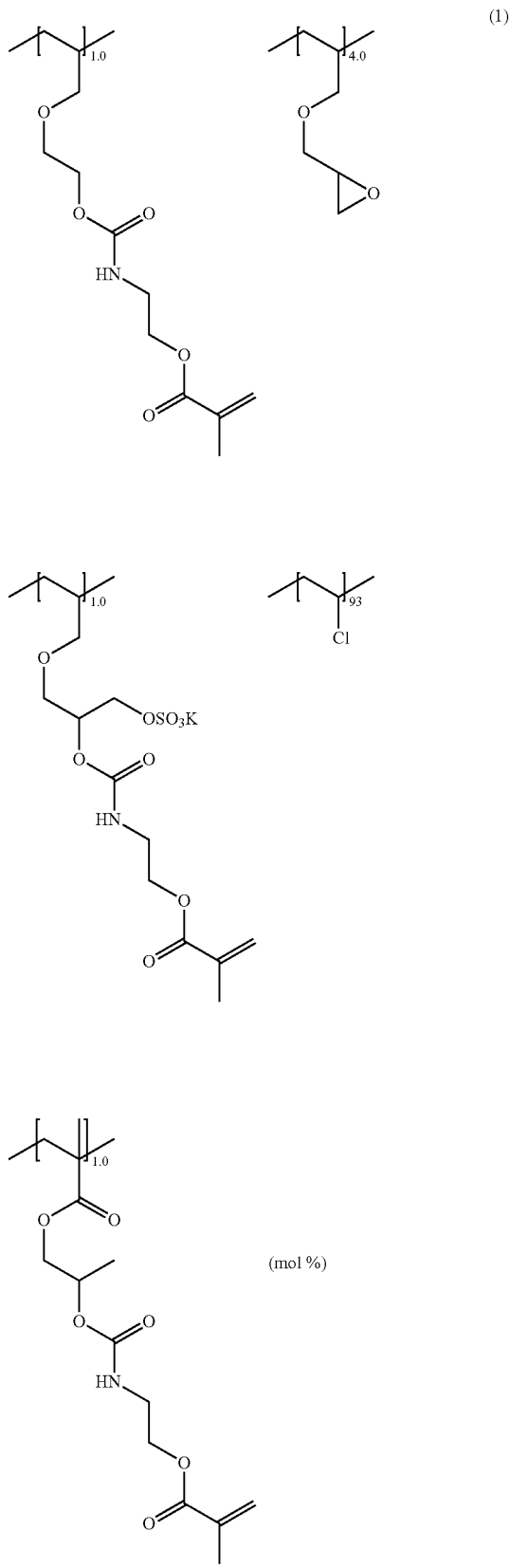

(1)

(mol %)

21
-continued
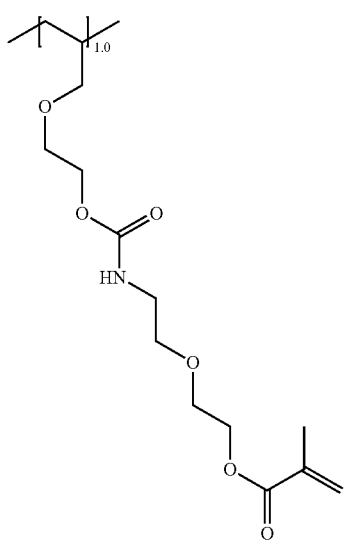
(2)
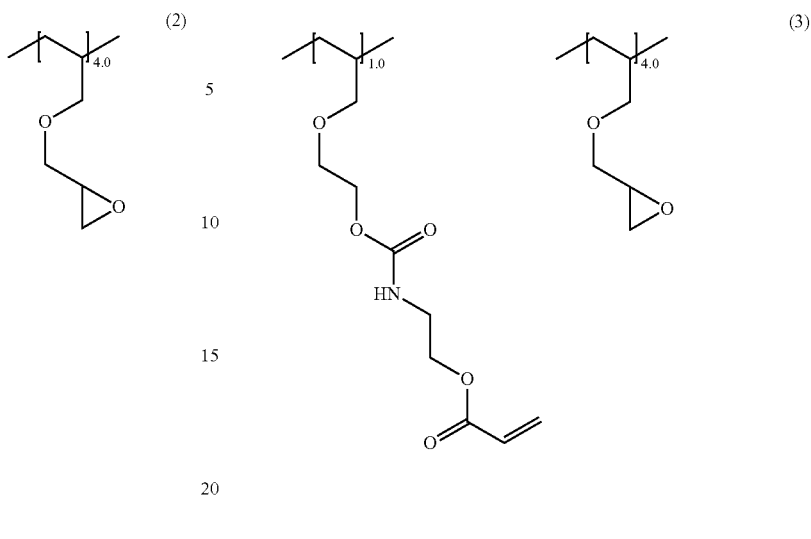
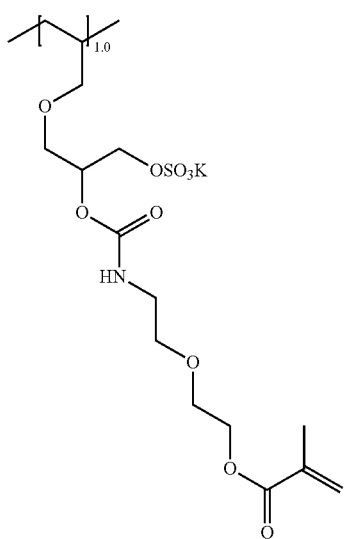
(mol %)
22
-continued
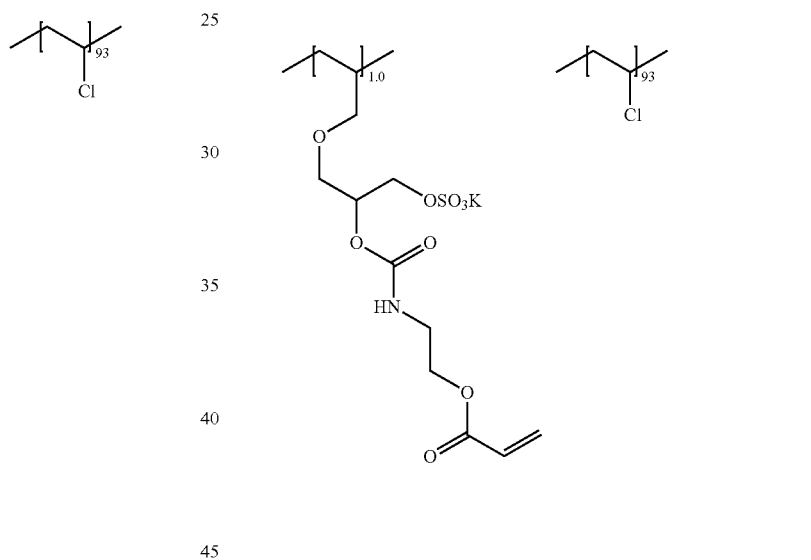
(3)
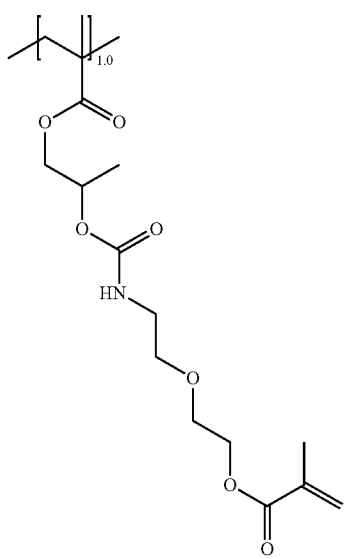
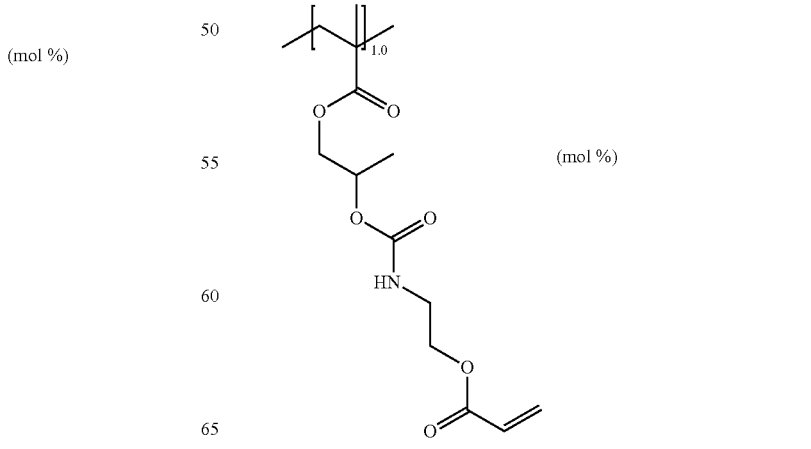
(mol %)

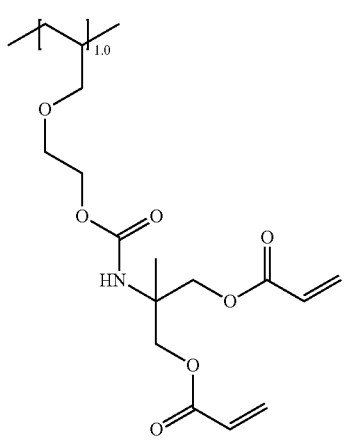 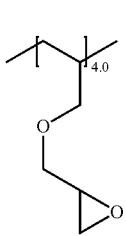 (4)
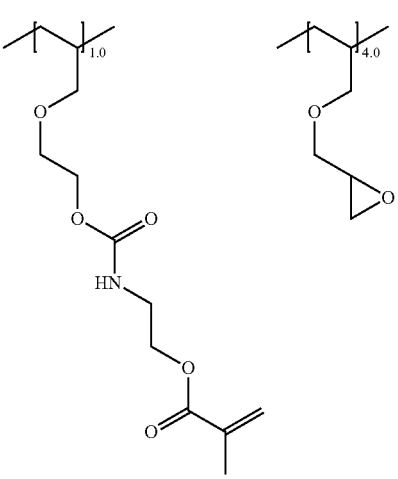 (5)
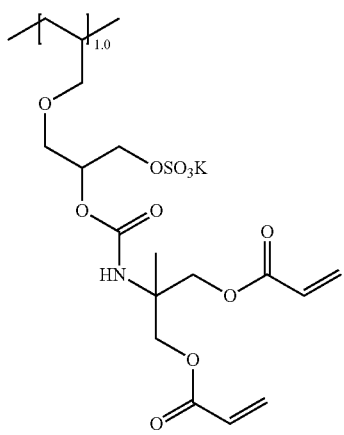 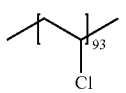
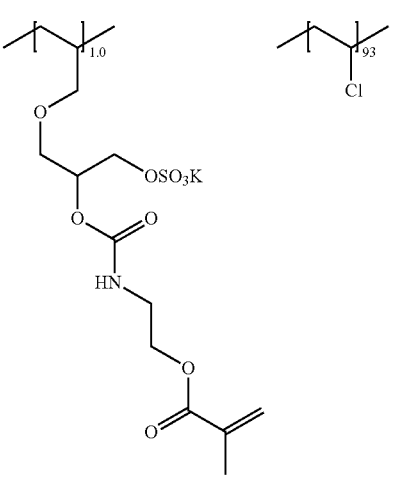
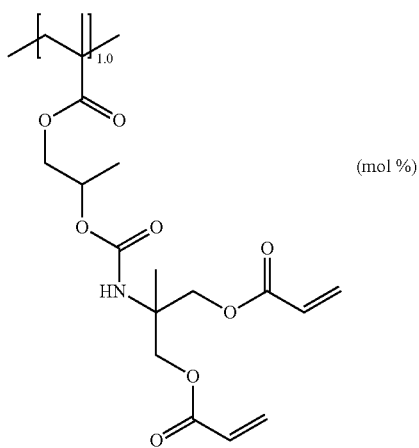 (mol %)
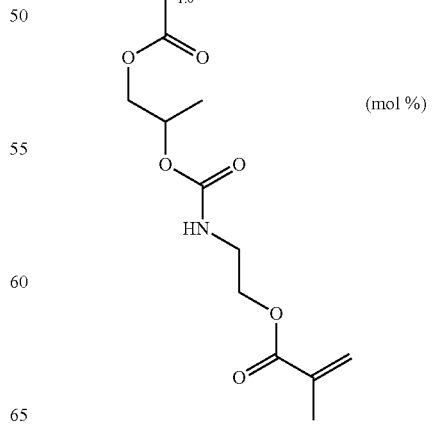 (mol %)

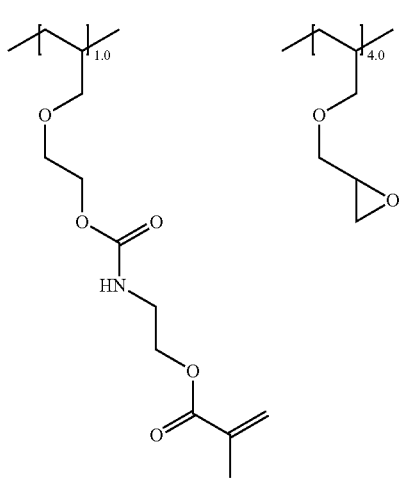
(6)
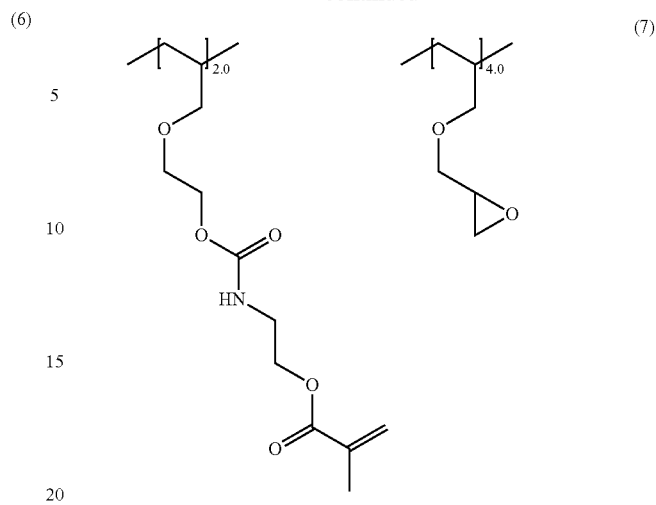
(7)
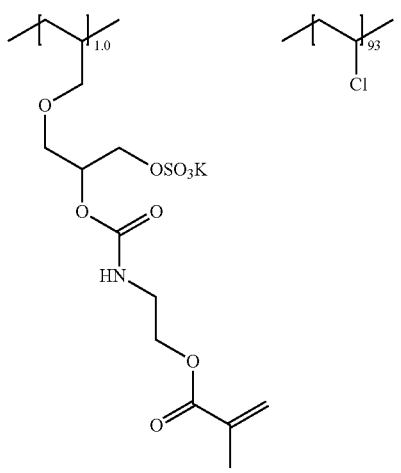
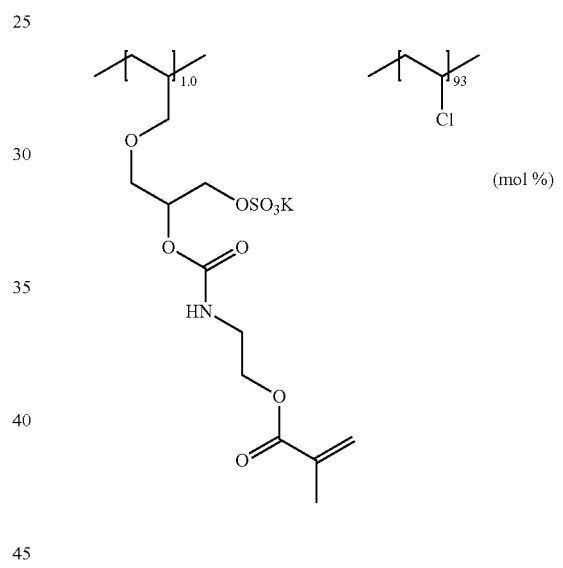
(mol %)
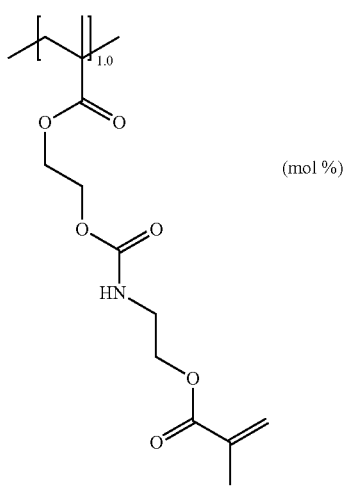
(mol %)
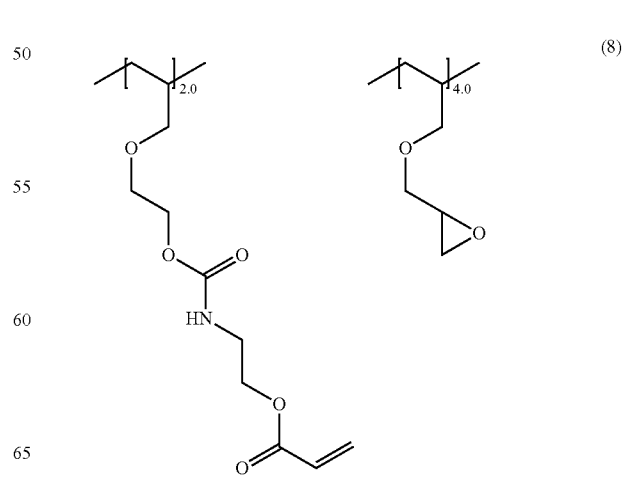
(8)

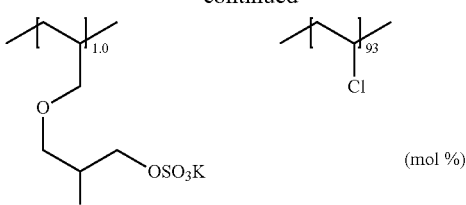
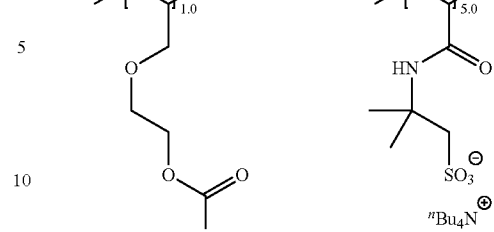

(9)

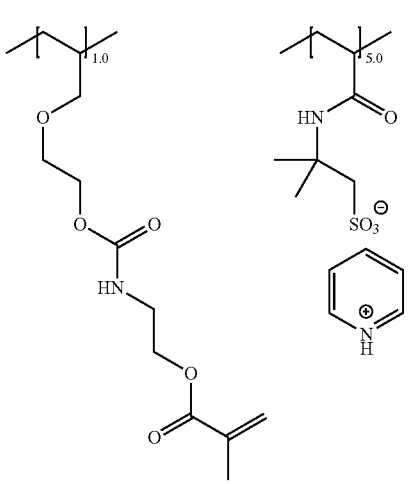

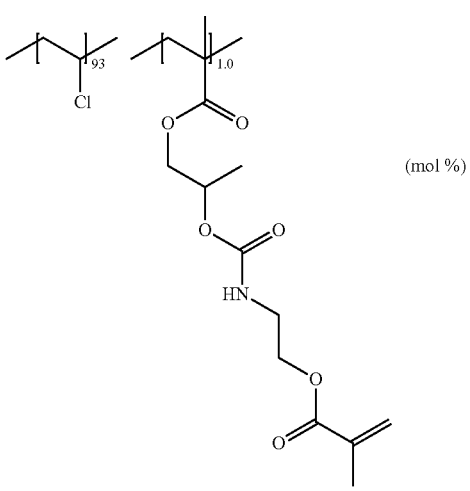

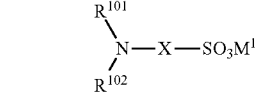

(10)

Radiation-Curable Polyurethane Resin

The radiation-curable polyurethane resin (also referred to as the "polyurethane resin B", hereinafter) that forms the nonmagnetic layer of the magnetic recording medium of the present invention together with the above-described radiation-curable vinyl chloride copolymer has been obtained from starting materials containing a sulfonic acid (salt) group containing-polyol compound denoted by formula (2) below.

$$\begin{array}{c} R^{101} \\ \phantom{R^{101}} \diagdown \\ \phantom{R^{101}\diagdown} N\!-\!X\!-\!SO_3M^1 \\ \phantom{R^{101}\diagup} \diagup \\ R^{102} \end{array} \quad (2)$$

In formula (2), X denotes a divalent linking group; each of $R^{101}$ and $R^{102}$ independently denotes an alkyl group containing at least one hydroxyl group and equal to or more than two carbon atoms or an aralkyl group containing at least one hydroxyl group and equal to or more than eight carbon atoms; and $M^1$ denotes a hydrogen atom or a cation.

Normally, the polyurethane synthesis reaction is conducted in an organic solvent. However, sulfonic acid (salt) group-containing polyol compounds generally have poor solubility in organic solvents, and thus have poor reactivity. Therefore, it was difficult to synthesize polyurethane resin in which the desired quantity of sulfonic acid (salt) group is incorporated. By contrast, with the above sulfonic acid (salt) group containing-polyol compound having good solubility in organic solvents, polyurethane resin in which the desired quantity of sulfonic acid (salt) group is incorporated can be readily obtained. Thus, it is presumed that, with Polyurethane resin B, the quantity of polyurethane resin that cannot adsorb to the nonmagnetic powder and seeps onto the magnetic layer can be reduced. The present inventors assume that this contributes to the formation of flexible coating film having high strength without deterioration of running stability and reproduction output fluctuation, together with the use of Copolymer A.

The details of Polyurethane resin B will be described below.

In formula (2), X denotes a divalent linking group. From the perspective of solubility in organic solvents, the divalent linking group denoted by X desirably contains 2 to 20 carbon atoms, and preferably a divalent hydrocarbon group; an alkylene group, arylene group, or a combination of two or more of these groups is preferred; an alkylene group or an arylene group is of greater preference; an ethylene group or a phenylene group is of still greater preference; and an ethylene group is optimal.

Examples of the phenylene group are o-phenylene, m-phenylene, and p-phenylene groups. An o-phenylene or m-phenylene group is desirable, and an m-phenylene group is preferred.

The above alkylene group desirably comprises equal to or more than 2 but equal to or less than 20, preferably equal to or more than 2 but equal to or less than 4, and more preferably 2, carbon atoms. The alkylene group may be a linear alkylene group or branched alkylene group; a linear alkylene group is desirable.

The above arylene group desirably comprises equal to or more than 6 but equal to or less than 20, preferably equal to or more than 6 but equal to or less than 10, and more preferably 6, carbon atoms.

The above alkylene group and arylene group may comprise the following substituent, but are desirable comprised of just carbon atoms and hydrogen atoms.

Examples of substituents that are optionally present on the alkylene group are: aryl groups, halogen atoms (fluorine, chlorine, bromine, and iodine atoms), alkoxy groups, aryloxy groups, and alkyl groups.

Examples of substituents that are optionally present on the arylene group are: alkyl groups, halogen atoms (fluorine, chlorine, bromine, and iodine atoms), alkoxy groups, aryloxy groups, and aryl groups.

In formula (2), each of $R^{101}$ and $R^{102}$ independently denotes an alkyl group comprising at least one hydroxyl group and equal to or more than two carbon atoms or an aralkyl group comprising at least one hydroxyl group and equal to or more than eight carbon atoms. The alkyl group and aralkyl group may have substituents other than hydroxyl groups.

In addition to hydroxyl groups, the above alkyl group and aralkyl group may comprise substituents in the form of alkoxy groups, aryloxy groups, halogen atoms (fluorine, chlorine, bromine, and iodine atoms), sulfonyl groups, and silyl groups, for example. Of these, alkoxy groups and aryloxy groups are desirable; alkoxy groups having 1 to 20 carbon atoms and aryloxy groups having 6 to 20 carbon atoms are preferred; and phenoxy groups and alkoxy groups having 1 to 4 carbon atoms are of greater preference.

These alkyl groups and aralkyl groups may be linear or branched.

One or more hydroxyl groups are contained, 1 or 2 are desirable, and 1 is preferred, in each of $R^{101}$ and $R^{102}$. That is, the sulfonic acid (salt) group-containing polyol denoted by formula (2) is preferably a sulfonic acid (salt) group-containing diol compound.

From the perspective of solubility in organic solvents, availability of starting materials, cost and the like, the alkyl group in $R^{101}$ and $R^{102}$ comprises equal to or more than 2, desirably 2 to 22, preferably 3 to 22, more preferably 4 to 22, and still more preferably 4 to 8 carbon atoms.

From the perspective of solubility in organic solvents, availability of starting materials, cost and the like, the aralkyl group in $R^{101}$ and $R^{102}$ comprises equal to or more than 8, desirably 8 to 22, preferably 8 to 12, and more preferably, 8 carbon atoms.

In the aralkyl group contained in $R^{101}$ and $R^{102}$, saturated hydrocarbon chains are desirably present at the α-position and β-position of the nitrogen atom. In that case, a hydroxyl group may be present at the β-position of a nitrogen atom.

In $R^{101}$ and $R^{102}$, a hydroxyl group is desirably not present at the α-position of a nitrogen atom, one hydroxyl group is desirably present at the least the β-position of a nitrogen atom, and a single hydroxyl group is preferably present at the β-position of a nitrogen atom. The presence of a hydroxyl group at the β-position of a nitrogen atom can facilitate synthesis and enhance solubility in organic solvents.

Each of $R^{101}$ and $R^{102}$ independently preferably denotes an alkyl group comprising at least one hydroxyl group and 2 to 22 carbon atoms, an aralkyl group comprising at least one hydroxyl group and 8 to 22 carbon atoms, an alkoxyalkyl group comprising at least one hydroxyl group and 3 to 22 carbon atoms, or an aryloxyalkyl group comprising at least one hydroxyl group and 9 to 22 carbon atoms. An alkyl group comprising at least one hydroxyl group and 2 to 20 carbon atoms, an aralkyl group comprising at least one hydroxyl group and 8 to 20 carbon atoms, an alkoxyalkyl group comprising at least one hydroxyl group and 3 to 20 carbon atoms, or an aryloxyalkyl group comprising at least one hydroxyl group and 9 to 20 carbon atoms is preferred.

Specific examples of alkyl groups comprising at least one hydroxyl group and equal to or more than two carbon atoms are: 2-hydroxyethyl groups, 2-hydroxypropyl groups, 2-hydroxybutyl groups, 2-hydroxypentyl groups, 2-hydroxyhexyl groups, 2-hydroxyoctyl groups, 2-hydroxy-3-methoxypropyl groups, 2-hydroxy-3-ethoxypropyl groups, 2-hydroxy-3-butoxypropyl groups, 2-hydroxy-3-phenoxypropyl groups, 2-hydroxy-3-methoxybutyl groups, 2-hydroxy-3-methoxy-3-methylbutyl groups, 2,3-dihydroxypropyl groups, 3-hydroxypropyl groups, 3-hydroxybutyl groups, 4-hydroxybutyl groups, 1-methyl-2-hydroxyethyl groups, 1-ethyl-2-hydroxyethyl groups, 1-propyl-2-hydroxyethyl groups, 1-butyl-2-hydroxyethyl groups, 1-hexyl-2-hydroxyethyl groups, 1-methoxymethyl-2-hydroxyethyl groups, 1-ethoxymethyl-2-hydroxyethyl groups, 1-butoxymethyl-2-hydroxyethyl groups, 1-phenoxymethyl-2-hydroxyethyl groups, 1-(1-methoxyethyl)-2-hydroxyethyl groups, 1-(1-methoxy-1-methylethyl)-2-hydroxyethyl groups, and 1,3-dihydroxy-2-propyl groups. Of these, 2-hydroxybutyl groups, 2-hydroxy-3-methoxypropyl groups, 2-hydroxy-3-butoxypropyl groups, 2-hydroxy-3-phenoxypropyl groups, 1-methyl-2-hydroxyethyl groups, 1-methoxymethyl-2-hydroxyethyl groups, 1-butoxymethyl-2-hydroxyethyl groups, and 1-phenoxyethyl-2-hydroxyethyl groups are desirable examples.

Specific examples of aralkyl groups comprising at least one hydroxyl group and equal to or more than eight carbon atoms are: 2-hydroxy-2-phenylethyl groups, 2-hydroxy-2-phenylpropyl groups, 2-hydroxy-3-phenylpropyl groups, 2-hydroxy-2-phenylbutyl groups, 2-hydroxy-4-phenylbutyl groups, 2-hydroxy-5-phenylpentyl groups, 2-hydroxy-2-(4-methoxyphenyl)ethyl groups, 2-hydroxy-2-(4-phenoxyphenyl)ethyl groups, 2-hydroxy-2-(3-methoxyphenyl)ethyl groups, 2-hydroxy-2-(4-chlorophenyl)ethyl groups, 2-hydroxy-2-(4-hydroxyphenyl)ethyl groups, 2-hydroxy-3-(4-methoxyphenyl) propyl groups, 2-hydroxy-3-(4-chlorophenyl)propyl groups, 1-phenyl-2-hydroxyethyl groups, 1-methyl-1-phenyl-2-hydroxyethyl groups, 1-benzyl-2-hydroxyethyl groups, 1-ethyl-1-phenyl-2-hydroxyethyl groups, 1-phenethyl-2-hydroxyethyl groups, 1-phenylpropyl-2-hydroxyethyl groups, 1-(4-methoxyphenyl)-2-hydroxyethyl groups, 1-(4-phenoxyphenyl)-2-hydroxyethyl groups, 1-(3-methoxyphenyl)-2-hydroxyethyl groups, 1-(4-chlorophenyl)-2-hydroxyethyl groups, 1-(4-hydroxyphenyl)-2-hydroxyethyl groups, and 1-(4-methoxyphenyl)-3-hydroxy-2-propyl groups. Of these, 2-hydroxy-2-phenylethyl groups and 1-phenyl-2-hydroxyphenyl groups are desirable examples.

In formula (2), $M^1$ denotes a hydrogen atom or a cation.

The cation may be an inorganic cation or an organic cation. The cation electrically neutralizes the $—SO_3^-$ in formula (2). It is not limited to a monovalent cation, and can be a divalent or greater cation. A monovalent cation is desirable. When the valence of the cation denoted by $M^1$ is given by n, $M^1$ denotes (1/n) moles of the cation relative to the compound denoted by formula (2).

The inorganic cation is not specifically limited; desirable examples are alkali metal ions and alkaline earth metal ions. Alkali metal ions are preferred examples, and $Li^+$, $Na^+$, $K^+$, $Rb^+$, and $Cs^+$ are examples of greater preference.

Examples of organic cations are ammonium ions, quaternary ammonium ions, and pyridinium ions.

The above $M^1$ is desirably a hydrogen atom or an alkali metal ion, preferably a hydrogen atom, $Li^+$, $Na^+$, or $K^+$, and further preferably, $K^+$.

The compound denoted by formula (2) may comprise one or more aromatic ring within the molecule to enhance solubility in organic solvents.

In formula (2), $R^{101}$ and $R^{102}$ may be identical or different, but are desirably identical to facilitate synthesis.

In formula (2), each of $R^{101}$ and $R^{102}$ desirably denotes a group with equal to or more than five carbon atoms. In formula (2), each of $R^{101}$ and $R^{102}$ is desirably a group comprising an aromatic ring and/or an ether bond.

Reference can be made to Japanese Unexamined Patent Publication (KOKAI) No. 2009-96798, which is expressly incorporated herein by reference in its entirety, for the details of the above-described polyol compound denoted by formula (2). In particular, reference can be made to [0028], [0029] [0045] and Examples of Japanese Unexamined Patent Publication (KOKAI) No. 2009-96798, for the synthesis method of the polyol compound denoted by formula (2). In addition, examples of the polyol compound denoted by formula (2) include the compounds denoted by formulas (2) and (3) described in Japanese Unexamined Patent Publication (KOKAI) No. 2009-96798, and details thereof are described in [0030] to [0034] of Japanese Unexamined Patent Publication (KOKAI) No. 2009-96798. Specific examples of the polyol compound denoted by formula (2) are the following Example compounds (S-1) to (S-70) described in Japanese Unexamined Patent Publication (KOKAI) No. 2009-96798 and the following Example compounds (S-71) to (S-74). In Example compounds below, "Ph" denotes a phenyl group and "Et" denotes an ethyl group.

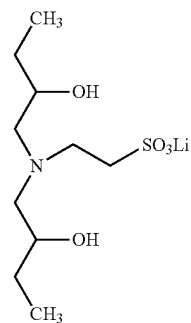

(S-1)

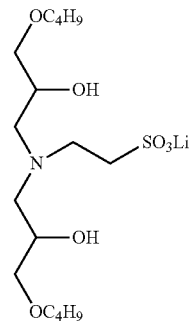

(S-2)

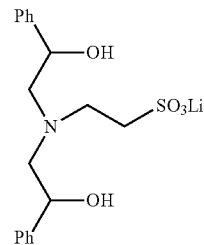

(S-3)

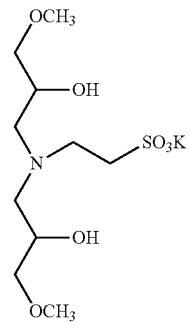

(S-4)

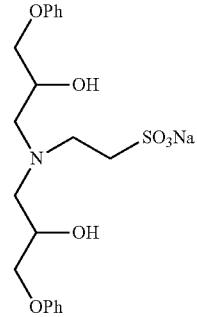

(S-5)

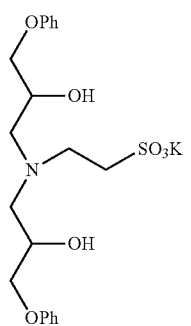
(S-6)
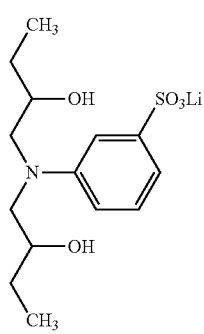
(S-7)
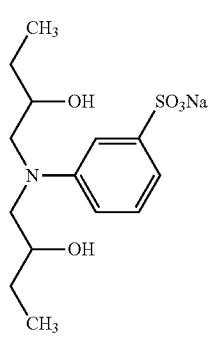
(S-8)
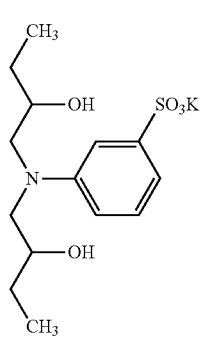
(S-9)
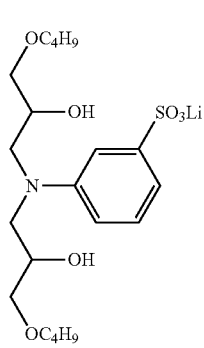
(S-10)
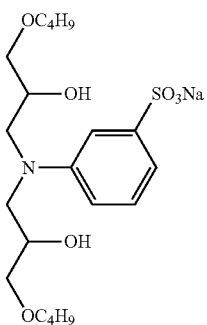
(S-11)
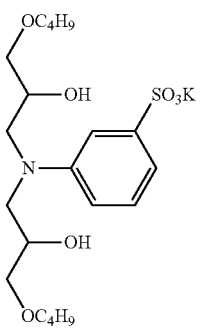
(S-12)
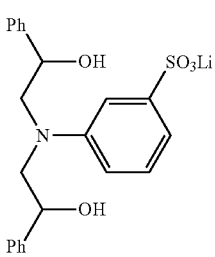
(S-13)
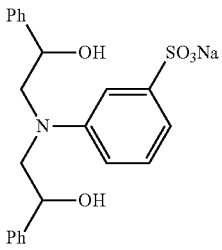
(S-14)
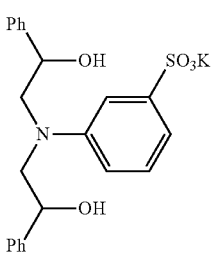
(S-15)

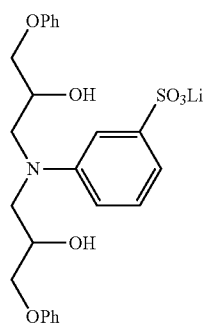 (S-16)
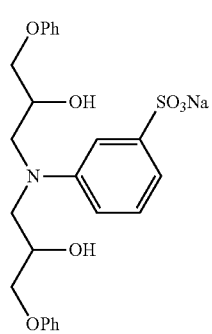 (S-17)
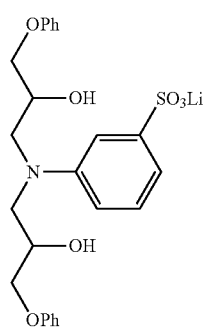 (S-18)
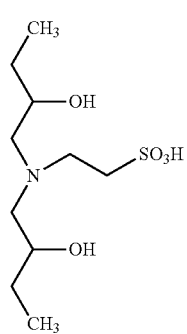 (S-19)
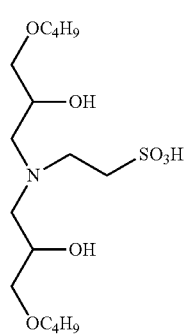 (S-20)
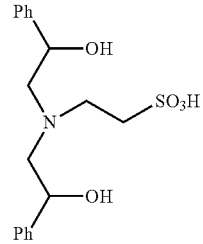 (S-21)
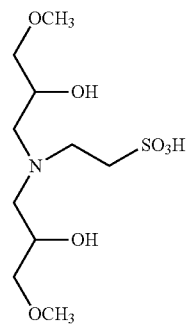 (S-22)
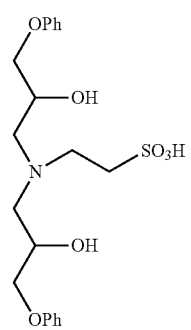 (S-23)
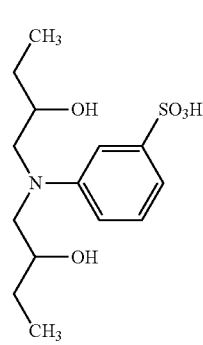 (S-24)
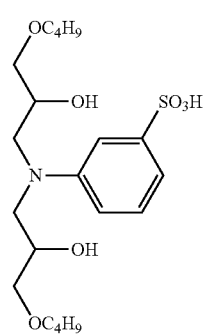 (S-25)

(S-26) 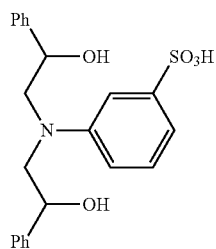
(S-27) 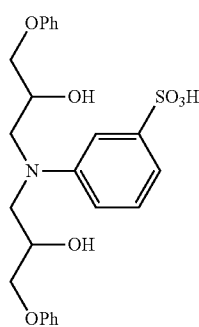
(S-28) 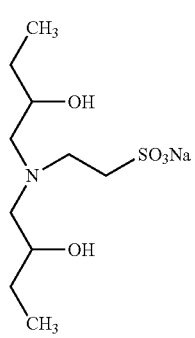
(S-29) 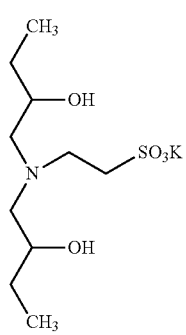
(S-30) 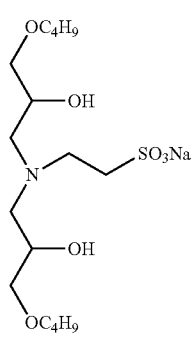
(S-31) 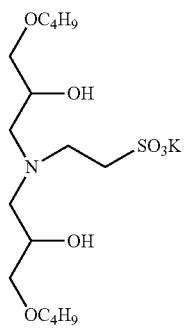
(S-32) 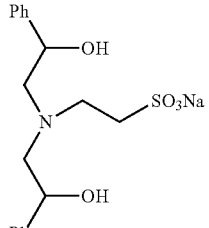
(S-33) 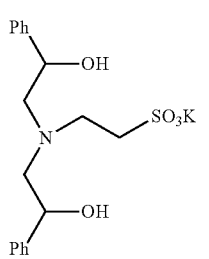
(S-34) 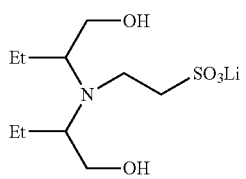
(S-35) 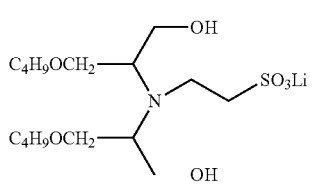
(S-36) 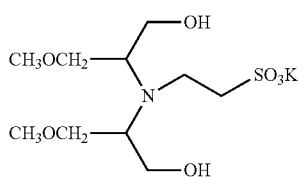
(S-37)

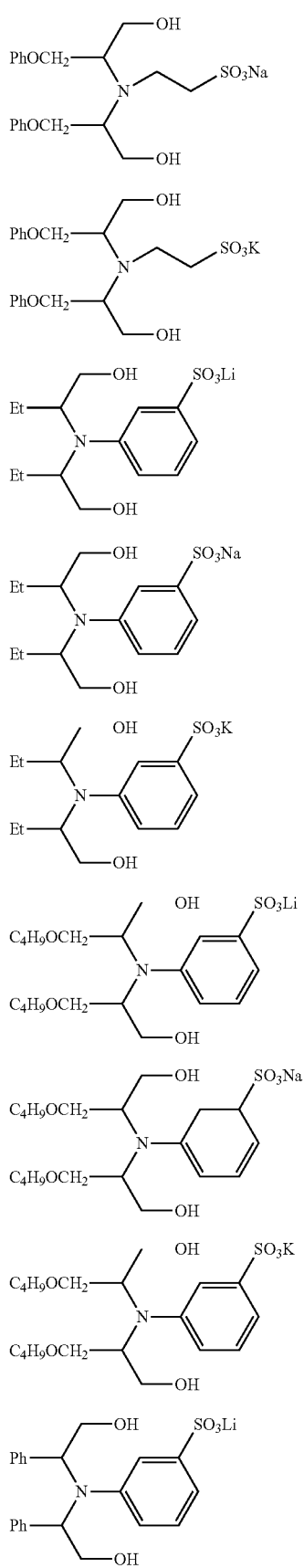
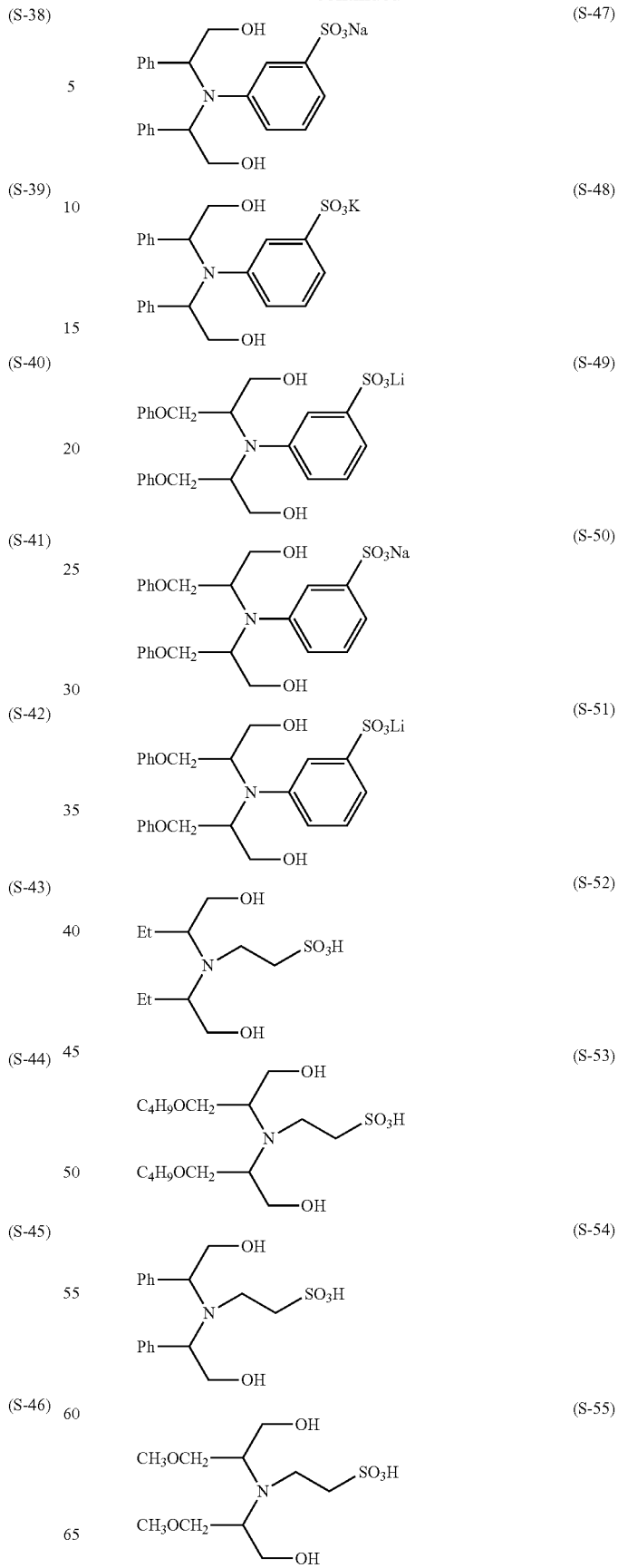

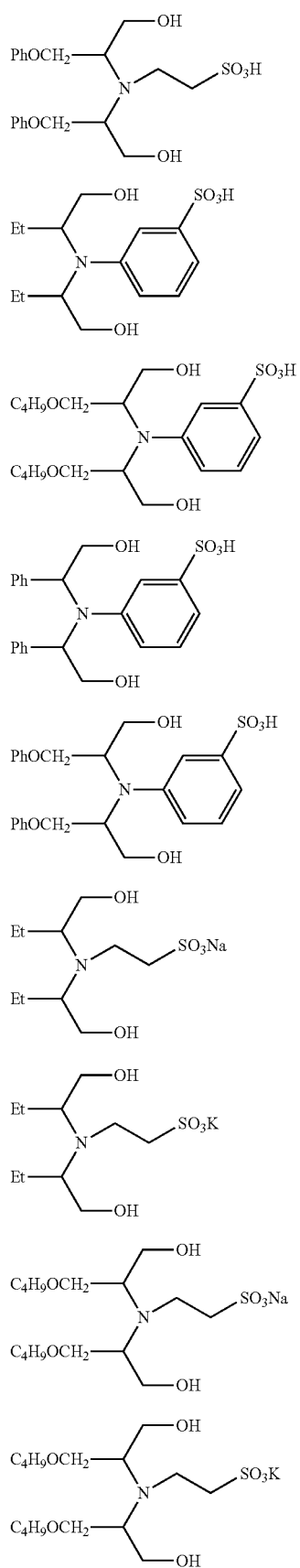
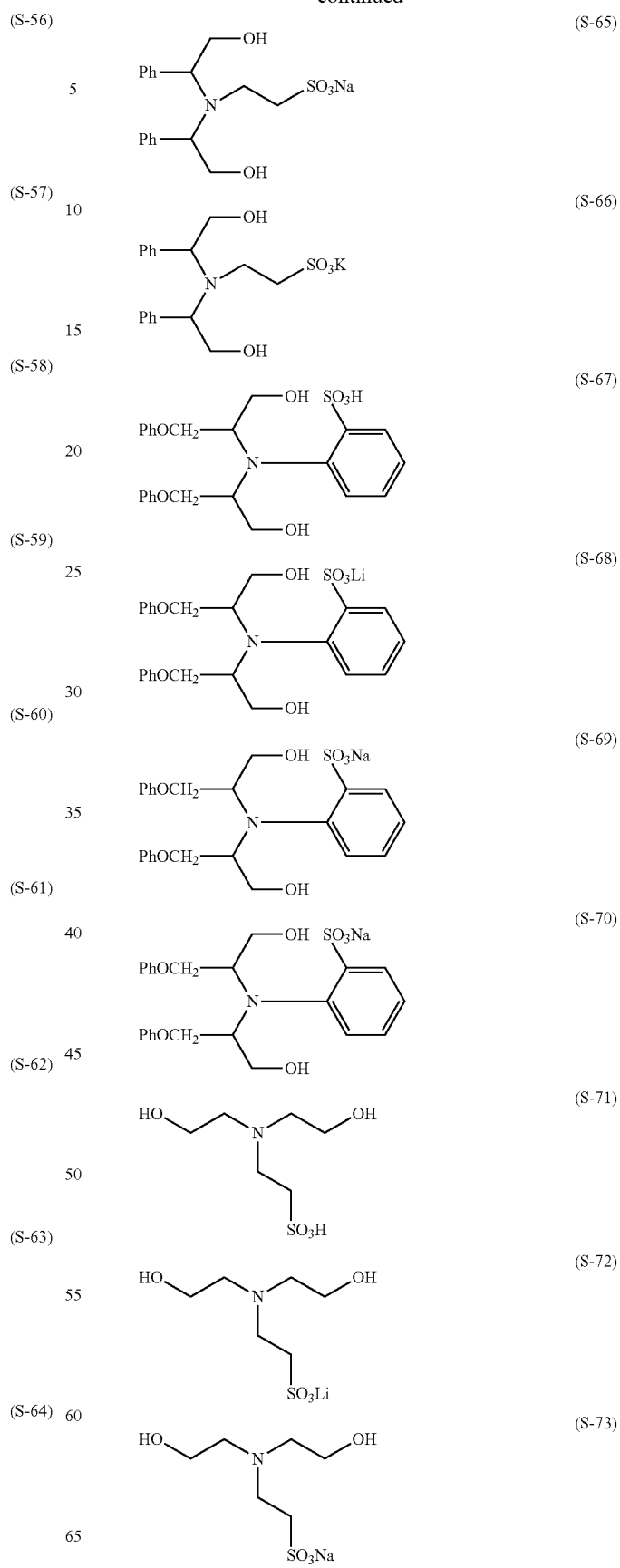

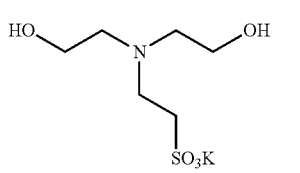

(S-74)

In addition to the polyol compound denoted by formula (2), known polyol compounds that are commonly employed as chain-extending agents in polyurethane synthesis, such as polyester polyols, polyether polyols, polyetherester polyols, polycarbonate polyols, polyolefin polyols, and dimer diols, can be employed the synthesis starting material of Polyurethane resin B. Reference can be made to [0056] to [0065] of Japanese Unexamined Patent Publication (KOKAI) No. 2009-96798, for polyol compounds that can be employed together. The fluorene-derived alcohol denoted by the following formula can also be employed.

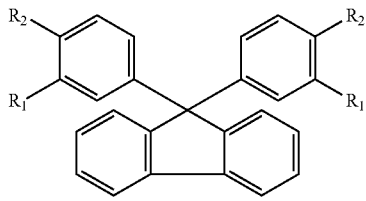

(In the formula, $R_1$ denotes H or $CH_3$, $R_2$ denotes OH or —$OCH_2CH_2OH$, and the two instances of $R_1$ and of $R_2$ may be identical or different.)

Polyurethane resin B can be obtained by subjecting an isocyanate compound and a polyol compound to a urethane-forming reaction. The starting materials can be dissolved in a solvent (polymerization solvent); and heating, pressurization, and nitrogen-backfilling can be conducted as needed to facilitate the urethane-forming reaction. The usual reaction conditions for conducting a urethane-forming reaction can be adopted for the reaction temperature, reaction time, and other reaction conditions of the urethane-forming reaction. Reference can be made to, for example, [0067], [0068] and Examples of Japanese Unexamined Patent Publication (KOKAI) No. 2009-96798, for the urethane-forming reaction.

The term "isocyanate compound" means a compound having an isocyanate group. The use of a bifunctional or greater polyfunctional isocyanate compound (referred to as a "polyisocyanate" hereinafter) is desirable. Polyisocyanates that can be employed as the synthesis starting material of Polyurethane resin B are not specifically limited; any known polyisocyanate can be employed. For example, diisocyanates such as trilene diisocyanate (TDI), diphenylmethane diisocyanate (MDI), p-phenylene diisocyanate, o-phenylene diisocyanate, m-phenylene diisocyanate, xylylene diisocyanate, hydrogenated xylylene diisocyanate, and isophorone diisocyanate can be employed. One isocyanate compound may be employ singly or two or more isocyanate compounds may be employed in combination.

Polyurethane resin B is a radiation-curable polyurethane resin and thus comprises radiation-curable functional groups. The radiation-curable functional group that is present in Polyurethane resin B can be any functional group that undergoes a curing reaction (crosslinking reaction) when irradiated with radiation; it is not specifically limited. From the perspective of reactivity, a group with a radical polymerizable carbon-carbon double bond is desirable and an acrylic double bond group is preferred. Of these, from the perspective of reactivity, a (meth)acryloyloxy group is desirable.

The radiation-curable functional group can be contained in either an isocyanate compound or a polyol compound, or in both. Taking into account the availability and cost of starting materials, the use of a polyol compound containing a radiation-curable functional group as a polyol compound is desirable.

Diols having at least one acrylic double bond per molecule, such as glycerin monoacrylate (also known as glycerol acrylate), glycerin monomethacrylate (also known as glycerol methacrylate) (such as Blemmer GLM, a trade name of NOF Corp.), and bisphenol A epoxyacrylate (such as Epoxyester 3000A, a trade name of Kyoeisha Chemical Co., Ltd.), are suitable as the polyol compound comprising a radiation-curable functional group. Among these diols, the compound indicated below (glycerin mono(meth)acrylate) is desirable from the perspective of curability. Below, R denotes a hydrogen atom or methyl group.

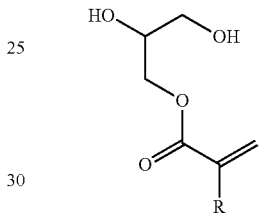

The various physical properties of Polyurethane resin B will be described next.

(a) Average Molecular Weight

The weight average molecular weight of Polyurethane resin B is desirably 10,000 to 500,000, preferably 10,000 to 400,000, and more preferably, 10,000 to 300,000. A weight average molecular weight of equal to or higher than 10,000 is desirable in that the resulting storage property of the coating layer formed using Polyurethane resin B as binder can be good. Further, a weight average molecular weight of equal to or lower than 500,000 is desirable in that good dispersibility can be achieved.

For example, the weight average molecular weight can be adjusted to within the desired range by microadjusting the mole ratio of glycol-derived OH groups to diisocyanate-derived NCO groups and through the use of reaction catalysts. The weight average molecular weight can be further adjusted by adjusting the solid component concentration during the reaction, the reaction temperature, the reaction solvent, the reaction time, and the like.

The molecular weight distribution (Mw/Mn) of Polyurethane resin B is desirably 1.00 to 5.50, preferably 1.01 to 5.40. A molecular weight distribution of equal to or lower than 5.50 is desirable in that the composition distribution is low and good dispersibility can be achieved.

(b) Urethane Group Concentration

The urethane group concentration of Polyurethane resin B is desirably 2.0 to 5.0 mmole/g, preferably 2.1 to 4.5 mmole/g.

A urethane group concentration of equal to or higher than 2.0 mmole/g is desirable in that the glass transition temperature (Tg) can be high, a coating with good durability can be formed, and dispersibility can be good. A urethane group concentration of equal to or lower than 5.0 mmole/g is desirable in that good solvent solubility can be achieved, the polyol content can be adjusted, and the molecular weight can be readily controlled.

(c) Glass Transition Temperature

The glass transition temperature (Tg) of Polyurethane resin B is desirably 10 to 180° C., preferably 10 to 170° C. A glass transition temperature of equal to or higher than 10° C. is desirable in that a strong coating can be formed by radiation curing and a coating of good durability and storage properties can be obtained. The glass transition temperature of Polyurethane resin B is desirably equal to or lower than 180° C. in that calendering moldability can be good even when calendering is conducted after radiation curing and a magnetic recording medium with good electromagnetic characteristics can be obtained.

(d) Polar Group Content

Polyurethane resin B contains a sulfonic acid (salt) group because it has been obtained with the starting materials containing a sulfonic acid (salt) group-containing polyol compound, as described above. In addition to the sulfonic acid (salt) group, Polyurethane resin B can contain other polar groups. Examples of other polar groups are hydroxyalkyl groups, carboxylic acid (salt) groups, sulfuric acid (salt) groups, and phosphoric acid (salt) groups, with —$OSO_3M'$, —$PO_3M'_2$, —COOM', and —OH being desirable. Of these, —$OSO_3M'$ is preferred. M' denotes a hydrogen atom or monovalent cation. Examples of monovalent cations are alkali metals and ammonium. The content of polar groups in Polyurethane resin B is desirably 1.0 to 3,500 mmole/kg, preferably 1.0 to 3,000 mmole/kg, more preferably 1.0 to 2,500 mmole/kg.

The concentration of polar groups is desirably equal to or higher than 1.0 mmole/kg in that adequate adsorbability to the nonmagnetic powder can be imparted and dispersibility can be good. The concentration of polar groups is desirably equal to or lower than 3,500 mmole/kg in that good solubility in solvent can be achieved.

(e) Hydroxyl Group Content

Hydroxyl groups (OH groups) can also be incorporated into Polyurethane resin B. The number of OH groups incorporated is desirably 1 to 100,000, preferably 1 to 10,000, per molecule. When the number of hydroxyl groups lies within this range, good dispersion can be achieved due to enhanced solubility in solvent.

(f) Radiation-Curable Functional Group Content

The details of the radiation-curable functional groups contained in Polyurethane resin B are as set forth above. The content thereof is desirably 1.0 to 4,000 mmole/kg, preferably 1.0 to 3,000 mmole/kg, and more preferably, 1.0 to 2,000 mmole/kg. A radiation-curable functional group content of equal to or higher than 1.0 mmole/kg is desirable in that a strong coating can be formed by radiation curing. A radiation-curable functional group content of equal to or lower than 4,000 mmole/kg is desirable in that good calendering moldability can be achieved even when calendering is conducted after radiation curing, and a magnetic recording medium with good electromagnetic characteristics can be obtained.

Radiation-Curable Composition and Nonmagnetic Layer

The nonmagnetic layer of the magnetic recording medium of the present invention is a radiation-cured layer obtained by curing with radiation a radiation-curable composition containing Copolymer A and Polyurethane resin B. The blending ratio of Copolymer A and Polyurethane resin B in the radiation-curable composition is desirably 50 to 80 weight parts of Polyurethane resin B per 100 weight parts of Copolymer A to form a nonmagnetic layer having both good curability and suitable flexibility.

The radiation-curable composition contains Copolymer A and Polyurethane resin B, and may comprise known solvents, polymerization initiators, additives, other polymers, and the like. Examples of the solvent are those given by way of example above for the reaction solvent. Methyl ethyl ketone, cyclohexanone, and mixed solvents thereof, which are widely employed in the coating liquids of magnetic recording media, are suitable. When employing an electron beam in the curing reaction, no polymerization initiator is required.

In the course of producing a large quantity of a particulate magnetic recording medium, the coating liquid may be stored for an extended period of, for example, six months or longer. However, vinyl chloride binders are generally of low stability. In particular, the use of a radiation-curable vinyl chloride resin will sometimes sharply reduce the stability of the coating liquid. This is attributed to reaction of the radiation-curable functional groups during storage, thereby changing the molecular weight.

Additionally, the synthesis reaction of the radiation-curable resin is normally conducted in the presence of a polymerization-inhibiting agent to protect radiation-curable functional groups. Accordingly, to prevent the radiation-curable functional groups from reacting during extended storage, it is conceivable to increase the quantity of the polymerization-inhibiting agent. However, merely increasing the quantity of the polymerization-inhibiting agent may cause a drop in curability during irradiation with radiation and make it difficult to obtain a tough coating.

By contrast, research conducted by the present inventors has demonstrated that when a radiation-curable vinyl chloride copolymer is stored in the presence of a benzoquinone compound, it is possible to maintain good long-term storage stability without losing curability. Accordingly, when Copolymer A that is employed to form the nonmagnetic layer in the present invention is used following long-term storage, it is desirably stored in a composition containing a benzoquinone compound.

The benzoquinone compound is a compound comprising a benzoquinone skeleton. The benzoquinone skeleton contained therein can be the o-benzoquinone skeleton or p-benzoquinone skeleton indicated below.

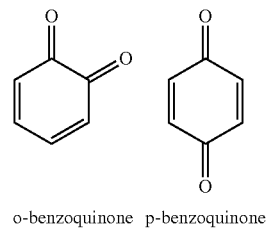

o-benzoquinone  p-benzoquinone

From the perspective of availability, the benzoquinone skeleton is desirably a compound comprising a p-benzoquinone skeleton. The benzoquinone skeleton in the benzoquinone compound may be substituted or unsubstituted. Examples of substituents (which may themselves be substituted) are alkyl groups, alkoxyl groups, hydroxyl groups, halogen atoms, aryl groups, cyano groups, nitro groups, and any of the substituents contained in Example compounds indicated below. Further, the benzoquinone compound employed may have one, two, or more benzoquinone skeletons. Example compounds given below are examples of desirable benzoquinone compounds.

From the perspective of availability, the benzoquinone skeleton is desirably a compound comprising a p-benzoquinone skeleton. The benzoquinone skeleton in the benzoquinone compound may be substituted or unsubstituted. Examples of substituents (which may themselves be substituted) are alkyl groups, alkoxyl groups, hydroxyl groups, halogen atoms, aryl groups, cyano groups, nitro groups, and any of the substituents contained in Example compounds indicated below. Further, the benzoquinone compound employed may have one, two, or more benzoquinone skeletons. Example compounds given below are examples of desirable benzoquinone compounds.

(1)
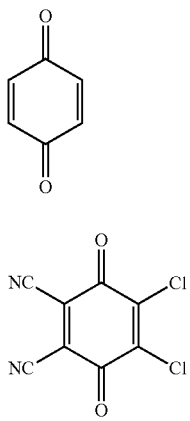

(2)
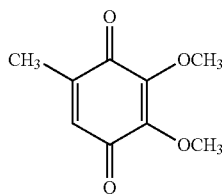

(3)
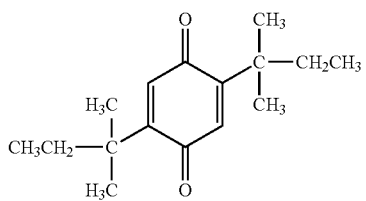

(4)
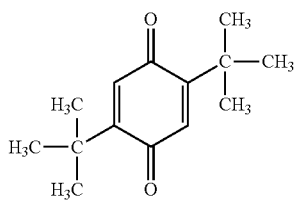

(5)
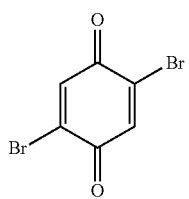

(6)
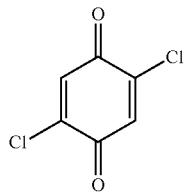

(7)
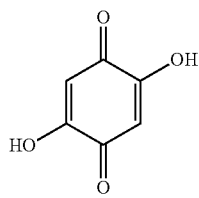

(8)
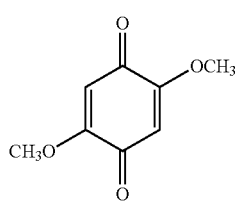

(9)
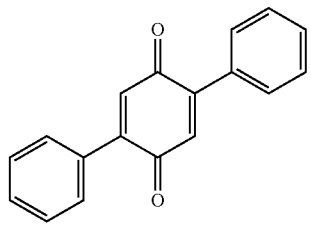

(10)
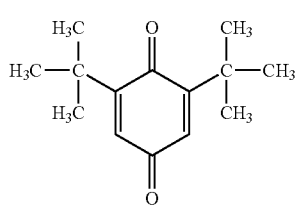

(11)
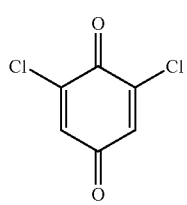

(12)
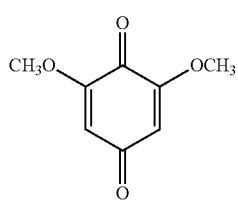

(13)

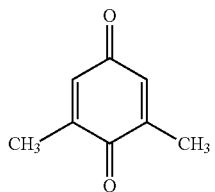
(14)
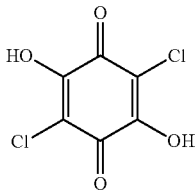
(22)
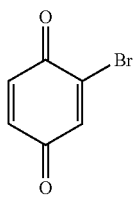
(15)
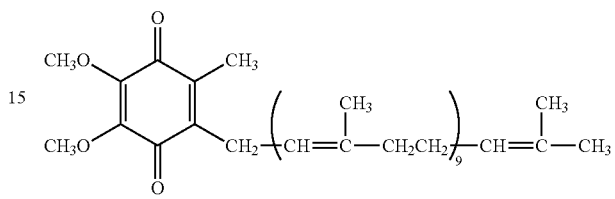
(23)
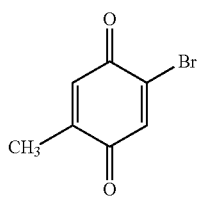
(16)
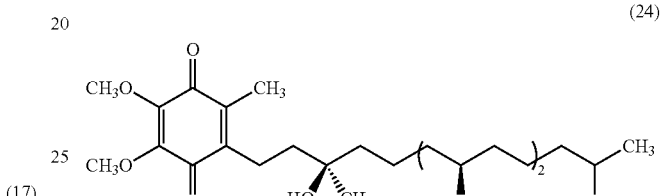
(24)
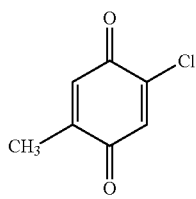
(17)
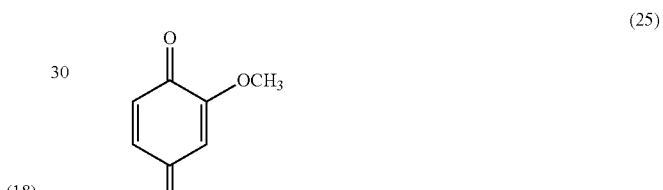
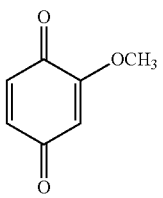
(25)
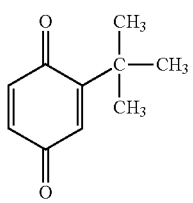
(18)
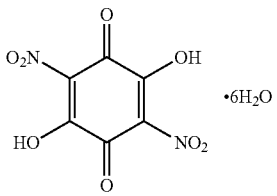
·6H$_2$O
(26)
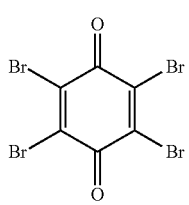
(19)
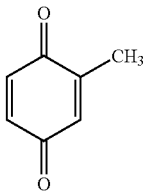
(27)
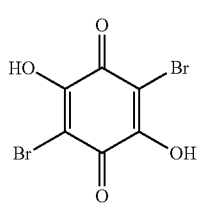
(20)
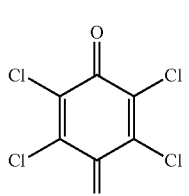
(21)
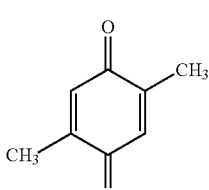
(28)

-continued

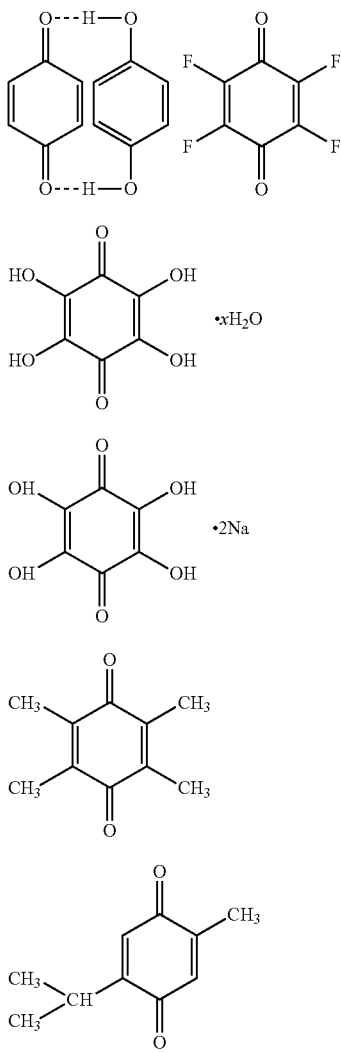

(29)

(30)

(31)

(32)

(33)

Of the above Example Compounds, Example Compounds (1) to (22) and (25) to (33) are desirable; (1) to (22), (25) to (28), (30), (32), and (33) are preferred; and compounds (1) to (22), (25) to (28), (30), and (32) are of greater preference.

Copolymer A is desirably stored in the composition containing one or more benzoquinone compounds. In that case, from the perspective of achieving both stability and curability, the content of the benzoquinone compound (the combined quantities of multiple benzoquinone compounds when multiple such compounds are employed) is desirably equal to or higher than 1 ppm but equal to or lower than 500,000 ppm, preferably equal to or higher than 1 ppm but equal to or lower than 400,000 ppm, and more preferably, equal to or higher than 100 ppm but equal to or lower than 100,000 ppm, based on Copolymer A (solid component).

Copolymer A may be desirably stored in the composition containing at least one compound selected from the group consisting of phenol compounds, piperidine-1-oxyl compounds, nitro compounds, and phenothiazine compounds, in addition to the benzoquinone compound. By employing one or more of these compounds, desirably together with the benzoquinone compound, long-term storage stability of Copolymer A can be maintained well without deterioration of curability.

The above compounds will be described in detail below.

The phenol compound is not specifically limited other than that it be a compound comprising a hydroxyphenyl group. The hydroxyphenyl group may comprise a substituent. Examples of the substituent are an alkyl group, alkoxy group, and hydroxyl group. The phenol compound may comprise multiple substituted or unsubstituted hydroxybenzene skeletons (polyphenol compounds). The polyphenol compound is not specifically limited. From the perspectives of availability and effect, bisphenol A, tradename Irgacure 1010 (made by Ciba Specialty Chemicals Corporation) or the like is desirable. Desirable examples of the phenol compound employed in combination are p-methoxyphenol, hydroquinone, polyphenol compounds, and 2,6-di-t-butyl-p-cresol. The phenol compound may be employed singly, or two or more such phenol compounds may be employed in combination.

The piperidine-1-oxyl compound referred to in the present invention means a compound having the piperidine-1-oxyl structure indicated below.

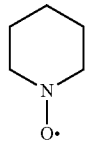

The piperidine-1-oxyl compound can be in the form of a compound comprising a substituted piperidine-1-oxyl skeleton, or an unsubstituted piperidine-1-oxyl compound. Examples of the substituents are alkyl groups, alkoxy groups, amino groups, carboxyl groups, cyano groups, hydroxyl groups, isothiocyanate groups, optionally substituted alkylcarbonylamino groups, arylcarbonyloxy groups, piperidyl ring carbon-containing carbonyl groups, and other substituents contained in Example compounds indicated below. A piperidine-1-oxyl group comprising one piperidine-1-oxyl skeleton or two or more such skeletons may be employed. Examples of desirable piperidine-1-oxyl compounds are Example compounds (1-a) to (1-l) below. Of these, Example compounds (1-f), (1-j), (1-l), (1-b), and (1-k) are desirable, and (1-f), (1-j), (1-l), and (1-b) are preferably, and (1-f), (1-j), and (1-l) are of greater preference.

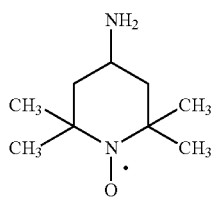

(1-a)

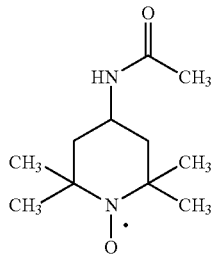

(1-b)

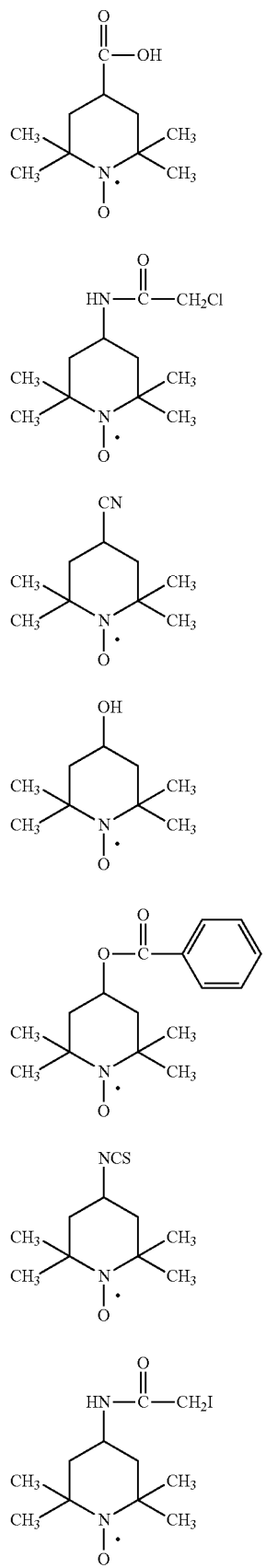

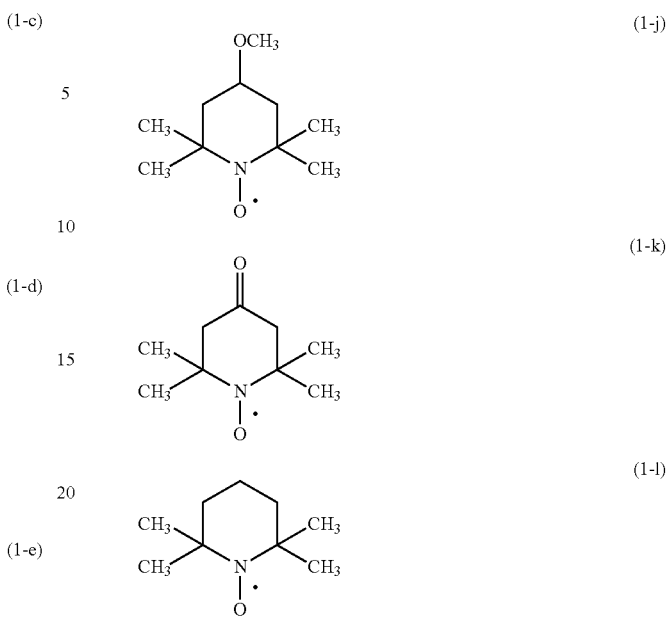

The nitro compound is not specifically limited other than that it be a compound comprising a nitro group denoted by R—NO$_2$. In this formula, the R moiety is, for example, an aryl group (desirably an aryl group having 6 to 10 carbon atoms, such as a phenyl group) or an alkyl group (desirably an alkyl group having 1 to 12 carbon atoms, such as a methyl group, ethyl group, propyl group, isopropyl group, linear or branched butyl group, linear or branched amyl group, linear or branched hexyl group, linear or branched heptyl group, linear or branched octyl group, linear or branched nonyl group, linear or branched decyl group, linear or branched undecyl group, or linear or branched dodecyl group, and optionally comprising a hetero atom). From the perspective of availability, nitrobenzene and nitromethane are preferred.

The term "phenothiazine compound" means a compound having the phenothiazine skeleton indicated below.

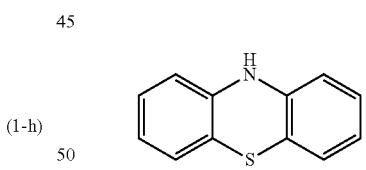

The phenothiazine skeleton contained in the phenothiazine compound may be substituted or unsubstituted. Examples of substituents are halogen atoms, optionally substituted amino groups, alkoxy groups, alkylthio groups, acyl groups, arylcarbonyl groups, trihalomethyl groups, and any of the other substituents contained in Example compounds indicated below.

A phenothiazine compound having one, two, or more phenothiazine skeletons may be employed. Example compounds (4-a) to (4-g) are examples of desirable phenothiazine compounds. Of these, Example compounds (4-b), (4-c), (4-d), (4-e), (4-f), and (4-g) are preferred, (4-b), (4-c), (4-d), (4-e), and (4-f) are of greater preference, and (4-c), (4-d), (4-e), and (4-f) are of even greater preference.

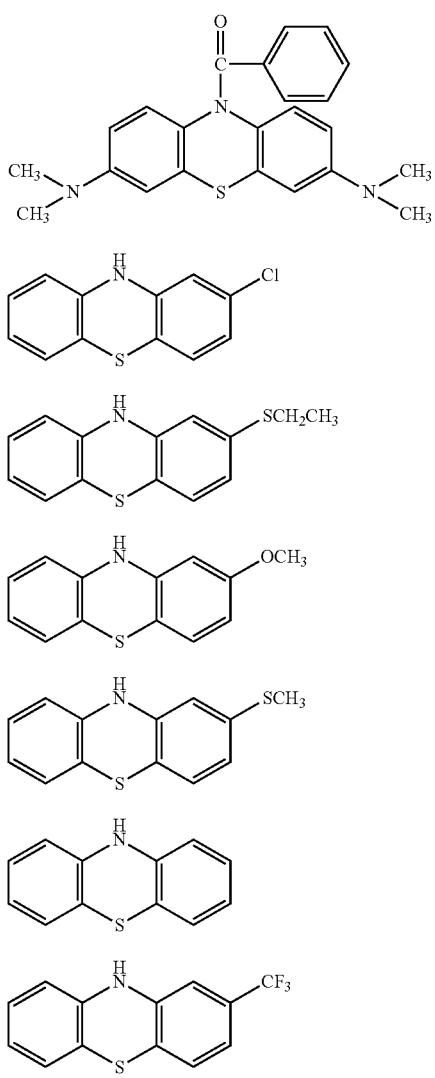

From the perspective of achieving both long-term storage stability and curability, the content of the phenol compounds, piperidine-1-oxyl compounds, nitro compounds, and phenothiazine compounds employed (the total quantity when multiple such compounds are employed in combination) is desirably equal to or higher than 1 ppm and equal to or lower than 500,000 ppm, preferably equal to or higher than 1 ppm and equal to or lower than 400,000 ppm, and more preferably, equal to or higher than 1 ppm and equal to or lower than 300,000 ppm, based on Copolymer A (solid component).

As for Polyurethane resin B that is radiation-curable polyurethane resin, its long-term storage stability can be maintained well without deterioration of curability by employing two types of components, one of which is selected from phenol compounds and the other of which is selected from piperidine-1-oxyl compounds, nitro compounds, benzoquinone compounds, and phenothiazine compounds. In the following descriptions, the phenol compound is referred to as "Component C" and at least one selected from the group consisting of piperidine-1-oxyl compounds, nitro compounds, benzoquinone compounds, and phenothiazine compounds is referred to as "Component D". The details of Components C and D are as described above. From the perspective of achieving both long-term storage stability and curability, the content of component C (the combined content when multiple compounds are employed) is desirably equal to or higher than 1 ppm and equal to or lower than 500,000 ppm, preferably equal to or higher than 1 ppm and equal to or lower than 400,000 ppm, more preferably equal to or higher than 1 ppm and equal to or lower than 300,000 ppm, and still more preferably, equal to or higher than 500 ppm and equal to or lower than 100,000 ppm relative to Polyurethane resin B (solid component). Additionally, from the perspective of achieving both long-term storage stability and curability, the content of component D (the combined content when multiple compounds are employed) is desirably equal to or higher than 1 ppm and equal to or lower than 500,000 ppm, preferably equal to or higher than 1 ppm and equal to or lower than 400,000 ppm, more preferably equal to or higher than 1 ppm and equal to or lower than 300,000 ppm, and still more preferably, equal to or higher than 1 ppm and equal to or lower than 500 ppm relative to the solid component of Polyurethane resin B.

Benzoquinone compounds and the other compounds described above can be added simultaneously or sequentially to the radiation-curable composition, or to the composition comprising the starting materials of Copolymer A or Polyurethane resin B. Benzoquinone compounds and the other compounds described above are desirably present in a system containing radiation-curable functional group-containing components, such as the synthesis reaction of Copolymer A or Polyurethane B, the reaction for incorporation of radiation-curable functional groups, and the like. The components that are added during the reaction are thought to perform the role of inhibiting the radiation-curable functional groups from reacting during the reaction and of enhancing storage stability without loss of curability when irradiated with radiation.

The various compounds described above can be synthesized by known methods or the above-described methods. Some of them are available as commercial products.

The solid component concentration of the radiation-curable composition is not specifically limited. From the perspective of ease of handling, it is preferably about 10 to 80 weight percent, more preferably, about 20 to 60 weight percent. The radiation-curable composition is employed to form the nonmagnetic layer, and so contains at least a nonmagnetic powder in addition to Copolymer A and Polyurethane resin B. The nonmagnetic powder can be either an organic or inorganic material. Carbon black and the like can also be employed. Examples of inorganic materials are metals, metal oxides, metal carbonates, metal sulfates, metal nitrides, metal carbides, and metal sulfides. These nonmagnetic powders are available as commercial products and can be manufactured by known methods.

Specifically, titanium oxides such as titanium dioxide, cerium oxide, tin oxide, tungsten oxide, ZnO, $ZrO_2$, $SiO_2$, $Cr_2O_3$, α-alumina with an α-conversion rate of 90 to 100 percent, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide may be employed singly or in combinations of two or more. α-iron oxide and titanium oxide are preferred.

The nonmagnetic powder may be acicular, spherical, polyhedral, or plate-shaped.

The crystallite size of the nonmagnetic powder preferably ranges from 4 nm to 1 μm, more preferably from 40 to 100 nm. The crystallite size within 4 nm to 1 μm can achieve good dispersibility and suitable surface roughness.

The average particle diameter of the nonmagnetic powder preferably ranges from 5 nm to 2 μm. As needed, nonmagnetic powders of differing average particle diameter may be combined; the same effect may be achieved by broadening the average particle distribution of a single nonmagnetic powder. The particularly preferred average particle diameter of the nonmagnetic powder ranges from 10 to 200 nm. Reference can be made to [0123] to [0132] of Japanese Unexamined Patent Publication (KOKAI) No. 2009-96798 for the nonmagnetic powder suitable for use in the magnetic recording medium of the present invention.

Carbon black may be combined with nonmagnetic powder in the nonmagnetic layer to reduce surface resistivity, reduce light transmittance, and achieve a desired micro-Vickers hardness. The micro-Vickers hardness of the nonmagnetic layer is normally 25 to 60 kg/mm$^2$, desirably 30 to 50 kg/mm$^2$ to adjust head contact. It can be measured with a thin film hardness meter (HMA-400 made by NEC Corporation) using a diamond triangular needle with a tip radius of 0.1 micrometer and an edge angle of 80 degrees as indenter tip. The light transmittance is generally standardized to an infrared absorbance at a wavelength of about 900 nm equal to or less than 3 percent. For example, in VHS magnetic tapes, it has been standardized to equal to or less than 0.8 percent. To this end, furnace black for rubber, thermal black for rubber, black for coloring, acetylene black and the like may be employed.

The specific surface area of the carbon black employed in the nonmagnetic layer is desirably 100 to 500 m$^2$/g, preferably 150 to 400 m$^2$/g. The DBP oil absorption capability is desirably 20 to 400 mL/100 g, preferably 30 to 200 mL/100 g. The particle diameter of the carbon black is preferably 5 to 80 nm, preferably 10 to 50 nm, and more preferably, 10 to 40 nm. It is preferable that the pH of the carbon black is 2 to 10, the moisture content is 0.1 to 10 percent, and the tap density is 0.1 to 1 g/mL. For example, the *Carbon Black Handbook* compiled by the Carbon Black Association, which is expressly incorporated herein by reference in its entirety, may be consulted for types of carbon black suitable for use in the nonmagnetic layer. These carbon blacks are commercially available.

Based on the objective, an organic powder may be added to the nonmagnetic layer. Examples of such an organic powder are acrylic styrene resin powders, benzoguanamine resin powders, melamine resin powders, and phthalocyanine pigments. Polyolefin resin powders, polyester resin powders, polyamide resin powders, polyimide resin powders, and polyfluoroethylene resins may also be employed. The manufacturing methods described in Japanese Unexamined Patent Publication (KOKAI) Showa Nos. 62-18564 and 60-255827 may be employed. The contents of the above publications are expressly incorporated herein by reference in their entirety.

Binder resins, lubricants, dispersing agents, additives, solvents, dispersion methods, and the like suited to the magnetic layer may be adopted to the nonmagnetic layer. In particular, known techniques for the quantity and type of binder resin and the quantity and type of additives and dispersion agents employed in the magnetic layer may be adopted thereto. In the nonmagnetic layer, Copolymer A and Polyurethane resin B are employed as a binder.

As set forth above, it is desirable to prevent the seepage of nonmagnetic layer components to ensure the reliability of the magnetic recording medium. Lubricant components are examples of components that may decrease running stability and increase fluctuation in reproduction output through seepage. The lubricant components in the nonmagnetic layer can exhibit the effect of maintaining a good lubricating effect over an extended period by migrating over time to the magnetic layer. However, excessive seepage due to thermoprocessing during the manufacturing process and pressure applied to the medium during storage is presumed to diminish running stability and increase fluctuation in reproduction output. By contrast, the fact that the present invention can effectively prevent seepage of nonmagnetic layer components as set forth above is thought to contribute to ensuring running stability and preventing an increase in the fluctuation in reproduction output. Examples of lubricant components that can be added to the nonmagnetic layer are fatty acids and/or their derivatives (such as fatty acid esters). Specific examples are described in paragraph [0111] of Japanese Unexamined Patent Publication (KOKAI) No. 2009-96798. The quantity of lubricant component that is added is, for example, 0.01 to 10 weight parts, desirably 0.05 to 6 weight parts, and preferably, 0.1 to 3 weight parts per 100 weight parts of nonmagnetic powder.

The radiation-curable composition can be prepared by mixing various components described above. The radiation that is irradiated in the curing reaction can be, for example, an electron beam or UV radiation. The use of an electron beam is desirable in that no polymerization initiator is required. The radiation can be irradiated by a known method. For the details, reference can be made to [0021] to [0023] in Japanese Unexamined Patent Publication (KOKAI) No. 2009-134838, for example. The content of the above publication is expressly incorporated herein by reference in its entirety. Known techniques such as those described in "UV•EB Curing Techniques" (published by the Sogo Gijutsu Center (Ltd.)), "Applied Techniques in Low-energy Electron Beam Irradiation" (2000, published by CMC (Ltd.)), and the like can be used for the radiation curing device and method of curing by irradiation. The contents of the above publications are expressly incorporated herein by reference in their entirety.

Magnetic Layer (i) Ferromagnetic Powder

The magnetic recording medium of the present invention comprises a magnetic layer containing a ferromagnetic powder and a binder on the nonmagnetic layer (radiation-cured layer) that has been formed by curing with radiation the above radiation-curable composition. Acicular ferromagnetic powder, platelike magnetic powder, spherical magnetic powder, or elliptical magnetic powder can be employed as the ferromagnetic powder. From the perspective of high-density recording, the average major axis length of the acicular ferromagnetic powder is desirably equal to or greater than 20 nm but equal to or lower than 50 nm and preferably equal to or greater than 20 nm but equal to or lower than 45 nm. The average plate diameter of the platelike magnetic powder is preferably equal to or greater than 10 nm but equal to or less than 50 nm as a hexagonal plate diameter. When employing a magnetoresistive head in reproduction, a plate diameter equal to or less than 40 nm is desirable to reduce noise. A plate diameter within the above range can yield stable magnetization without the effects of thermal fluctuation, and permit low noise, that is suited to the high-density magnetic recording. From the perspective of high-density recording, the average diameter of the spherical magnetic powder or elliptical magnetic powder is desirably equal to or greater than 10 nm but equal to or lower than 50 nm.

The average particle size of the ferromagnetic powder can be measured by the following method.

Particles of ferromagnetic powder are photographed at a magnification of 100,000-fold with a model H-9000 transmission electron microscope made by Hitachi and printed on photographic paper at a total magnification of 500,000-fold to obtain particle photographs. The targeted magnetic material is selected from the particle photographs, the contours of the powder material are traced with a digitizer, and the size of the particles is measured with KS-400 image analyzer software from Carl Zeiss. The size of 500 particles is measured. The average value of the particle sizes measured by the above method is adopted as an average particle size of the ferromagnetic powder.

The size of a powder such as the magnetic material (referred to as the "powder size" hereinafter) in the present invention is denoted: (1) by the length of the major axis constituting the powder, that is, the major axis length, when the powder is acicular, spindle-shaped, or columnar in shape (and the height is greater than the maximum major diameter of the bottom surface); (2) by the maximum major diameter of the tabular surface or bottom surface when the powder is tabular or columnar in shape (and the thickness or height is smaller than the maximum major diameter of the tabular surface or bottom surface); and (3) by the diameter of an equivalent circle when the powder is spherical, polyhedral, or of unspecified shape and the major axis constituting the powder cannot be specified based on shape. The "diameter of an equivalent circle" refers to that obtained by the circular projection method.

The average powder size of the powder is the arithmetic average of the above powder size and is calculated by measuring five hundred primary particles in the above-described method. The term "primary particle" refers to a nonaggregated, independent particle.

The average acicular ratio of the powder refers to the arithmetic average of the value of the (major axis length/minor axis length) of each powder, obtained by measuring the length of the minor axis of the powder in the above measurement, that is, the minor axis length. The term "minor axis length" means the length of the minor axis constituting a powder for a powder size of definition (1) above, and refers to the thickness or height for definition (2) above. For (3) above, the (major axis length/minor axis length) can be deemed for the sake of convenience to be 1, since there is no difference between the major and minor axes.

When the shape of the powder is specified, for example, as in powder size definition (1) above, the average powder size refers to the average major axis length. For definition (2) above, the average powder size refers to the average plate diameter, with the arithmetic average of (maximum major diameter/thickness or height) being referred to as the average plate ratio. For definition (3), the average powder size refers to the average diameter (also called the average particle diameter).

Reference can be made to [0097] to [0110] of Japanese Unexamined Patent Publication (KOKAI) No. 2009-96798 for the details of the above-described magnetic powders.

(ii) Additives

Additives may be added to the magnetic layer as needed. Examples of such additives are: abrasives, lubricants, dispersing agents, dispersing adjuvants, antifungal agents, antistatic agents, oxidation inhibitors, and solvents. Reference can be made to [0111] to [0115] of Japanese Unexamined Patent Publication (KOKAI) No. 2009-96798 for the details, such as specific examples, of the additives.

Carbon black may be added to the magnetic layer as needed. Examples of types of carbon black that are suitable for use in the magnetic layer are: furnace black for rubber, thermal for rubber, black for coloring, and acetylene black. It is preferable that the specific surface area is 100 to 500 $m^2/g$ (more preferably 150 to 400 $m^2/g$), the DBP oil absorption capacity is 20 to 400 ml/100 g (more preferably 30 to 200 ml/100 g), the particle diameter is 5 to 80 nm (more preferably 10 to 50 nm), the pH is 2 to 10, the moisture content is 0.1 to 10 percent, and the tap density is 0.1 to 1 g/ml. For example, the *Carbon Black Handbook* compiled by the Carbon Black Association, which is expressly incorporated herein by reference in its entirety, may be consulted for types of carbon black suitable for use in the magnetic layer. These carbon blacks are commercially available.

The types and quantities of the additives employed in the magnetic layer may differ from those employed in the nonmagnetic layer, described further below, in the present invention. All or some part of the additives employed in the present invention can be added in any of the steps during the manufacturing of coating liquids for the magnetic layer and nonmagnetic layer. For example, there are cases where they are mixed with the ferromagnetic powder prior to the kneading step; cases where they are added during the step in which the ferromagnetic powder, binder, and solvent are kneaded; cases where they are added during the dispersion step; cases where they are added after dispersion; and cases where they are added directly before coating.

Conventionally known thermoplastic resins, thermosetting resins, reactive resins, and mixtures thereof can be employed as the binder used to form the magnetic layer. Reference can be made to paragraphs [0014] to [0020] in Japanese Unexamined Patent Publication (KOKAI) No. 2005-222644, for example, for details. Copolymer A and/or Polyurethane resin B can also be employed to form a radiation-cured magnetic layer. From the perspective of achieving both a high fill rate of ferromagnetic powder and a strong magnetic layer, the quantity of binder in the magnetic layer is desirably equal to or more than 5 weight parts and equal to or less than 30 weight parts, preferably equal to or more than 10 weight parts and equal to or less than 20 weight parts, per 100 weight parts of ferromagnetic powder. These quantities can also be applied to the binder employed in the nonmagnetic layer.

When the nonmagnetic layer is of low curability and the magnetic layer is cured by thermoprocessing, the thermoprocessing may cause large quantities of nonmagnetic layer components to seep out onto the surface of the magnetic layer. By contrast, in the present invention, since the nonmagnetic layer is formed as set forth above with Copolymer A of high curability, even when the upper magnetic layer is cured by thermoprocessing, seepage of large quantities of nonmagnetic layer components onto the surface of the magnetic layer can be prevented. This is thought to contribute to enhancing the reliability of the medium obtained.

Backcoat Layer

The magnetic recording medium of the present invention sequentially comprises on one surface of a nonmagnetic support a nonmagnetic layer containing a nonmagnetic powder and a binder and a magnetic layer containing a ferromagnetic powder and a binder, and comprises on the other surface thereof a backcoat layer. It is possible to prevent a drop in the surface smoothness of the magnetic layer due to reverse transfer by incorporating filler particles with an average primary particle diameter (D50) of 0.05 to 1.0 μm, selected from the group consisting of organic polymer particles and inorganic colloidal particles, into the backcoat layer.

The average primary particle diameter (D50) of the filler particles refers to the diameter of particles accounting for 50 percent of the total volume when converted to volumes from the large particle side. In Examples set forth further below, the D50 of the filler particles is calculated prior to their addition to the backcoat layer coating liquid. However, the sample particles that are used for D50 measurement need only be particles that permit measurement of the particle diameter of primary particles, and can be sample powder collected from the backcoat layer or starting material powder. For example, the following method can be used to collect sample powder from the backcoat layer.

Method of Collecting Sample Powder

1. The surface of the backcoat layer is reacted for 1 to 2 minutes in a plasma reactor made by Yamato Scientific Co., Ltd., and the organic components (binder component and the like) of the surface of the magnetic layer are removed as ash.

2. A filter paper with immersion of an organic solvent such as cyclohexanone or acetone is adhered to an edge of a metal rod, the backcoat layer surface following the treatment in 1. above is rubbed against it, and the backcoat layer component is transferred to the filter paper from the magnetic recording medium and separated.

3. The components separated in 2. above are shaken off in a solvent such as cyclohexanone or acetone (each piece of filter paper is placed in the solvent and an ultrasonic disperser is used to shake off the components), the solvent is dried, and the separated components are collected.

4. The components that were scraped off in 3. above are charged to a glass test tube that has been thoroughly cleaned, n-butylamine is added to about 20 mL of the backcoat layer component, and the glass test tube is sealed. (A quantity of n-butyl amine that is capable of breaking down the remaining binder without ashing is added.)

5. The glass test tube is heated to 170° C. for 20 hours or more to break down the binder and curing agent components.

6. The precipitate following the decomposition of 5. above is thoroughly washed with pure water and dried, and the powder is collected.

The above steps permit the collection of a sample powder from the backcoat layer.

The filler particles employed in the backcoat layer in the present invention are selected from the group consisting of organic polymer particles and inorganic colloidal particles. These particles are capable of remaining present as substantially primary particles without undergoing aggregation in the backcoat layer. Thus, adding particles with an average primary particle diameter (D50) falling within the specified range permits the formation of protrusions that are suitable for maintaining running stability on the surface of the backcoat layer without reverse transfer. Even were filler particles with a D50 exceeding 1.0 µm capable of remaining present as substantially primary particles in the backcoat layer, they would diminish the smoothness of the magnetic layer surface by reverse transfer. Additionally, filler particles with a D50 that is lower than 0.05 µm are somewhat difficult to obtain, and even if they were to be obtained, would not readily form protrusions capable of maintaining running stability on the surface of the backcoat layer. Accordingly, the D50 of the filler particles of the backcoat layer in the present invention is set to a range of 0.05 to 1.0 µm, as set forth above. From the perspective of both preventing reverse transfer and maintaining running stability, the D50 is desirably 0.1 to 0.7 µm, preferably 0.1 to 0.6 µm, and more preferably, 0.2 to 0.5 µm. From the perspective of forming suitable protrusions on the backcoat layer, the average primary particle diameter (D50) of these particles is desirably 0.2 to 1.5-fold the film thickness of the backcoat layer, preferably 0.3 to 1.3-fold, and more preferably, 0.5 to 1.2-fold.

Due to good dispersion stability, the filler particles are capable of substantially remaining present as primary particles without forming aggregates in the backcoat layer. In the present invention, the phrase "substantially remaining present as primary particles" means that the number of spots in which the particles are present with structures and/or in the form of secondary aggregates is equal to or less than two per hundred when the state of the presence of the particles in the backcoat layer is observed by surface observation and sectional observation by scanning electron microscope (SEM) in 100 randomly selected spots in the backcoat layer. As a result of the filler particles having a D50 falling within the above-stated range that are capable of remaining present in this state, it is possible to prevent the shape of the coarse protrusions on the surface of the backcoat layer from being transferred to the surface of the magnetic layer (reverse transfer) and creating large indentations in the surface of the magnetic layer in a magnetic recording medium that has been wound up into a roll with a core, a cassette hub, or the like during the manufacturing process, aging (thermoprocessing), storage, or the like.

The particle size distribution of these filler particles in the form of primary particles is desirably narrow. This is because when the particle size distribution is broad, the frequency of the presence of primary particles the size of which diverges greatly from the average primary particle diameter increases, and such particles tend to form large indentations in the surface of the magnetic layer. Conversely, the narrower the particle size distribution, the easier it is to form protrusions of extremely uniform size and shape on the surface of the backcoat layer. Thus, it is possible to enhance the effect on improving running stability, such as adjust the coefficient of friction in manufacturing steps that involve contact with the surface of the backcoat layer, adjust the coefficient of friction with the drive system, and prevent failed winding due to accompanying air in the process of winding the tape, and to reduce the increase in large indentations on the surface of the magnetic layer. The particle size distribution value (D25/D75) can be employed as an index of the particle size distribution. The particle size distribution value (D25/D75) is obtained by converting to volumes from the large particle side and calculating the ratio (D25/D75) of the particle diameters accounting for 25 percent to the particle diameters accounting for 75 percent of the total volume. For the above reasons, the lower the particle size distribution value (D25/D75), the better. It is desirably equal to or lower than 2.0, preferably equal to or lower than 1.5, more preferably equal to or lower than 1.3, and optimally, equal to or lower than 1.2.

It is desirable to grade the particles to control the average primary particle diameter and the particle size distribution of the particles. A known dry grading method or wet grading method can be employed for grading. From the perspective of effectively adjusting the average primary particle diameter and particle size distribution, a wet grading method is particularly desirable.

The particles are desirably irregular, approximately spherical, or spherical in shape; preferably approximately spherical or spherical; and more preferably, spherical. When the particles have such a shape, it is possible to form protrusions that are extremely uniform in shape on the surface of the backcoat layer.

In one embodiment, the filler particles are organic polymer particles. Organic polymer particles with poor solubility in the organic solvent (a ketone such as methyl ethyl ketone, methyl isobutyl ketone, or cyclohexanone; an alcohol solvent such as methanol, ethanol, or isopropyl alcohol; toluene; or the like) that is employed to prepare the backcoat layer coating liquid are desirably employed. From this perspective, examples of desirable organic polymer particles are those with structural components in the form of at least one component selected from among acrylic, styrene, divinylbenzene, benzoguanamine, melamine, formaldehyde, butadiene, acrylonitrile, chloroprene, and fluoropolymers. Organic polymer particles comprising a structural component in the form of at least one component selected from the group consisting of acrylic, styrene, divinylbenzene, benzoguanamine, melamine, formaldehyde, butadiene, acrylonitrile, and chloroprene are desirable. Polymer particles containing acrylic, styrene, or divinylbenzene are preferred. And polymer particles containing acrylic or styrene are of greater preference.

The organic polymer particles are desirably thermoplastic. The surface of the magnetic layer of the magnetic recording medium has a particular tendency to develop indentations in the course of thermoprocessing a magnetic recording medium that is wound into a roll with a core, a cassette hub, or the like. This is because thermoprocessing causes the nonmagnetic support to contract, increasing the surface pressure on the contact surface of the magnetic layer and the backcoat layer. By employing thermoplastic polymer particles, in the course of thermoprocessing a magnetic recording medium that is wound up into a roll with a core, a cassette hub, or the like, the shape of the polymer particles changes with the surface pressure exerted between the magnetic layer and the backcoat layer, allowing the surface of the magnetic layer to undergo a reduction in the pressure applied by the protrusions formed by the polymer particles. As a result, the transfer (reverse transfer) of the protrusion on the surface of the backcoat layer to the surface of the magnetic layer and the formation of large indentations on the surface of the magnetic layer can be effectively reduced.

The seed polymerization method is a suitable for producing polymer particles with an extremely low particle size distribution value and an average primary particle diameter (D50) of equal to or less than 1.0 µm. The seed polymerization method refers to a method of obtaining organic polymer particles by conducting emulsification polymerization while inducing adsorption of a crosslinkable or polymerizable monomer to seed particles in an aqueous dispersion containing seed particles. The organic polymer particles prepared by the seed polymerization method desirably employed in the present invention, and the method of preparing them, are described, for example, in paragraphs [0011] to [0041] in Japanese Unexamined Patent Publication (KOKAI) No. 2005-54108; in Examples described therein; in paragraphs [0007] to [0036] of Japanese Unexamined Patent Publication (KOKAI) No. 2005-281484; and in Examples described therein. The contents of the above publications are expressly incorporated herein by reference in their entirety. The organic polymer particles (crosslinked polymer particles) having such a crosslinked structure that are obtained by these seed polymerization methods are desirable because they are generally highly spherical and tend not to cause reverse transfer.

Various additives (such as emulsifying agents such as surfactants, polymerization initiators, chain-transferring agents, and polymerization-inhibiting agents) are employed in the process of fabricating the organic polymer particles. Such additives and by-products produced in the process of preparing the polymer particles (such as uncrosslinked monomers and polymers) can potentially cause various harm (such as transfer of additives or by-products from the backcoat layer to the magnetic layer, causing deterioration of electromagnetic characteristics) in the preparation of the magnetic recording medium. Accordingly, they are desirably removed prior to addition to the backcoat layer. For example, it is desirable to clean the organic polymer particles with water or an organic solvent in which the polymer particles are insoluble to remove such additives and by-products.

Such organic polymer particles can be employed in the form of commercial products. Examples of commercial organic polymer particles are Chemisnow made by Soken Chemical & Engineering Co., Ltd. (crosslinked acrylic particles, crosslinked polystyrene particles, and the like), Advancell made by Sekisui Chemical Co., Ltd. (crosslinked acrylic particles and the like), Epostar made by Nippon Shokubai Co., Ltd. (melamine-formaldehyde condensation particles and the like), Liosphere made by Toyo Ink Mfg. Co., Ltd. (crosslinked acrylic particles and the like), and Finespheres made by Nippon Paint Co., Ltd. (crosslinked acrylic particles, crosslinked polystyrene particles, and the like).

Inorganic colloidal particles can also be employed as the filler particles. From the perspective of availability, inorganic oxide colloidal particles are desirable. Examples of inorganic oxide colloidal particles are inorganic oxide colloidal particles such as $SiO_2$, $Al_2O_3$, $TiO_2$, $ZrO_2$, and $Fe_2O_3$; and compound inorganic oxide colloidal particles such as $SiO_2.Al_2O_3$, $SiO_2.B_2O_3$, $TiO_2.CeO_2$, $SnO_2.Sb_2O_3$, $SiO_2.Al_2O_3.TiO_2$, and $TiO_2.CeO_2.SiO_2$. Desirable examples are inorganic oxide colloidal particles such as $SiO_2$, $Al_2O_3$, $TiO_2$, $ZrO_2$, and $Fe_2O_3$. From the perspective of the availability of colloidal particles of high dispersion stability, silica colloidal particles (colloidal silica) are preferred.

Since the surfaces of most colloidal particles are hydrophilic, they are suited to the preparation of colloidal solutions with water as the dispersion medium. For example, since the surface of colloidal silica obtained by common synthesis method is covered with polarized oxygen atoms ($O^{2-}$), they adsorb water in water, forming hydroxyl groups and stabilizing. However, these particles tend not to exist unaltered as colloids in the organic solvents that are employed in magnetic recording medium coating liquids. Accordingly, to permit the dispersion in colloidal form of these particles in organic solvents, the surface of the particles is treated to render it hydrophobic. In the present invention, it is also desirable to employ colloidal particles that have been treated to render them hydrophobic. The details of the hydrophobic treatment are described in, for example, Japanese Unexamined Patent Publication (KOKAI) Heisei No. 5-269365, Japanese Unexamined Patent Publication (KOKAI) Heisei No. 5-287213, and Japanese Unexamined Patent Publication (KOKAI) No. 2007-63117. The contents of the above publications are expressly incorporated herein by reference in their entirety. Colloidal particles that have been rendered hydrophobic by such a surface treatment can be synthesized by the above-cited methods and the like, and are available as commercial products.

The above-described filler particles can be employed singly, or multiple types can be combined for use. The addition of the filler particles to the backcoat layer in a proportion of 0.05 to 2 weight parts per 100 weight parts of binder is desirable to obtain protrusions of a shape that is suited to maintaining running stability.

In the magnetic recording medium of the present invention, it is desirable not to incorporate particles other than the above filler particles as components that form protrusions for imparting running stability to the backcoat layer surface. However, particulate components can be incorporated into the backcoat layer to impart various additional functions. For example, carbon black can be added to impart electrical conductivity to the backcoat layer to prevent the adhesion of dust and the like due to charge buildup. However, carbon black normally has a broad particle size distribution and tends to form readily aggregating structures and secondary aggregates as set forth above. Accordingly, the carbon black that is added to the backcoat layer to impart electrical conductivity is desirably of a particle size that will not form protrusions on the surface of the backcoat layer even if it does aggregate. Normally, carbon black with a specific surface area of equal to or higher than 30 $m^2$/g will tend not to form protrusions on the surface of the backcoat layer. Thus, the specific surface area of the carbon black that is added to the backcoat layer is desirably equal to or higher than 30 m$^2$/g. That is, carbon black with a specific surface area of less than 30 m$^2$/g is desirably not incorporated into the backcoat layer of the magnetic recording medium of the present invention.

The specific surface area of carbon black employed in the backcoat layer is desirably equal to or higher than 50 m$^2$/g, preferably equal to or higher than 100 m$^2$/g, and more preferably, equal to or higher than 150 m$^2$/g. These carbon blacks are desirably added by a method that is capable of greatly reducing the formation of structures and secondary aggregates, such as by adding a preliminary dispersion step. For similar reasons, the quantity of carbon black that is added to the backcoat layer is desirably about 50 to 200 weight parts per 100 weight parts of binder.

The carbon blacks that are commonly employed in magnetic recording media can be widely employed as the carbon black that is added to the backcoat layer. For example, furnace black for rubber, thermal for rubber, black for coloring, and acetylene black can be employed. A DBP oil absorption capacity of 60 to 400 mL/100 g, a pH of 2 to 10, a moisture content of 0.1 to 10 percent, and a tap density of 0.1 to 1 g/cc are desirable. For example, the *Carbon Black Handbook* compiled by the Carbon Black Association can be consulted for carbon blacks that can be employed in a backcoat layer. Specific examples of commercially available carbon blacks are #60, #70, #80, and F200 made by Asahi Carbon; #2400B, #2300, #900, #1000, #30, and #40 made by Mitsubishi Chemical Corporation; N110, N220, N330, IP1000, and IP2000 made by Showa Cabot; and schist 9, 5H, 6, 3, and 116 made by Tokai Carbon Co., Ltd. The carbon black can be subjected to a surface treatment with a dispersing agent or the like. Further, the carbon black can be grafted with resin for use. A portion of the surface of the carbon black can be treated with graphite for use. Further, the carbon black can be dispersed in a binder in advance. These carbon blacks can be employed singly, or multiple types can be combined for use.

Inorganic powder can be added to the backcoat layer to enhance the resistance to scratching of the backcoat layer. However, the inorganic powder is desirably added in microparticulate form in a small enough quantity not to form coarse protrusions on the surface of the backcoat layer. Specifically, an inorganic powder with an average particle diameter of about 0.05 to 0.25 μm is desirably added in a quantity of 0.2 to 0.5 weight parts per 100 weight parts of binder. The inorganic powder is desirably employed in the form of an inorganic powder with a Mohs' hardness of 5 to 9, such as α-iron oxide, α-alumina, chromium oxide ($Cr_2O_3$), and $TiO_2$. The use of α-iron oxide and α-alumina is preferred.

Binder is desirably incorporated into the backcoat layer along with the filler particles, carbon black, microparticulate inorganic powder, and the like to impart strength to coatings. The quantity of binder that is employed excluding the curing agent desirably falls within a range of 40 to 200 weight parts, preferably 60 to 180 weight parts, and more preferably, 80 to 160 weight parts per 100 weight parts of the combined particulate components in the form of the filler particles, carbon black, microparticulate inorganic powder, and the like. Known thermoplastic resins, thermosetting resins, reactive resins, and the like can be employed as binder in the backcoat layer. A curing agent such as a polyisocyanate compound can be employed with the binder. The quantity thereof can be suitably determined.

Incorporating the above-described filler particles into the backcoat layer permits the presence of protrusions that are suitable for adjusting the coefficient of friction in manufacturing steps and the coefficient of friction with drive systems, for preventing failed winding due to accompanying air during the tape winding process, to enhance running stability, and to reduce reverse transfer. The center line average surface roughness (Ra) of a backcoat layer having such protrusions is desirably 3 to 30 nm, preferably 5 to 25 nm, more preferably 7 to 20 nm, and still more preferably, 10 to 20 nm.

As set forth above, the presence of coarse protrusions on the surface of the backcoat layer causes reverse transfer. Thus, no coarse protrusions are desirably present on the surface of the backcoat layer. Specifically, it is desirable for protrusions that are equal to or greater than 150 nm in height not to be present on the surface of the backcoat layer. It is desirable for 1 to 100 protrusions, preferably 1 to 50 protrusions, more preferably 1 to 25 protrusions, and still more preferably, 1 to 15 protrusions that are 100 to 150 nm in height to be present per 0.1 m$^2$ of surface area. It is desirable for protrusions with an equivalent circular diameter of equal to or greater than 4 μm not to be present. It is preferable for protrusions with an equivalent circular diameter of equal to or greater than 3 μm not to be present, more preferably for protrusions with a circular equivalent diameter of equal to or greater than 2 μm not to be present, and still more preferably for protrusions with a circular diameter of equal to or greater than 1.5 μm not to be present. The centerline average surface roughness (Ra) and number of protrusions of the backcoat layer can be evaluated with a known atomic force microscope (AFM). The protrusions on the surface of the backcoat layer can be controlled by means of the average primary particle diameter and quantity of the above-described filler particles that is added. It is also possible to reduce the indentations due to reverse transfer to the surface of the magnetic layer that cause dropout, deterioration in the error rate, and a drop in the S/N ratio through such control.

Nonmagnetic Support

The various supports that are commonly employed in magnetic recording media can be employed as the nonmagnetic support. Reference can be made to paragraphs [0061] to [0065] in Japanese Unexamined Patent Publication (KOKAI) No. 2005-222644 for nonmagnetic supports that can be employed in the present invention. The nonmagnetic supports comprised primarily of PEN that are described in Japanese Unexamined Patent Publication (KOKAI) No. 2005-329548, Japanese Unexamined Patent Publication (KOKAI) No. 2005-330311, and the like can also be employed. The contents of the above publications are expressly incorporated herein by reference in their entirety.

Layer Structure

The thickness of the nonmagnetic support in the magnetic recording medium of the present invention is desirably 3 to 80 μm. The thickness of the backcoat layer is desirably 0.1 to 1.0 μm, preferably 0.2 to 0.6 μm, to form suitable surface protrusions by adding the above-described filler particles.

The thickness of the magnetic layer is desirably optimized based on the saturation magnetization of the head employed, the length of the head gap, and the recording signal band, and is normally 0.01 to 0.10 μm, preferably 0.02 to 0.08 μm, and more preferably, 0.03 to 0.08 μm. The thickness variation in the magnetic layer is preferably within ±50 percent, more preferably within ±40 percent. At least one magnetic layer is sufficient. The magnetic layer may be divided into two or more layers having different magnetic characteristics, and a known configuration relating to multilayered magnetic layer may be applied.

The thickness of the nonmagnetic layer is desirably 0.2 to 3.0 μm, preferably 0.3 to 2.5 μm, and further preferably, 0.4 to 2.0 μm. The nonmagnetic layer is effective so long as it is substantially nonmagnetic. For example, it exhibits the effect of the present invention even when it comprises impurities or trace amounts of magnetic material that have been intentionally incorporated, and can be viewed as substantially having the same configuration as the magnetic recording medium of the present invention. The term "substantially nonmagnetic" is used to mean having a residual magnetic flux density in the nonmagnetic layer of equal to or less than 10 mT, or a coercivity of equal to or less than 7.96 kA/m (100 Oe), it being preferable not to have a residual magnetic flux density or coercivity at all.

The magnetic recording medium of the present invention may have a smoothing layer, adhesive layer, and the like, in addition to the magnetic layer, nonmagnetic layer, and backcoat layer. Known techniques regarding these layers can be applied.

Manufacturing Method

The steps for manufacturing coating liquids for forming the various layers such as the magnetic layer, the nonmagnetic layer, and the backcoat layer desirably include at least a kneading step, dispersing step, and mixing steps provided as needed before and after these steps. Each of these steps may be divided into two or more stages. All of the starting materials such as the ferromagnetic powder, nonmagnetic powder, filler particles, inorganic powder, binder, carbon black, abrasives, antistatic agents, lubricants, solvents and the like that are employed in the present invention can be added at the beginning or part way through any of the steps. Individual starting materials can be divided into smaller quantities and added in two or more increments. To prepare coating liquids for forming the various layers, conventionally known manufacturing techniques may be utilized for some of the steps. A kneader having a strong kneading force, such as an open kneader, continuous kneader, pressure kneader, or extruder is preferably employed in the kneading step. When a kneader is employed, the binder (preferably equal to or higher than 30 weight percent of the entire quantity of binder) can be kneaded in a range of 15 to 500 parts per 100 parts of the ferromagnetic powder or nonmagnetic powder. Details of the kneading process are described in Japanese Unexamined Patent Publication (KOKAI) Heisei Nos. 1-106338 and 1-79274, which are expressly incorporated herein by reference in their entirety. Further, glass beads may be employed to disperse the coating liquids for various layers. Other than glass beads, dispersing media with a high specific gravity such as zirconia beads, titania beads, and steel beads are suitable for use. The particle diameter and fill ratio of these dispersing media can be optimized for use. A known dispersing device may be employed.

In the method of manufacturing the magnetic recording medium of the present invention, for example, a nonmagnetic layer coating liquid is coated and radiation cured to a prescribed thickness on the surface of a running nonmagnetic support to form a nonmagnetic layer (radiation-cured layer). Next, a magnetic layer coating liquid is coated thereover to a prescribed film thickness to form a magnetic layer. Multiple magnetic layer coating liquids can also be sequentially or simultaneously multilayer coated.

As set forth above, when sequentially multilayer coating a lower nonmagnetic layer coating liquid and an upper magnetic layer coating liquid, the nonmagnetic layer will sometimes partially dissolve in the solvent contained in the magnetic layer coating liquid. Here, assuming that the nonmagnetic layer is being formed as a radiation-cured layer from the above radiation-curable composition, since the radiation-curable components in the nonmagnetic layer are polymerized and crosslinked to a high molecular weight by irradiation with radiation, dissolution in the solvent contained in the magnetic layer coating liquid can be prevented or reduced. Accordingly, the upper magnetic layer is desirably formed by coating the magnetic layer coating liquid on a nonmagnetic layer that has been cured. Since the nonmagnetic layer is highly curable and mixing at the interface with the magnetic layer can be prevented, advantages can be achieved in that a decrease in the smoothness of the surface of the magnetic layer due to interface fluctuation and a drop in the coating strength of the magnetic layer due to the tendency of magnetic layer components to penetrate into the nonmagnetic layer can be prevented.

The coating machine used to apply the magnetic layer coating liquid or nonmagnetic layer coating liquid can be an air doctor coater, blade coater, rod coater, extrusion coater, air knife coater, squeeze coater, dip coater, reverse roll coater, transfer roll coater, gravure coater, kiss coater, cast coater, spray coater, spin coater or the like. Reference can be made to the "Most Recent Coating Techniques" (May 31, 1983) released by the Sogo Gijutsu Center (Ltd.), which are expressly incorporated herein by reference in their entirety, for these coating machines.

Further, when the magnetic layer is formed by the sequential multilayer method, it is desirable to employ a coating method in which two slits are provided in the form of a coating-use slit and a recovery-use slit, the coating liquid is discharged through the coating-use slit, and the excess quantity of coating liquid that has been applied in excess to the web is recovered by aspiration through the recovery-use slit. Further, in this coating method, the pressure conditions are desirably optimized in the course of aspirating the excess coating liquid through the recovery-use slit to obtain a thinner, more uniformly coated magnetic layer free of irregularities.

Specifically, the nonmagnetic layer and magnetic layer are formed on a continuously running nonmagnetic support. In the course of coating the magnetic layer coating liquid, the magnetic layer coating liquid that is fed into the coating head is discharged onto the nonmagnetic layer through the coating-use slit of the coating head in a quantity exceeding the coating quantity required to form the magnetic layer to the desired thickness with the nonmagnetic layer that has been formed on the nonmagnetic support in a state of close proximity to the surface of the lip on the tip of the coating head, and the magnetic layer coating liquid that is being applied in excess is aspirated through the recovery-use slit provided downstream from the coating-use slit as viewed from the running direction of the nonmagnetic support. At that time, denoting the liquid pressure of the aspiration opening of the recovery-use slit as P (MPa), aspiration of the magnetic layer coating liquid through the recovery-use slit is desirably conducted so as to satisfy equation (I) below.

$$0.05\ (MPa) > P \geq 0\ (MPa) \quad\quad (I)$$

Further, in the above coating method, when the magnetic layer coating liquid that is applied in excess is aspirated by a suction pump, denoting the pressure on the aspiration opening side of the aspiration pump as PIN (MPa), aspiration of the magnetic layer coating liquid is desirably conducted so as to satisfy equation (II) below.

$$PIN \geq -0.02\ (MPa) \quad\quad (II)$$

Details of the above coating method are described in Japanese Unexamined Patent Publication (KOKAI) No. 2003-236452, which is expressly incorporated herein by reference in its entirety.

In the course of forming the radiation-cured layer, the coating layer that has been formed by coating the coating liquid is cured by being irradiated with radiation. The details of the process of irradiation with radiation are as set forth above. Further, warm air can be blow onto the medium following the coating step over the coating liquid that has been applied to dry it. The temperature of the dry air is desirably equal to or higher than 60° C. The flow rate of the dry air can be suitably set based on the temperature of the dry air and the quantity of coating liquid that is used to form each layer. Following coating of the magnetic layer coating liquid, suitable predrying can be conducted prior to introduction into a magnet zone for orientation.

Following the formation of the various layers as set forth above, the magnetic recording medium is normally processed with a calender to enhance the electromagnetic characteristics by smoothening the surface on the side on which the magnetic layer is present. The rolls of the calender can be in the form of metal rolls or plastic rolls that are resistant to heat, such as epoxy, polyimide, polyamide, or polyimide-amide rolls. The processing temperature during calendering is desirably equal to or higher than 50° C., preferably equal to or higher than 90° C. The linear pressure during calendering is desirably equal to or higher than 200 kg/cm (196 kN/m), preferably equal to or higher than 300 kg/cm (294 kN/m).

Further, the magnetic recording medium can be thermoprocessed to enhance dimensional stability in the use environment, and to further cure the magnetic layer, backcoat layer, or the like to which the thermosetting curing agent has been added. The thermoprocessing temperature is desirably suitably adjusted based on the objective to within a range of 50 to 80° C., for example. To increase productivity, the thermoprocessing is desirably conducted by winding the magnetic recording medium into a roll with a core. Further, the magnetic recording medium is desirably wound into a roll with a core for implementation prior to being cut into tape form. The calendering can be conducted before thermoprocessing of the magnetic recording medium, after thermoprocessing, or both before and after thermoprocessing.

Conventionally, pronounced reverse transfer tends to occur when thermoprocessing is conducted in roll form. However, in the present invention, the coarse protrusions that cause reverse transfer of the backcoat layer surface can be reduced as set forth above, so a magnetic recording medium with a magnetic layer with a highly smooth surface can be obtained even by thermoprocessing in roll form. Further, as set forth above, the forming of a radiation-cured layer with high curability as the nonmagnetic layer can prevent the migration of nonmagnetic layer components to the magnetic layer side due to heating during thermoprocessing, drying, and calendering.

The magnetic recording medium that is obtained can be then cut to desired size for use with a cutter, punch, or the like. In the case of a magnetic recording medium in the form of a tape, a magnetic recording medium can be obtained by sequentially or continuously forming a nonmagnetic layer and magnetic layer on a nonmagnetic support that is continuously fed from a roll of nonmagnetic support stock material, the web of the magnetic recording medium can be wound to prepare a roll of magnetic recording medium stock material, and the magnetic recording medium web of the roll of magnetic recording medium stock material is desirably cut into tape form to obtain a magnetic recording medium tape.

For the backcoat layer, it is possible to form a backcoat layer on the back surface of the nonmagnetic support in advance, and feed the nonmagnetic support on which the backcoat layer has been formed from a roll of nonmagnetic support stock material. After feeding the nonmagnetic support from the roll of nonmagnetic support stock material, it is possible to form the nonmagnetic layer and magnetic layer, and to apply the backcoat layer to the reverse surface of the nonmagnetic support while the web of the magnetic recording medium is being wound onto a roll of magnetic recording medium stock material.

The magnetic recording medium of the present invention as set forth above is suitable as a high-capacity data backup tape that can both reduce the smoothness of the magnetic layer surface due to reverse transfer and ensure reliability (ensure running stability and prevent reproduction output fluctuation).

EXAMPLES

The present invention will be described in detail below based on Examples. However, the present invention is not limited to the examples. The "parts" and "percent" given in Examples are weight parts and weight percent unless specifically stated otherwise. The $^1$H-NMR measurement described below was conducted with a 400 MHz NMR (AvanceII-400 made by Bruker).

1. Preparation Examples and Evaluation of Radiation-Curable Vinyl Chloride Copolymer Preparation Example 1-1

(1) Polymerization of Vinyl Chloride Copolymer

Vinyl chloride: 100 parts,
Allyl glycidyl ether: 11.9 parts,
2-Hydroxypropyl methacrylate: 4.1 parts,
Allyl-2-hydroxyethyl ether: 3.6 parts
Sodium lauryl sulfate: 0.8 part, and
Water: 117 parts
were charged and stirred at 50° C.
Subsequently,
Potassium persulfate: 0.6 part
was charged and emulsification polymerization was begun. Following reaction for 10 hours, cooling was conducted when the pressure in the polymerization apparatus had reached 2 kg/cm$^2$. The unreacted vinyl chloride was recovered, after which the product was drained, washed, and dried, yielding a vinyl chloride copolymer (1) with a copolymer ratio (mol percent) of:
Vinyl chloride: 93.0 mol percent,
Allyl glycidyl ether: 4.0 mol percent,
2-Hydroxypropyl methacrylate: 1.0 mol percent,
Allyl-2-hydroethyl ether: 1.0 mol percent,
Units in which the ring of the epoxy group in the allyl glycidyl ether had been opened with sulfuric acid: 1.0 mol percent.

(2) Reaction Introducing a Radiation-Curable Functional Group

To a two-liter flask was added 416 g of a 30 percent cyclohexanone solution of vinyl chloride copolymer (1) (solid component 124.8 g) and the solution was stirred at 210 rpm. Next, 0.28 g of 1,4-benzoquinone (2.60 mol, 20,000 ppm) was added, stirred, and dissolved.

Next, 0.125 g of dibutyltin dilaurate was added as a reaction catalyst and the mixture was stirred while raising the temperature to 40 to 50° C. Next, 13.75 g (0.09 mol) of 2-methacryloyloxyethyl isocyanate (MOI made by Showa Denko K.K.) was added dropwise over 30 minutes as a radiation-curable functional group-incorporating component. When the dropwise addition had been completed, the mixture was stirred for 2 hours at 40° C. and cooled to room temperature, yielding a resin solution (radiation-curable composition) comprising a radiation-curable functional group (methacryloyloxy group)-containing vinyl chloride copolymer (Specific Example Compound (1)).

$^1$H-NMR data and assignments are given below for the radiation-curable function group (methacryloyloxy group)-containing vinyl chloride copolymer.

Radiation-curable function group (methacryloyloxy group)-containing vinyl chloride copolymer (Specific Example Compound (1)): $^1$H-NMR (DMSO-$d_6$) δ(ppm) =6.2-6.0 (C=C double bond peak), 5.8-5.6 (C=C double bond peak), 4.6-4.2 (br., m), 4.2-4.0 (m), 3.9-3.1 (m), 3.1-3.0 (br., s), 2.7-2.65 (br., s), 2.60-2.0 (m), 2.0-0.7 (br., m).

The solid component of the resin solution obtained by the above steps constituted 31.0 percent. Within one day of preparing the resin solution, the weight average molecular weight (Mw) and number average molecular weight (Mn) of the radiation-curable group-containing vinyl chloride copolymer contained in the solution were obtained by the methods set forth further below as Mw=51,000 and Mn=29,000. The glass transition temperature (Tg), sulfate group concentration, and methacryloyloxy group concentration of the radiation-curable functional group-containing vinyl chloride copolymer (Specific Example Compound (1)) were measured by the methods set forth further below as Tg=64° C., sulfate group concentration=70 mmol/kg, and methacryloyloxy group concentration=360 mmol/kg.

Preparation Example 1-2

With the exception that 2-(2-isocyanate ethyloxy)ethyl methacrylate (Karenz_MOI-EG made by Showa Denko K.K.) was employed instead of 2-methacryloyloxyethyl isocyanate in the radiation-curable group-introducing reaction of Preparation Example 1-1, a resin solution containing a radiation-curable functional group-containing vinyl chloride copolymer (Specific Example Compound (2)) was obtained by the same method as in Preparation Example 1-1. $^1$H-NMR data and assignments are given below for the radiation-curable function group-containing vinyl chloride copolymer obtained.

$^1$H-NMR (DMSO-$d_6$) δ(ppm)=6.2-6.0 (C=C double bond peak), 5.8-5.6 (C=C double bond peak), 4.6-4.2 (br., m), 4.2-4.0 (br., m), 3.9-3.1 (br., m), 3.1-3.0 (br., s), 2.7-2.65 (br., s), 2.60-2.0 (m), 2.0-0.7 (br., m).

Measurement of the average molecular weight, Tg, sulfate group concentration, and radiation-curable functional group concentration conducted in the same manner as in Preparation Example 1-1 yielded the results indicated in Table 1.

Preparation Example 1-3

With the exception that 2-acryloyloxyethyl isocyanate (Karenz_AOI made by Showa Denko K.K.) was employed instead of 2-methacryloyloxyethyl isocyanate in the radiation-curable group-introducing reaction of Preparation Example 1-1, a resin solution containing a radiation-curable functional group-containing vinyl chloride copolymer (Specific Example Compound (3)) was obtained by the same method as in Preparation Example 1-1. $^1$H-NMR data and assignments are given below for the radiation-curable function group-containing vinyl chloride copolymer obtained.

$^1$H-NMR (DMSO-$d_6$) δ(ppm)=6.2-6.0 (C=C double bond peak), 5.8-5.6 (C=C double bond peak), 4.6-4.2 (br., m), 4.2-4.0 (br., m), 3.9-3.1 (m), 3.1-3.0 (br., s), 2.7-2.65 (br., s), 2.60-2.0 (m), 2.0-0.7 (br., m).

Measurement of the average molecular weight, Tg, sulfate group concentration, and radiation-curable functional group concentration conducted in the same manner as in Preparation Example 1-1 yielded the results indicated in Table 1.

Preparation Example 1-4

With the exception that 1,1-bis(acryloyloxymethyl)ethyl isocyanate (Karenz_BEI made by Showa Denko K.K.) was employed instead of 2-methacryloyloxyethyl isocyanate in the radiation-curable group-introducing reaction of Preparation Example 1-1, a resin solution containing a radiation-curable functional group-containing vinyl chloride copolymer (Specific Example Compound (4)) was obtained by the same method as in Preparation Example 1-1. H$^1$-NMR data and assignments are given below for the radiation-curable function group-containing vinyl chloride copolymer obtained.

$^1$H-NMR (DMSO-$d_6$) δ(ppm)=6.2-6.0 (C=C double bond peak), 5.8-5.6 (C=C double bond peak), 4.6-4.2 (br., m), 4.2-4.0 (br., m), 3.9-3.1 (m), 3.1-3.0 (br., s), 2.7-2.65 (br., s), 2.60-2.0 (m), 2.0-0.7 (br., m).

Measurement of the average molecular weight, Tg, sulfate group concentration, and radiation-curable functional group concentration conducted in the same manner as in Preparation Example 1-1 yielded the results indicated in Table 1.

Preparation Example 1-5

With the exception that 2-hydroxypropyl acrylate was employed instead of 2-hydroxypropyl methacrylate in the polymerization of the vinyl chloride copolymer of Preparation Example 1-1, a resin solution containing a radiation-curable functional group-containing vinyl chloride copolymer (Specific Example Compound (5)) was obtained by the same method as in Preparation Example 1-1. $^1$H NMR data and assignments are given below for the radiation-curable function group-containing vinyl chloride copolymer obtained.

$^1$H-NMR (DMSO-$d_6$) δ(ppm)=6.2-6.0 (C=C double bond peak), 5.8-5.6 (C=C double bond peak), 4.6-4.2 (br., m), 4.2-4.0 (br., m), 3.9-3.1 (m), 3.1-3.0 (br., s), 2.7-2.65 (br., s), 2.60-2.0 (m), 2.0-0.7 (br., m).

Measurement of the average molecular weight, Tg, sulfate group concentration, and radiation-curable functional group concentration conducted in the same manner as in Preparation Example 1-1 yielded the results indicated in Table 1.

Preparation Example 1-6

With the exception that 2-hydroxyethyl methacrylate was employed instead of 2-hydroxypropyl methacrylate in the polymerization of the vinyl chloride copolymer of Preparation Example 1-1, a resin solution containing a radiation-curable functional group-containing vinyl chloride copolymer (Specific Example Compound (6)) was obtained by the same method as in Preparation Example 1-1. H$^1$ NMR data and assignments are given below for the radiation-curable function group-containing vinyl chloride copolymer obtained.

$^1$H-NMR (DMSO-$d_6$) δ(ppm)=6.2-6.0 (C=C double bond peak), 5.8-5.6 (C=C double bond peak), 4.6-4.2 (br., m), 4.2-4.0 (br., m), 3.9-3.1 (m), 3.1-3.0 (br., s), 2.7-2.65 (br., s), 2.60-2.0 (m), 2.0-0.7 (br., m).

Measurement of the average molecular weight, Tg, sulfate group concentration, and radiation-curable functional group concentration conducted in the same manner as in Preparation Example 1-1 yielded the results indicated in Table 1.

Preparation Example 1-7

With the exception that no 2-hydroxypropyl methacrylate was employed in the polymerization of the vinyl chloride copolymer of Preparation Example 1-1, a resin solution containing a radiation-curable functional group-containing vinyl chloride copolymer (Specific Example Compound (7)) was obtained by the same method as in Preparation Example 1-1. $^1$H NMR data and assignments are given below for the radiation-curable function group-containing vinyl chloride copolymer obtained.

$^1$H-NMR (DMSO-$d_6$) δ(ppm)=6.2-6.0 (C=C double bond peak), 5.8-5.6 (C=C double bond peak), 4.6-4.2 (br., m), 4.2-4.0 (m), 3.9-3.1 (m), 3.1-3.0 (br., s), 2.7-2.65 (br., s), 2.60-2.0 (m), 2.0-0.7 (br., m).

Measurement of the average molecular weight, Tg, sulfate group concentration, and radiation-curable functional group concentration conducted in the same manner as in Preparation Example 1-1 yielded the results indicated in Table 1.

Preparation Example 1-8

With the exceptions that no 2-hydroxypropyl methacrylate was employed in the polymerization of the vinyl chloride copolymer of Preparation Example 1-1, and that 2-acryloyloxyethyl isocyanate (Karenz_AOI made by Showa Denko) was employed instead of 2-methacryloyloxyethyl isocyanate in the reaction to introduce a radiation-curable functional group, a resin solution containing a radiation-curable functional group-containing vinyl chloride copolymer (Specific Example Compound (8)) was obtained by the same method as in Preparation Example 1-1. $^1$H NMR data and assignments are given below for the radiation-curable function group-containing vinyl chloride copolymer obtained.

$^1$H-NMR (DMSO-$d_6$) δ(ppm)=6.2-6.0 (C=C double bond peak), 5.8-5.6 (C=C double bond peak), 4.6-4.2 (br., m), 4.2-4.0 (br., m), 3.9-3.1 (m), 3.1-3.0 (br., s), 2.7-2.65 (br., s), 2.60-2.0 (m), 2.0-0.7 (br., m).

Measurement of the average molecular weight, Tg, sulfate group concentration, and radiation-curable functional group concentration conducted in the same manner as in Preparation Example 1-1 yielded the results indicated in Table 1.

Preparation Example 1-9

With the exception that a pyridine salt of 2-acrylamide-2-methylpropane sulfonic acid was employed instead of allyl glycidyl ether in the polymerization of the vinyl chloride copolymer of Preparation Example 1-1, a resin solution containing a radiation-curable functional group-containing vinyl chloride copolymer (Specific Example Compound (9)) was obtained by the same method as in Preparation Example 1-1. $^1$H NMR data and assignments are given below for the radiation-curable function group-containing vinyl chloride copolymer obtained.

$^1$H-NMR (DMSO-$d_6$) δ(ppm)=9.0-7.0 (br., m), 6.2-6.0 (C=C double bond peak), 5.8-5.6 (C=C double bond peak), 4.6-4.2 (br., m), 4.2-4.0 (br., m), 3.9-3.1 (m), 3.1-3.0 (br., s), 3.0-2.85 (br., m), 2.7-2.65 (br., s), 2.60-2.0 (m), 2.0-0.7 (br., m).

Measurement of the average molecular weight, Tg, sulfonate group concentration, and radiation-curable functional group concentration conducted in the same manner as in Preparation Example 1-1 yielded the results indicated in Table 1.

Preparation Example 1-10

With the exception that 2-acrylamide-2-methylpropane sulfonic acid tetrabutyl ammonium salt was employed instead of allyl glycidyl ether in the polymerization of the vinyl chloride copolymer of Preparation Example 1-1, a resin solution containing a radiation-curable functional group-containing vinyl chloride copolymer (Specific Example Compound (10)) was obtained by the same method as in Preparation Example 1-1. $^1$H NMR data and assignments are given below for the radiation-curable function group-containing vinyl chloride copolymer obtained.

$^1$H-NMR (DMSO-$d_6$) δ(ppm)=6.2-6.0 (C=C double bond peak), 5.8-5.6 (C=C double bond peak), 4.6-4.2 (br., m), 4.2-4.0 (br., m), 3.9-3.1 (br., m), 3.1-3.0 (br., s), 3.0-2.85 (br., m), 2.7-2.65 (br., s), 2.60-2.0 (m), 2.0-0.7 (br., m).

Measurement of the average molecular weight, Tg, sulfonate group concentration, and radiation-curable functional group concentration conducted in the same manner as in Preparation Example 1-1 yielded the results indicated in Table 1.

Preparation Example 1-11

With the exception that no 1,4-benzoquinone was added in the polymerization of the vinyl chloride copolymer of Preparation Example 1-1, a resin solution containing a radiation-curable functional group-containing vinyl chloride copolymer (Specific Example Compound (1)) was obtained by the same method as in Preparation Example 1-1. The average molecular weight, Tg, sulfate group concentration, and radiation-curable functional group concentration were measured in the same manner as in Preparation Example 1-1, and measurement values identical to those in Preparation Example 1-1 were obtained.

Comparative Preparation Example 1-1

Synthesis of the Radiation-Curable Vinyl Chloride Copolymer Described in Japanese Unexamined Patent Publication (KOKAI) No. 2004-352804

In accordance with the method described in paragraphs [0040] and [0041] in Japanese Unexamined Patent Publication (KOKAI) No. 2004-352804, the resin of Preparation Example 1 (a radiation-curable vinyl chloride copolymer) in Japanese Unexamined Patent Publication (KOKAI) No. 2004-352804 was obtained. Measurement of the radiation-curable functional group concentration conducted in the same manner as in Preparation Example 1-1 yielded the results indicated in Table 1.

<Methods of Evaluating the Radiation-Curable Vinyl Chloride Copolymers>

(1) Measurement of the Average Molecular Weight

The average molecular weight (Mw) of the radiation-curable functional group-containing vinyl chloride copolymers contained in the various resin solutions of the preparation examples and comparative preparation example was obtained by standard polystyrene conversion by gel permeation chromatography (GPC) with DMF solvent containing 0.3 percent lithium bromide.

(2) Sulfuric Acid (Salt) Group Concentration and Sulfonic Acid (Salt) Group Concentration The quantity of elemental sulfur was quantified from the area of the elemental sulfur (S) peak by fluorescence X-ray analysis and converted to the quantity of elemental sulfur per kilogram of radiation-curable functional group-containing vinyl chloride copolymer. The sulfuric acid (salt) group or sulfonic acid (salt) group concentration of the radiation-curable functional group-containing vinyl chloride copolymer was then calculated.

(3) Measurement of the Glass Transition Temperature (Tg)

Measurement was conducted by the viscoelasticity method with a Rheovibron made by Toyo Baldwin.

(4) Content of Radiation-Curable Functional Groups in the Copolymer

This was calculated based on the NMR integration ratio.

TABLE 1

| | Weight average molecular weight Mw | Tg (° C.) | Concentration of sulfate or sulfonate group (mmol/kg) | Concentration of radiation-curable functional group (mmol/kg) |
|---|---|---|---|---|
| Preparation Example 1-1 | 51500 | 64 | 70 | 360 |
| Preparation Example 1-2 | 52000 | 64 | 70 | 360 |
| Preparation Example 1-3 | 51300 | 66 | 70 | 360 |
| Preparation Example 1-4 | 52000 | 63 | 70 | 720 |
| Preparation Example 1-5 | 53000 | 62 | 70 | 360 |
| Preparation Example 1-6 | 53000 | 62 | 70 | 360 |
| Preparation Example 1-7 | 52000 | 61 | 70 | 360 |
| Preparation Example 1-8 | 52000 | 60 | 70 | 360 |
| Preparation Example 1-9 | 53000 | 68 | 350 | 360 |
| Preparation Example 1-10 | 53000 | 68 | 350 | 360 |
| Preparation Example 1-11 | 51500 | 65 | 70 | 360 |
| Comprative Preparation Example 1-1 | — | — | — | 1283 |

<Method of Evaluating the Resin Solution (Radiation-Curable Composition)>
(1) Evaluation of Radiation Curability The resin solutions obtained in the preparation examples and comparative preparation example were diluted to a solid component concentration of about 20 percent to obtain sample solutions. Each sample solution was coated with a blade (300 μm) on an aramid base and dried for two weeks at room temperature to obtain a coating film 30 to 50 μm in thickness.

Next, an electron beam irradiating apparatus was used to irradiate the coating film three times at an intensity of 10 kG each time, totaling 30 kG.

The film that had been irradiated with the electron beam was then immersed in 100 mL of tetrahydrofuran (THF) and extracted for two hours at 60° C. Following extraction, the film was washed with 100 mL of THF and dried for three hours at 140° C. under a vacuum. Next, the weight of the gel was adopted as the weight of the portion remaining following extraction (and drying) (weight of gel portion/weight of coating film prior to extraction); the value of this portion multiplied by 100 is given as the gelling rate in Table 2. The higher the gelling rate, the stronger the coating, indicating greater progression of radiation curing.

(2) Evaluation of Long-Term Storage Stability

Each of the resin solutions obtained in the preparation examples was stored under sealed conditions at 23° C. and the number of days elapsing until a change in molecular weight as measured by GPC appeared was counted. The results are given in Table 3.

TABLE 2

| | Curability (Gelling rate) |
|---|---|
| Preparation Example 1-1 | 85% |
| Preparation Example 1-2 | 90% |
| Preparation Example 1-3 | 90% |
| Preparation Example 1-4 | 95% |
| Preparation Example 1-5 | 85% |
| Preparation Example 1-6 | 85% |
| Preparation Example 1-7 | 80% |
| Preparation Example 1-8 | 80% |
| Preparation Example 1-9 | 75% |
| Preparation Example 1-10 | 75% |
| Preparation Example 1-11 | 90% |
| Comprative Preparation Example 1-1 | 65% |

TABLE 3

| | Storage stability |
|---|---|
| Preparation Example 1-1 | 250 days or more |
| Preparation Example 1-2 | 250 days or more |
| Preparation Example 1-3 | 250 days or more |
| Preparation Example 1-4 | 250 days or more |
| Preparation Example 1-5 | 250 days or more |
| Preparation Example 1-6 | 250 days or more |
| Preparation Example 1-7 | 250 days or more |
| Preparation Example 1-8 | 250 days or more |
| Preparation Example 1-9 | 250 days or more |
| Preparation Example 1-10 | 250 days or more |
| Preparation Example 1-11 | 14 days |

<Evaluation Results>

As indicated in Table 2, the resin solutions of Preparation Examples 1-1 to 1-11 exhibited greater curability than the resin solutions of Comparative Preparation Example 1-1. Based on these results, it was possible to determine that the radiation-curable vinyl chloride copolymer comprising the structural unit denoted by formula (1) was highly curable.

Based on the results in Table 3, it was possible to determine that resin solutions (Preparation Examples 1-1 to 1-10) containing both a radiation-curable vinyl chloride copolymer and a benzoquinone compound exhibited good stability over time and had good long-term storage stability. Normally, the addition of a component capable of enhancing long-term storage stability reduces curability, but as shown in Table 2, in Preparation Examples 1-1 to 1-10, the curability of the cured film obtained by irradiation with radiation was good with high gelling rate, indicating that the use of a benzoquinone compound with a radiation-curable vinyl chloride copolymer increased the storage stability without compromising curability.

2. Preparation Examples of Radiation-Curable Polyurethane Resin Solutions

Preparation Example 2-1

To a flask were charged 52.87 g (concentration 355.32 mmole/kg) of 4,4'-(propane-2,2-diyl)diphenol methyloxylane adduct (BPX-1000 made by Adeka, weight average molecular weight 1,000), 6.35 g of glycerol methacrylate (Bremmer GLM made by NOF Corporation), 12.48 g of dimethylol tricyclodecane (TCDM made by OXEA) as a chain-extending agent, 1.70 g of sulfonic acid (salt) group-containing diol compound (Example Compound (S-72)) as a polar-group incorporating component, 101.36 g of cyclohexanone as a polymerization solvent, and 0.232 g of p-methoxyphenol as compound C. Next, a solution of 42.66 g of methylene bis(4,1-phenylene)=diisocyanate (MDI) (Millionate MT made by Nippon Polyurethane Industry Co., Ltd.) and 52.73 g of cyclohexanone was added dropwise over 15 minutes. A polymerization catalyst in the form of 0.348 g of di-n-butyltin laurate was added, the temperature was raised to 80° C., and the mixture was stirred for 3 hours. When the reaction had ended, 116.69 g of cyclohexanone was added, yielding a polyurethane resin solution. After synthesizing the urethane, to the polyurethane resin solution obtained was added 100 ppm of p-benzoquinone relative to the polyurethane solid component as component D.

The solid component of the polyurethane resin solution obtained by the above steps was 30 percent. Within one day of preparing the above polyurethane resin solution, the weight average molecular weight (Mw) and number average molecular weight (Mn) of the polyurethane resin contained in the solution were measured by the method described further below, revealing Mw=38,000 and Mn=24,000. Measurement by the method described further below of the sulfonic acid (salt) group content of the polyurethane resin revealed 69.55 mmole/kg. No residual monomer was detected by GPC, so the content of radiation-curable functional groups was calculated to be 355.32 mmole/kg from the charge ratio.

Preparation Example 2-2

To a flask were charged 57.50 g of 4,4'-(propane-2,2-diyl) diphenol methyloxylane adduct (BPX-1000 made by Adeka, weight average molecular weight 1,000) as a chain-extending agent, 6.50 g of glycerol methacrylate (Bremmer GLM made by NOF Corporation) (concentration 355.44 mmole/kg), 10.50 g of methylol tricyclodecane (TCDM made by OXEA), 3.40 g of sulfonic acid (salt) group-containing diol compound (Example Compound (S-31)) as a polar-group incorporating component, 107.66 g of cyclohexanone as a polymerization solvent, and 0.240 g of p-methoxyphenol as compound C. Next, a solution of 42.21 g of methylene bis(4,1-phenylene) =diisocyanate (MDI) (Millionate MT made by Nippon Polyurethane Industry Co., Ltd.) and 51.47 g of cyclohexanone was added dropwise over 15 minutes. A polymerization catalyst in the form of 0.361 g of di-n-butyltin laurate was added, the temperature was raised to 80° C., and the mixture was stirred for 3 hours. When the reaction had ended, 121.28 g of cyclohexanone was added, yielding a polyurethane resin solution. After synthesizing the urethane, to the polyurethane resin solution obtained was added 50 ppm of 4-hydroxy-2,2, 6,6-tetramethylpiperidine-N-oxyl (4-OH-TEMPO) relative to the polyurethane solid component as component D.

The solid component of the polyurethane resin solution obtained by the above steps was 30 percent. Measurement of the weight average molecular weight (Mw), number average molecular weight (Mn), and sulfonic acid (salt) group content of the polyurethane resin contained in the solution by the methods described further below revealed Mw=36,000, Mn=24,000, and a sulfonic acid (salt) group content of 69.66 mmole/kg. No residual monomer was detected by GPC, so the content of radiation-curable functional groups was calculated to be 355.44 mmole/kg from the charge ratio.

Preparation Examples 2-3 to 2-6

With the exceptions that the sulfonic acid (salt) group-containing diol, component C, and component D employed were changed as indicated in Table 4, polyurethane resin solutions were obtained by the same method as in Preparation Example 2-2. In Preparation Examples 2-3 to 2-6, no residual monomer was detected by GPC, so the content of radiation-curable functional groups was calculated to be 355.32 mmole/kg from the charge ratio. The sulfonic acid (salt) group content of the polyurethane resins obtained in Preparation Examples 2-3 to 2-6 as measured by the method described further below was 69.55 mmole/kg.

Comparative Preparation Example 2-1

With the exception that no 4-hydroxy-2,2,6,6-tetramethylpiperidine-N-oxyl (4-OH-TEMPO) (component D) was added to the polyurethane resin solution obtained following urethane synthesis, a polyurethane resin solution was obtained by the same method as in Preparation Example 2-2. The results of measurement by the method set forth further below of the weight average molecular weight (Mw) of the polyurethane resin in the polyurethane resin solution obtained are given in Table 4.

Comparative Preparation Example 2-2

With the exceptions that urethane synthesis was conducted in the presence of benzoquinone (component D) instead of p-methoxyphenol (component C) and no component C or D was added following urethane synthesis, a polyurethane resin solution was obtained by the same method as in Preparation Example 2-2. The results of measurement by the method set forth further below of the weight average molecular weight (Mw) of the polyurethane resin in the polyurethane resin solution obtained are given in Table 4.

Comparative Preparation Example 2-3

With the exception that the quantity of benzoquinone was increased to ten times the original quantity, a polyurethane resin solution was obtained by the same method as in Comparative Preparation Example 2-2. The result of measurement by the method set forth further below of the weight average molecular weight (Mw) of the polyurethane resin in the polyurethane resin solution obtained is given in Table 4.

Evaluation Methods
(1) Evaluation of Storage Stability

Each of the polyurethane resin solutions obtained in the preparation examples and comparative preparation examples was stored under sealed conditions at 53° C. and the number of days elapsing until a change in molecular weight appeared as measured by GPC was counted.

(2) Measurement of Average Molecular Weight, Evaluation of Sulfonic Acid (Salt) Group Concentration and Radiation-Curability Measurement and evaluation were conducted by the same methods as in evaluation of the radiation-curable vinyl chloride copolymer set forth above.

TABLE 4

| | Polyol compound | | | Component added at polyurethane synthesis | |
|---|---|---|---|---|---|
| | Polar-group incorporating component | Chain-extending agent | Isocyanate compound | (Concentration in the parenthesis is the concentration added relative to polyurethane solid component.) | |
| Preparation Ex. 1 | Ex. Compound (S-72) | (1) 4,4'-(propane-2,2-diyl)diphenol methyloxylane adduct (2) Glycerol methacrylate (3) Dimethylol tricyclodecane | MDI | p-methoxyphenol (2000 ppm) | |
| Preparation Ex. 2 | Ex. Compound (S-31) | (1) 4,4'-(propane-2,2-diyl)diphenol methyloxylane adduct (2) Glycerol methacrylate (3) Dimethylol tricyclodecane | MDI | p-methoxyphenol (2000 ppm) | |
| Preparation Ex. 3 | Ex. Compound (S-31) | (1) 4,4'-(propane-2,2-diyl)diphenol methyloxylane adduct (2) Glycerol methacrylate (3) Dimethylol tricyclodecane | MDI | p-methoxyphenol (2000 ppm) | |
| Preparation Ex. 4 | Ex. Compound (S-31) | (1) 4,4'-(propane-2,2-diyl)diphenol methyloxylane adduct (2) Glycerol methacrylate (3) Dimethylol tricyclodecane | MDI | Polyphenol[note] (2000 ppm) | |
| Preparation Ex. 5 | Ex. Compound (S-31) | (1) 4,4'-(propane-2,2-diyl)diphenol methyloxylane adduct (2) Glycerol methacrylate (3) Dimethylol tricyclodecane | MDI | Hydroquinone (500 ppm) | |
| Preparation Ex. 6 | Ex. Compound (S-31) | (1) 4,4'-(propane-2,2-diyl)diphenol methyloxylane adduct (2) Glycerol methacrylate (3) Dimethylol tricyclodecane | MDI | 2,6-di-t-butyl-4-hydroxytoluene (5000 ppm) | |
| Preparation Comp. Ex. 1 | Ex. Compound (S-31) | (1) 4,4'-(propane-2,2-diyl)diphenol methyloxylane adduct (2) Glycerol methacrylate (3) Dimethylol tricyclodecane | MDI | p-methoxyphenol (2000 ppm) | |
| Preparation Comp. Ex. 2 | Ex. Compound (S-31) | (1) 4,4'-(propane-2,2-diyl)diphenol methyloxylane adduct (2) Glycerol methacrylate (3) Dimethylol tricyclodecane | MDI | Benzoquinone (200 ppm) | |
| Preparation Comp. Ex. 3 | Ex. Compound (S-31) | (1) 4,4'-(propane-2,2-diyl)diphenol methyloxylane adduct (2) Glycerol methacrylate (3) Dimethylol tricyclodecane | MDI | Benzoquinone (2000 ppm) | |

| | Component added following polyurethane synthesis (Concentration in the parenthesis is the concentration added relative to polyurethane solid component.) | Polyurethane evaluation results | | |
|---|---|---|---|---|
| | | Weight average molecular weight (Mw) | Stability over time | Curability (gelling rate) |
| Preparation Ex. 1 | Benzoquinone (100 ppm) | 38,000 | 250 days or more | 80% |
| Preparation Ex. 2 | 4-hydroxy-2,2,6,6-tetramethylpiperidine-N-oxyl (50 ppm) | 36,000 | 250 days or more | 85% |
| Preparation Ex. 3 | Nitrobenzene (30 ppm) | 36,000 | 250 days or more | 80% |
| Preparation Ex. 4 | 2,2,6,6-tetramethylpiperidine-N-oxyl (100 ppm) | 35,000 | 250 days or more | 85% |
| Preparation Ex. 5 | (1) Phenothiazine (1000 ppm) (2) Hydroquinone (1000 ppm) | 34,000 | 185 days | 90% |
| Preparation Ex. 6 | nitromethane (200 ppm) | 35,000 | 250 days or more | 80% |
| Preparation Comp. Ex. 1 | None | 36,000 | 7 days | 75% |
| Preparation Comp. Ex. 2 | None | 33,000 | 3 days | 75% |

TABLE 4-continued

| | | | | |
|---|---|---|---|---|
| Preparation Comp. Ex. 3 | None | 36,000 | 250 days or more | 5% |

*note)*Polyphenol: Irgacure 1010

Evaluation Results

As shown in Table 4, although the curability was good in Comparative Preparation Examples 2-1 and 2-2 in which either component C or D was employed alone, the stability over time dropped markedly relative to the preparation examples. In Comparative Preparation Example 2-3, in which the quantity of component D was increased 10-fold relative to that in Comparative Preparation Example 2-2, the stability over time was enhanced, but the gelling rate of the cured film obtained by irradiation with radiation was low. Based on these results, the addition of a large quantity of component D to increase storage stability was found to compromise curability.

By contrast, in Preparation Examples 2-1 to 2-6, in which components C and D were employed in combination, the polyurethane resin solutions exhibited good stability over time. As exhibited by Comparative Preparation Example 2-3, curability normally decreases when a component is added to increase the long-term storage stability. However, in Preparation Examples 2-1 to 2-6, the gelling rates of the cured films obtained by irradiation with radiation were high and curability was good.

The above results indicate that the combined use of components C and D increased the storage stability without compromising the curability of the radiation-curable polyurethane resin.

3. Preparation Examples of Organic Polymer Particles (Preparation of Polymer Particle Y-1)

To a five-liter vessel were added 97 parts of styrene, 3 parts of methacrylic acid, 0.5 part of α-methylstyrene dimer, 5 parts of t-dodecylmercaptan, 0.8 part of sodium dodecylbenzene sulfonate, 0.3 part of potassium persulfate, and 250 parts of water. The temperature was raised to 80° C. while stirring the mixture under a nitrogen gas atmosphere, and polymerization was conducted over 7 hours to prepare seed particles. The average primary particle diameter (D50) of the seed particles that were prepared was 0.16 μm and the particle size distribution value (D25/D75) was 1.07.

A 1.2 part quantity of sodium dodecylbenzene sulfonate, 1.0 part of polyoxyethylene-1-(acryloxymethyl)alkylether sulfuric acid ester ammonium salt, 0.6 part of potassium persulfate, 600 parts of water, and 125 parts of divinylbenzene (commercial product, 55 percent purity, additional component in the form of monofunctional vinyl monomer) were admixed per 10 parts of the seed particles prepared (converted to solid component). The mixture was stirred for 15 minutes at 30° C. to cause the monomer to adsorb onto the seed particles. Next, the temperature was raised to 80° C. and polymerization was conducted over 4 hours. The product was filtered with a filter having an average pore diameter of 1.0 μm to remove foreign matter, yielding an aqueous dispersion of polymer particles.

Next, a known centrifugal separator was employed to separate and recover the polymer particles from the aqueous dispersion of polymer particles. Water was added to the polymer particles that had been recovered, the mixture was stirred, and ultrasonic dispersion was conducted to prepare an aqueous dispersion of polymer particles. The polymer particles were separated and recovered using a centrifugal separator. This operation was successively conducted three times to clean the polymer particles. The polymer particles that were recovered were dried, the water was removed, and pulverization was conducted by a known means to prepare organic polymer particles Y-1 comprised of divinylbenzene-ethylvinylbenzene-methacrylic acid-styrene copolymer with a crosslinked structure. The average primary particle diameter (D50) of the polymer particles Y-1 thus obtained was 0.31 μm and the particle size distribution value (D25/D75) was 1.03.

FIG. 1 shows a scanning electron microscope (SEM) photograph of the polymer particles Y-1 that were prepared. As shown in FIG. 1, polymer particles Y-1 were spherical particles.

(Preparation of Polymer Particles A to G)

With the exception that the type of crosslinkable monomer was changed, the organic polymer particles having a crosslinked structure comprised of the organic polymers shown in Table 5 were prepared by the same seed polymerization method as polymer particles Y-1 above. The average primary particle diameter (D50) and particle size distribution value (D25/D75) of the various organic polymer particles prepared are given in Table 5. Observation of these particles by SEM in the same manner as polymer particles Y-1 revealed them to be spherical particles.

4. Examples and Comparative Examples of Magnetic Tape

Example 1

Preparation of Backcoat Layer Coating Liquid

The carbon black, α-alumina, nitrocellulose, polyether polyester polyurethane resin, and solvent indicated below were added and the mixture was dispersed in a Dyno-Mill (dispersion medium: zirconia beads 0.5 mm in diameter).
  Carbon black (specific surface are 55 m²/g): 100 parts
  α-Alumina (average particle diameter 0.15 μm): 0.5 part
  Nitrocellulose (made by Bergerac NC): 75 parts
  Polyether polyester polyurethane resin: 23 parts
    (weight average molecular weight (Mw): 50,000; containing 65 eq./ton of polar group in form of —SO₃Na group)
  Methyl ethyl ketone: 900 parts
  Toluene: 250 parts To the dispersion prepared was added 1.0 part of polymer particles Y-1 and the particles were dispersed in a Dyno-Mill (dispersion medium: zirconia beads 0.5 mm in diameter).

The starting materials indicated below were then added and the mixture was stirred in a commercial stirrer.
  Polyester resin (Vylon 500 made by Toyobo Co., Ltd.): 2 parts
  Polyisocyanate (Coronate L made by Nippon Polyurethane Industry Co., Ltd.): 16 parts The stirred product was passed through a filter with an average pore diameter of 1.0 μm to prepare a backcoat layer coating liquid 1.

(Nonmagnetic Support)

A commercial polyethylene-2,6-naphthalate film (5.0 µm in thickness) was employed.

(Preparation of Nonmagnetic Layer Coating Liquid)

The nonmagnetic particles, carbon black, radiation-curable vinyl chloride copolymer, radiation-curable polyurethane resin, methyl ethyl ketone, and cyclohexanone indicated below were kneaded and dispersed in an open kneader.

The kneaded product that had been prepared was dispersed in a Dyno-Mill (dispersion media: zirconia beads 0.5 mm in diameter) to prepare a dispersion of nonmagnetic particles.

Nonmagnetic particles $\alpha$-$Fe_2O_3$ (acicular): 80 parts
    Specific surface area (BET method): 52 $m^2$/g
    Surface treatment agents: $Al_2O_3$, $SiO_2$
    Average major axis length: 110 nm
    pH: 9.0
    Tap density: 0.8 g/cc
    DBP oil absorption capacity: 27 to 38 g/100 g Carbon black: 20 parts
    Specific surface area (BET method): 260 $m^2$/g
    DBP oil absorption capacity: 80 mL/100 g
    pH: 7.5
    Volatile content: 1.5 percent Radiation-curable vinyl chloride copolymer synthesized in Preparation Example 1-1 (Specific Example Compound (1)): 12 parts (as solid component)

Radiation-curable polyurethane resin synthesized in Preparation Example 2-1: 7.5 parts (as solid component)

Methyl ethyl ketone: 150 parts

Cyclohexanone: 150 parts

To the dispersion thus prepared were added butyl stearate, stearic acid, methyl ethyl ketone, and cyclohexanone in the quantities indicated below, and the mixture was stirred and dispersed with an ultrasonic disperser. The stirred product was filtered through a filter with an average pore diameter of 1.0 µm to prepare a nonmagnetic layer coating liquid.

Butyl stearate: 1.5 parts
Stearic acid: 1 part
Methyl ethyl ketone: 5 parts
Cyclohexanone: 75 parts (Preparation of Magnetic Layer Coating Liquid)

The ferromagnetic metal particles, polyurethane resin PU1, polyurethane resin PU2 having the same molecular structure as polyurethane resin PU1, and polyvinyl chloride resin indicated below were kneaded and dispersed in an open kneader using methyl ethyl ketone and cyclohexanone. To the kneaded product that had been prepared were added the $\alpha$-alumina and carbon black indicated below and the mixture was dispersed in a Dyno-Mill (dispersion medium: zirconia beads 0.5 mm in diameter) to prepare a dispersion of ferromagnetic metal particles.

Ferromagnetic metal particles (acicular): 100 parts
    Composition: Fe/Co=100/40
    Coercivity Hc: 186 kA/m (2350 Oe)
    Specific surface area (BET method): 75 $m^2$/g
    Surface treatment agents: $Al_2O_3$, $SiO_2$, $Y_2O_3$
    Average major axis length: 35 nm
    Average acicular ratio: 3.6
    Saturation magnetization as: 106 A·$m^2$/kg (106 emu/g)

Polyurethane resin PU1 (weight average molecular weight (Mw): 170,000): 6 parts (polyester polyol/diphenylmethane diisocyanate, containing polar group —$SO_3Na$: 70 eq/ton)

Polyurethane resin PU2 (weight average molecular weight (Mw): 80,000): 6 parts (polyester polyol/diphenylmethane diisocyanate, containing polar group —$SO_3Na$: 70 eq/ton)

Polyvinyl chloride resin (MR110 made by Zeon Corp.): 9 parts $\alpha$-Alumina: Mohs' hardness 9 (average particle diameter: 0.1 µm): 3 parts Carbon black (specific surface area: 23 $m^2$/g): 0.3 part Methyl ethyl ketone: 150 parts Cyclohexanone: 150 parts To the dispersion prepared above were added the polyisocyanate, butyl stearate, stearic acid, methyl ethyl ketone, and cyclohexanone indicated below. The mixture was stirred and then dispersed with an ultrasonic disperser. The stirred product was passed through a filter with an average pore diameter of 1.0 µm to prepare a magnetic layer coating liquid. The solid component concentration of the magnetic layer coating liquid was 15.0 weight percent.

Polyisocyanate (Coronate L made by Nippon Polyurethane Industry Co., Ltd.): 4 parts
Butyl stearate: 1.5 parts
Stearic acid: 0.5 part
Methyl ethyl ketone: 293 parts
Cyclohexanone: 145 parts (Preparation of Magnetic Recording Medium)

The nonmagnetic layer coating liquid prepared as set forth above was coated on a nonmagnetic support (10,000 m in length) in a quantity calculated to yield a dry film thickness of 1.0 µm, forming a coating layer. The coating layer was irradiated with radiation (a 40 kG electron beam) to prepare a nonmagnetic layer (radiation-cured layer).

The magnetic layer coating liquid prepared as set forth above was coated on the nonmagnetic layer thus prepared in a quantity calculated to yield a dry film thickness of 0.06 µm by the method described in Japanese Unexamined Patent Publication (KOKAI) No. 2003-236452.

Following application of the magnetic layer coating liquid, orientation was conducted with a cobalt magnetic having a magnetic force of 0.5 T (5000 G) and a solenoid having a magnetic force of 0.4 T (4,000 G) while the magnetic layer was still wet. Subsequently, the magnetic layer coating liquid was dried at 120° C. to prepare a magnetic layer.

Backcoat layer coating liquid 1 prepared as set forth above was coated in a quantity calculated to yield a dry film thickness of 0.5 µm on the opposite side (reverse side) of the nonmagnetic support from the magnetic layer and dried at 120° C. to prepare a backcoat layer.

The nonmagnetic support upon which the nonmagnetic layer, magnetic layer, and backcoat layer had been formed was calendered at a rate of 150 m/minute with a calender (linear pressure 300 kg/cm) comprised of seven sets of metal rolls (95° C. in temperature). Next, it was slit into the form of a tape ½ inch in width and wound onto a core. While wound on the core, the tape was thermoprocessed for 48 hours at 65° C. A magnetic recording medium in the form of a tape was thus prepared.

Example 2

With the exception that backcoat layer coating liquid 2 indicated below was employed and the backcoat layer was formed to a film thickness of 0.6 µm, a tape magnetic recording medium was prepared by the same method as in Example 1.

(Preparation of Backcoat Layer Coating Liquid 2)

A 0.5 part quantity of polymer particles A was employed instead of the 1.0 part of polymer particles Y-1 having a crosslinked structure that were employed in backcoat layer coating liquid 1 to prepare backcoat layer coating liquid 2.

Example 3

With the exception that backcoat layer coating liquid 3 indicated below was employed, a tape magnetic recording medium was prepared by the same method as in Example 1.
(Preparation of Backcoat Layer Coating Liquid 3)
A 1.5 part quantity of polymer particles B was employed instead of the 1.0 part of polymer particles Y-1 having a crosslinked structure that were employed in backcoat layer coating liquid 1 to prepare backcoat layer coating liquid 3.

Example 4

With the exception that backcoat layer coating liquid 4 indicated below was employed, a tape magnetic recording medium was prepared by the same method as in Example 1.
(Preparation of Backcoat Layer Coating Liquid 4)
A 0.2 part quantity of polymer particles C was employed instead of the 1.0 part of polymer particles Y-1 having a crosslinked structure that were employed in backcoat layer coating liquid 1 to prepare backcoat layer coating liquid 4.

Example 5

With the exception that backcoat layer coating liquid 5 indicated below was employed, a tape magnetic recording medium was prepared by the same method as in Example 1.
(Preparation of Backcoat Layer Coating Liquid 5)
A 2.0 part quantity of polymer particles D was employed instead of the 1.0 part of polymer particles Y-1 having a crosslinked structure that were employed in backcoat layer coating liquid 1 to prepare backcoat layer coating liquid 5.

Example 6

With the exception that backcoat layer coating liquid 6 indicated below was employed, a tape magnetic recording medium was prepared by the same method as in Example 1.
(Preparation of Backcoat Layer Coating Liquid 6)
A 0.3 part quantity of polymer particles E was employed instead of the 1.0 part of polymer particles Y-1 having a crosslinked structure that were employed in backcoat layer coating liquid 1 to prepare backcoat layer coating liquid 6.

Example 7

With the exception that backcoat layer coating liquid 7 indicated below was employed, a tape magnetic recording medium was prepared by the same method as in Example 1.
(Preparation of Backcoat Layer Coating Liquid 7)
A 1.2 part quantity of polymer particles F was employed instead of the 1.0 part of polymer particles Y-1 having a crosslinked structure that were employed in backcoat layer coating liquid 1 to prepare backcoat layer coating liquid 7.

Example 8

With the exception that 12 parts (as solid component) of the radiation-curable vinyl chloride copolymer (Specific Example Compound (2)) synthesized in Preparation Example 1-2 were employed as the vinyl chloride copolymer employed in the nonmagnetic layer coating liquid, a tape magnetic recording medium was prepared by the same method as in Example 1.

Example 9

With the exception that 12 parts (as solid component) of the radiation-curable vinyl chloride copolymer (Specific Example Compound (3)) synthesized in Preparation Example 1-3 were employed as the vinyl chloride copolymer employed in the nonmagnetic layer coating liquid, a tape magnetic recording medium was prepared by the same method as in Example 1.

Example 10

With the exception that 12 parts (as solid component) of the radiation-curable vinyl chloride copolymer (Specific Example Compound (4)) synthesized in Preparation Example 1-4 were employed as the vinyl chloride copolymer employed in the nonmagnetic layer coating liquid, a tape magnetic recording medium was prepared by the same method as in Example 1.

Example 11

With the exception that 12 parts (as solid component) of the radiation-curable vinyl chloride copolymer (Specific Example Compound (5)) synthesized in Preparation Example 1-5 were employed as the vinyl chloride copolymer employed in the nonmagnetic layer coating liquid, a tape magnetic recording medium was prepared by the same method as in Example 1.

Example 12

With the exception that 12 parts (as solid component) of the radiation-curable vinyl chloride copolymer (Specific Example Compound (6)) synthesized in Preparation Example 1-6 were employed as the vinyl chloride copolymer employed in the nonmagnetic layer coating liquid, a tape magnetic recording medium was prepared by the same method as in Example 1.

Example 13

With the exception that 7.5 parts (as solid component) of the radiation-curable polyurethane resin synthesized in Preparation Example 2-1 were employed as the polyurethane employed in the nonmagnetic layer coating liquid, a tape magnetic recording medium was prepared by the same method as in Example 1.

Example 14

With the exception that backcoat layer coating liquid 8 indicated below was employed, a tape magnetic recording medium was prepared by the same method as in Example 1.
(Preparation of Backcoat Layer Coating Liquid 8)
The silica sol indicated below was employed instead of the 1.0 parts of polymer particles Y-1 having a crosslinked structure employed in backcoat layer coating liquid 1 to prepare backcoat layer coating liquid 8.
(Silica Sol)
Colloidal silica: 1.5 parts (average primary particle diameter (D50)=0.05 μm, D25/D75=1.02)
Methyl ethyl ketone: 3.5 parts

Comparative Example 1

With the exceptions that backcoat layer coating liquid 9 indicated below was employed and that the nonmagnetic layer was formed by the method set forth below, a tape magnetic recording medium was prepared by the same method as in Example 1.

(Preparation of Backcoat Layer Coating Liquid 9)

Figure 2:
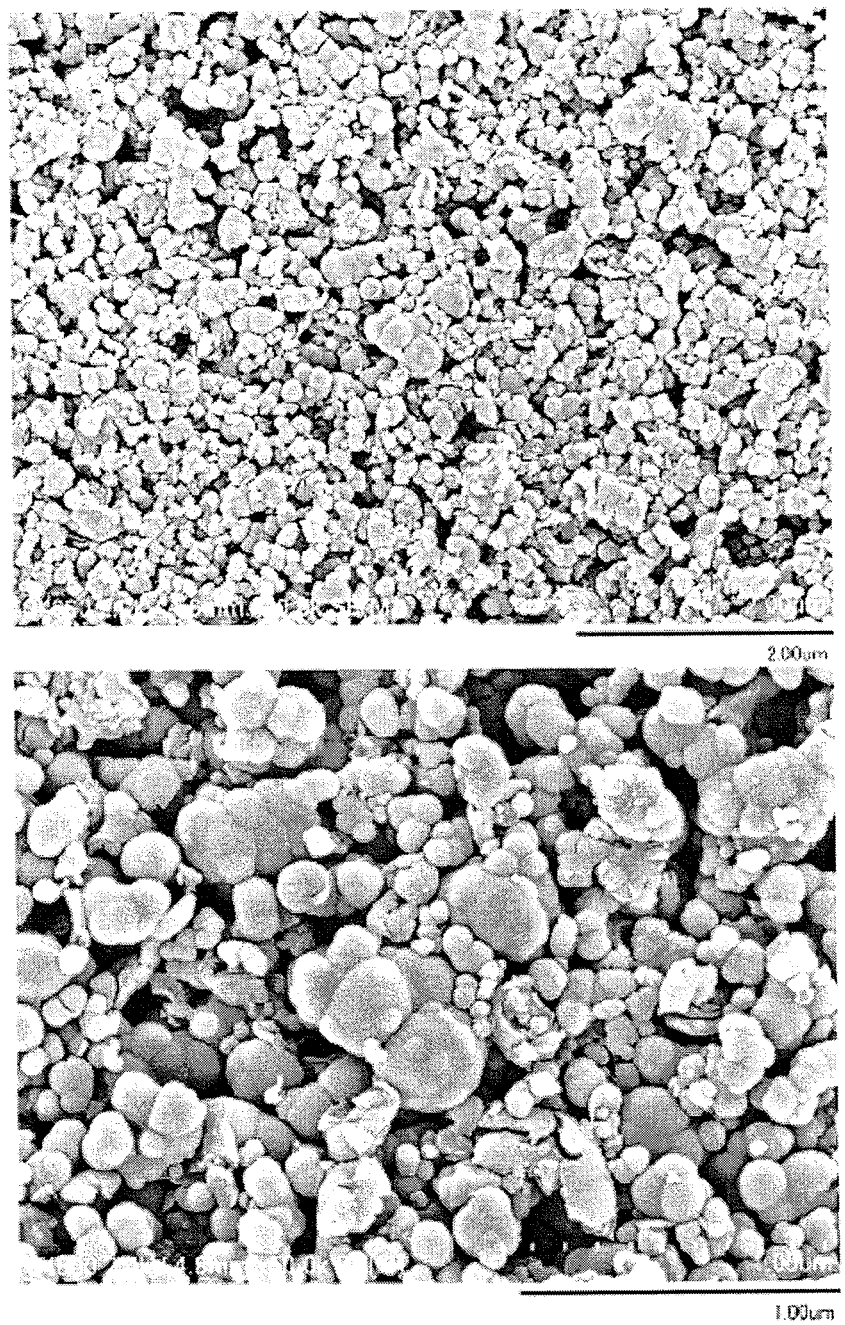
FIG. 2 is a scanning electron microscope photograph of the filler particles (carbon black) in the backcoat layer employed in Comparative Example.

Backcoat layer coating liquid 9 was prepared using 1.0 part of carbon black (specific surface area 15 m$^2$/g) instead of the 1.0 parts of polymer particles Y-1 having a crosslinked structure that were employed in backcoat layer coating liquid 1. FIG. 2 shows a scanning electron microscope (SEM) photograph of the carbon black employed. The lower portion of FIG. 2 is a partial enlargement of the upper portion of FIG. 2. A comparison with FIG. 1 reveals that the particle size distribution of the carbon black was broad and that variation in shape (an irregular shape) was present.

(Formation of Nonmagnetic Layer)

The nonmagnetic particles, carbon black, polyvinyl chloride resin, polyurethane resin, methyl ethyl ketone, and cyclohexanone indicated below were kneaded and dispersed in an open kneader.

The kneaded product that had been prepared was dispersed in a Dyno-Mill (dispersion medium: zirconia beads 0.5 mm in diameter) to prepare a dispersion of nonmagnetic particles.

Nonmagnetic particles α-Fe$_2$O$_3$ (acicular): 75 parts
    Specific surface area (BET method): 60 m$^2$/g
    Surface treatment agents: Al$_2$O$_3$, SiO$_2$
    Average major axis length: 100 nm
    pH: 9.0
Carbon black: 25 parts
    Specific surface area (BET method): 260 m$^2$/g
    DBP oil absorption capacity: 80 mL/100 g
    pH: 7.5
    Volatile content: 1.5 percent
Polyvinyl chloride resin (MR104 made by Zeon Corporation): 12 parts
Polyurethane resin (UR8200 made by Toyobo Co., Ltd.): 7 parts
Methyl ethyl ketone: 150 parts
Cyclohexanone: 150 parts To the above dispersion that had been prepared were added the polyisocyanate, butyl stearate, stearic acid, methyl ethyl ketone, and cyclohexanone indicated below. The mixture was stirred and dispersed using an ultrasonic disperser.

Polyisocyanate (Coronate L made by Nippon Polyurethane Industry Co., Ltd.): 2 parts
Butyl stearate: 1.5 parts
Stearic acid: 1 part
Methyl ethyl ketone: 5 parts
Cyclohexanone: 75 parts The stirred product was passed through a filter with an average pore diameter of 1.0 μm to prepare a nonmagnetic layer coating liquid.

This nonmagnetic layer coating liquid was coated in a quantity calculated to yield a dry thickness of 1.0 μm, and then heat dried (heat cured) to form a nonmagnetic layer prior to applying a magnetic layer coating liquid.

Comparative Example 2

With the exception that the nonmagnetic layer was formed by the same method as in Comparative Example 1, a tape magnetic recording medium was prepared by the same method as in Example 1.

Comparative Example 3

With the exception that backcoat layer coating liquid 9 was employed and that the radiation-curable resin employed in the nonmagnetic layer coating liquid was replaced with a radiation-curable vinyl chloride copolymer (TB0246 made by Toyobo Co., Ltd.; "copolymer a" hereinafter) and a radiation-curable polyurethane resin (TB0216 made by Toyobo Co., Ltd.; "polyurethane resin b" hereinafter), a tape magnetic recording medium was prepared by the same method as in Example 1.

Comparative Example 4

With the exception that a nonmagnetic layer coating liquid identical to that in Comparative Example 3 was employed, a tape magnetic recording medium was prepared by the same method as in Example 1.

Comparative Example 5

With the exception that backcoat layer coating liquid 9 was employed, a tape magnetic recording medium was prepared by the same method as in Example 1.

Comparative Example 6

With the exceptions that backcoat layer coating liquid 9 was employed and that the radiation-curable polyurethane resin employed in the nonmagnetic layer coating liquid was replaced with polyurethane resin b, a tape magnetic recording medium was prepared by the same method as in Example 1.

Comparative Example 7

With the exception that backcoat layer coating liquid 9 was employed and that the radiation-curable vinyl chloride copolymer employed in the nonmagnetic layer coating liquid was replaced with copolymer a, a tape magnetic recording medium was prepared by the same method as in Example 1.

Comparative Example 8

With the exception that backcoat layer coating liquid 10 indicated below was employed, a tape magnetic recording medium was prepared by the same method as in Example 1.

(Preparation of Backcoat Layer Coating Liquid 10)

Instead of the 1.0 part of polymer particles Y-1 having a crosslinked structure employed in backcoat layer coating liquid 1, 1.5 parts of polymer particles G were employed to prepare backcoat layer coating liquid 10.

(Evaluation of Magnetic Recording Media)

The magnetic recording media that were prepared were evaluated with regard to the following items:

(1) Evaluation of State of Filler Particle Present in Backcoat Layer

Surfaces and cross-sections of the magnetic tapes of the Examples and Comparative Examples were observed by scanning electron microscope (SEM), and the state of the filler particle present in the backcoat layer was evaluated on the three-level scale given below. Employing a lower acceleration voltage (1 kV or lower) than the acceleration voltage normally employed in SEM observation (about 15 kV) permits better clarification of the state of the particles present. In the present Examples, an acceleration voltage of 1 kV was employed. An evaluation result of level 1 or 2 below indicated that the filler particles were present in the backcoat layer substantially as primary particles. Since carbon black and alumina were incorporated in addition to the filler particles into the backcoat layer in the magnetic tapes prepared in Examples and Comparative Examples, the filler particles were selectively extracted for evaluation from among the particles sizes and particle shapes. As a result of this observation, it was determined that the particles that formed protrusions on the surface of the backcoat layer in the magnetic tapes of the Examples were the filler particles, and that the carbon black and alumina did not form protrusions.

1: Absolutely no particles forming structures or secondary aggregates were present.

2: Two or fewer spots in which particles formed structures or secondary aggregates were present.

3: Three or more spots in which particles formed structures or secondary aggregates were present.

(2) Evaluation of the Surface Roughness and Number of Protrusions on the Backcoat Layer In the magnetic tapes of Examples and Comparative Examples, the centerline average surface roughness (Ra) and number of protrusions of equal to or higher than 100 nm in height on the surface of the backcoat layer were evaluated by the following methods. Measurement was conducted for an area of 0.1 mm$^2$ (ten areas of 0.01 mm$^2$ each were measured) with an atomic force microscope (AFM, Nanoscope 4 made by Digital Instruments). A square pyramidal SiN probe with an edge angle of 70° was employed.

(3) Evaluation of Number of Indentations in Surface of Magnetic Layer

The number of indentations with an equivalent circular radius of equal to or more than 2.0 μm and a depth of equal to or more than 60 nm was measured on the surface of the magnetic layer in the tapes of Examples and Comparative Examples that had been stored for one week in an environment with a temperature of 60° C. and 90 percent humidity. The measurement was conducted by atomic force microscope (AFM, Nanoscope 4 made by Digital Instruments) over a surface area of 0.5 mm$^2$ (50 areas of 0.01 mm$^2$ each were measured). A square pyramidal SiN probe with an edge angle of 70° was employed. In the magnetic tapes of Examples and Comparative Examples, the magnetic layer was formed as the outermost layer on the outer surface side of the magnetic tape. Thus, the state of the surface in terms of the number of indentations on the outer surface side was the state of the surface of the magnetic layer of the magnetic tape. The larger the number of indentations measured, the greater the transfer of protrusions from the surface of the backcoat layer to the magnetic layer (the greater the reverse transfer), and the greater the loss of smoothness to the surface of the magnetic layer indicated.

(4) Measurement of Displacement of the Tape Running Position

The magnetic tapes of Examples and Comparative Examples were loaded into LTO cartridges, and a laser was used to measure the vertical displacement during running on an LTO drive made by IBM. The larger the value measured, the greater the loss in running stability due to the effect of material adhering to the surface of the magnetic layer that was indicated. The greater the value measured, the more the tape weaved back and forth during running and the greater the tendency for edge damage to occur.

(5) Reproduction Output Fluctuation

The magnetic tapes of Examples and Comparative Examples were loaded into LTO cartridges, a signal was recorded using an LTO-G4 drive made by IBM, and the cartridges were stored for one week in an environment with a temperature of 60° C. and 90 percent humidity. Before and after storage, the cartridges were played back on a drive made by IBM and the output of the reproduced signal at that time was determined with an oscilloscope. A drop in the output following storage relative to the output prior to storage of equal to or less than −4 dB was evaluated as ○, −4 dB or more as X, and −6 dB or more as XX.

The results of the evaluation of the filler particles of the backcoat layers employed in Examples and Comparative Examples are given in Table 5 below.

TABLE 5

| | No. of coating liquid | Types of particle | Components of particle | D50 (μm) | D25/D75 |
|---|---|---|---|---|---|
| Filler particles employed in Examples | 1 | Crosslinked organic polymer particle Y-1 | Divinylbenzene-ethylvinylbenzene-methacrylic acid-styrene copolymer | 0.31 | 1.03 |
| | 2 | Crosslinked organic polymer particle A | Methacrylate copolymer | 0.08 | 1.00 |
| | 3 | Crosslinked organic polymer particle B | Methacrylate-thermoplastic polymer modified copolymer | 0.60 | 1.85 |
| | 4 | Crosslinked organic polymer particle C | Styrene-butadiene copolymer | 0.10 | 1.25 |
| | 5 | Crosslinked organic polymer particle D | Methacrylate copolymer | 0.22 | 1.35 |
| | 6 | Crosslinked organic polymer particle E | Methacrylate-acrylonitrile-styrene copolymer | 0.15 | 1.35 |
| | 7 | Crosslinked organic polymer particle F | Melamine-formaldehyde condensation product | 0.85 | 2.00 |
| | 8 | Inorganic particle | Silica colloidal particle | 0.05 | 1.02 |
| | 9 | Inorganic particle | Carbon black | 0.30 | 3.50 |

TABLE 5-continued

|  | No. of coating liquid | Types of particle | Components of particle | D50 (μm) | D25/D75 |
|---|---|---|---|---|---|
| Filler particles employed in Comparative Examples | 9 | Inorganic particle | Carbon black | 0.30 | 3.50 |
|  | 10 | Crosslinked organic polymer particle G | Polystyrene | 1.52 | 1.05 |

Evaluation results of magnetic tapes of Examples and Comparative Examples are given in Table 6 below.

TABLE 6

|  | Backcoat layer | | | | | Magnetic layer Number of indentations | | |
|---|---|---|---|---|---|---|---|---|
|  | No. of coating liquid | State of the particles present | Ra (nm) | Number of protrusions (protrusions/ 0.1 mm$^2$) | Nonmagnetic layer binder | | | |
|  |  |  |  |  | Vinyl chloride copolymer | Polyurethane resin | after storage (indentations/ 0.5 mm$^2$) | Reproduction output fluctuation | Displacement of tape running position |
| Ex. 1 | 1 | 1 | 13.7 | 53 | Specific Ex. compound (1) | Polyurethane resin obtained from the starting material in the form of Ex. Compound (S-72) | 2 | ○ | 20 μm |
| Ex. 2 | 2 | 1 | 14.7 | 47 | Specific Ex. compound (1) | Polyurethane resin obtained from the starting material in the form of Ex. Compound (S-72) | 1 | ○ | 85 μm |
| Ex. 3 | 3 | 1 | 15.5 | 51 | Specific Ex. compound (1) | Polyurethane resin obtained from the starting material in the form of Ex. Compound (S-72) | 5 | ○ | 25 μm |
| Ex. 4 | 4 | 1 | 13.2 | 48 | Specific Ex. compound (1) | Polyurethane resin obtained from the starting material in the form of Ex. Compound (S-72) | 1 | ○ | 50 μm |
| Ex. 5 | 5 | 1 | 12.9 | 53 | Specific Ex. compound (1) | Polyurethane resin obtained from the starting material in the form of Ex. Compound (S-72) | 1 | ○ | 15 μm |
| Ex. 6 | 6 | 1 | 12.7 | 48 | Specific Ex. compound (1) | Polyurethane resin obtained from the starting material in the form of Ex. Compound (S-72) | 1 | ○ | 30 μm |
| Ex. 7 | 7 | 2 | 12.6 | 51 | Specific Ex. compound (1) | Polyurethane resin obtained from the starting material in the form of Ex. Compound (S-72) | 10 | ○ | 8 μm |
| Ex. 8 | 1 | 2 | 12.5 | 52 | Specific Ex. compound (2) | Polyurethane resin obtained from the starting material in the form of Ex. Compound (S-72) | 1 | ○ | 36 μm |
| Ex. 9 | 1 | 1 | 13.9 | 55 | Specific Ex. compound (3) | Polyurethane resin obtained from the starting material in the form of Ex. Compound (S-72) | 2 | ○ | 25 μm |
| Ex. 10 | 1 | 1 | 15.6 | 53 | Specific Ex. compound (4) | Polyurethane resin obtained from the starting material in the form of Ex. Compound (S-72) | 5 | ○ | 37 μm |

TABLE 6-continued

| | Backcoat layer | | | Nonmagnetic layer binder | | Magnetic layer Number of indentations | | |
|---|---|---|---|---|---|---|---|---|
| No. | No. of coating liquid | State of the particles present | Ra (nm) | Number of protrusions (protrusions/ 0.1 mm$^2$) | Vinyl chloride copolymer | Polyurethane resin | after storage (indentations/ 0.5 mm$^2$) | Reproduction output fluctuation | Displacement of tape running position |
| Ex. 11 | 1 | 1 | 15.5 | 54 | Specific Ex. compound (5) | Polyurethane resin obtained from the starting material in the form of Ex. Compound (S-72) | 3 | ○ | 55 μm |
| Ex. 12 | 1 | 1 | 15.5 | 51 | Specific Ex. compound (6) | Polyurethane resin obtained from the starting material in the form of Ex. Compound (S-72) | 2 | ○ | 60 μm |
| Ex. 13 | 1 | 1 | 15.3 | 52 | Specific Ex. compound (1) | Polyurethane resin obtained from the starting material in the form of Ex. Compound (S-72) | 2 | ○ | 40 μm |
| Ex. 14 | 8 | 1 | 12.0 | 30 | Specific Ex. compound (1) | Polyurethane resin obtained from the starting material in the form of Ex. Compound (S-72) | 1 | ○ | 30 μm |
| Comp. Ex. 1 | 9 | 3 | 25.4 | 120 | MR104 made by Zeon Corp. | UR8200 made by Toyobo | 470 | X | 30 μm or more |
| Comp. Ex. 2 | 1 | 1 | 13.7 | 53 | MR104 made by Zeon Corp. | UR8200 made by Toyobo | 6 | X | 300 μm or more |
| Comp. Ex. 3 | 9 | 3 | 25.4 | 120 | Copolymer a | Polyurethane resin b | 350 | XX | 300 μm or more |
| Comp. Ex. 4 | 1 | 1 | 15.3 | 50 | Copolymer a | Polyurethane resin b | 9 | XX | 300 μm or more |
| Comp. Ex. 5 | 9 | 3 | 25.4 | 120 | Specific Ex. compound (1) | Polyurethane resin obtained from the starting material in the form of Ex. Compound (S-72) | 300 | ○ | 50 μm |
| Comp. Ex. 6 | 9 | 3 | 25.4 | 100 | Specific Ex. compound (1) | Polyurethane resin b | 340 | XX | 250 μm |
| Comp. Ex. 7 | 9 | 3 | 25.4 | 130 | Copolymer a | Polyurethane resin obtained from the starting material in the form of Ex. Compound (S-72) | 200 | XX | 300 μm |
| Comp. Ex. 8 | 10 | 1 | 27.9 | 170 | Specific Ex. compound (1) | Polyurethane resin obtained from the starting material in the form of Ex. Compound (S-72) | 130 | ○ | 40 μm |

Evaluation Results

As shown in Table 6, the organic polymer particles and inorganic colloidal particles remained present substantially in a primary particle state in the backcoat layer. Since reverse transfer was reduced in backcoat layers containing filler particles with an average primary particle diameter D50 of 0.05 to 1.0 μm in this state, the number of indentations in the surface of the magnetic layer was low even after storage at high temperature and high humidity. Further, in magnetic tapes having a nonmagnetic layer in the form of the radiation-cured layer formed of the radiation-curable vinyl chloride copolymer containing the structural unit denoted by formula (1) and the radiation-curable polyurethane resin obtained from starting materials containing the sulfonic acid (salt) group containing-polyol compound denoted by formula (2), evaluation of running stability and reproduction output fluctuation yielded good results.

By contrast, in magnetic tapes in which the nonmagnetic layer was formed by heat curing, the running stability decreased and reproduction output fluctuation increased (Comparative Examples 1 and 2). This was attributed to migration of lubricant components in the nonmagnetic layer to the magnetic layer side by interlayer mixing because the nonmagnetic layer was not a radiation-cured layer, and to seepage of large quantities of lubricant components contained in the nonmagnetic layer onto the surface of the nonmagnetic layer during heat curing. When the nonmagnetic layer was formed by heat curing, the time required was longer than for radiation curing and there was exposure to higher temperatures. Thus, an increase in the quantity of lubricant components rising up to the surface of the nonmagnetic layer prior to curing was also presumed to cause an increase in the amount of seepage of lubricant components. As a result, the increase in the quantity of precipitates on the surface of the magnetic layer was thought to reduce running stability, and lubricant components seeping out of the surface of the magnetic layer during storage were thought to cause sticking of the tape and head, resulting in an increase in reproduction output fluctuation.

The running stability dropped and the reproduction output fluctuation increased even when radiation-curable vinyl chloride copolymers and polyurethane resins differing from those employed in Examples were used (Comparative Examples 3 and 4). This was attributed to the poor curability of the vinyl chloride copolymer employed and inadequate adsorption of the polyurethane resin to the nonmagnetic powder.

In Comparative Example 6, in which the radiation-curable vinyl chloride copolymer employed in the nonmagnetic layer was identical to that of Example 1 and the like but the radiation-curable polyurethane resin differed, the drop in running stability and the increase in reproduction output fluctuation were attributed to inadequate adsorption of the polyurethane resin employed to the nonmagnetic powder, resulting in free polyurethane resin generating precipitates on the surface of the magnetic layer and sticking to the head. In Comparative Example 7, in which the radiation-curable polyurethane resin employed in the nonmagnetic layer was identical to that of Example 1 and the like but the radiation-curable vinyl chloride copolymer differed, the drop in running stability and the increase in reproduction output fluctuation were attributed to inadequate curing of the nonmagnetic layer, resulting in substantial seepage of lubricant out of the nonmagnetic layer.

The above results indicate that the present invention provides a magnetic recording medium that has a highly smooth magnetic layer surface and can be used for extended periods with high reliability.

The magnetic recording medium of the present invention is suitable as a high-capacity data backup tape.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior

What is claimed is:

1. A magnetic recording medium comprising on one surface of a nonmagnetic support a nonmagnetic layer containing a nonmagnetic powder and a binder and a magnetic layer containing a ferromagnetic powder and a binder in this order, as well as comprising a backcoat layer on the other surface of the nonmagnetic support, wherein the nonmagnetic layer is a radiation-cured layer formed by curing with radiation a radiation-curable composition, the radiation-curable composition comprises a radiation-curable vinyl chloride copolymer containing a structural unit denoted by formula (1) and a radiation-curable polyurethane resin obtained from starting materials containing a sulfonic acid group containing- or sulfonate group-containing polyol compound denoted by formula (2):

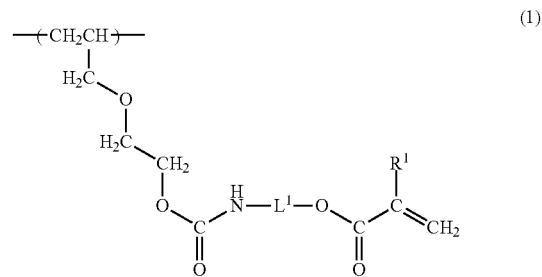

wherein, in formula (1), $R^1$ denotes a hydrogen atom or a methyl group, and $L^1$ denotes a divalent linking group denoted by formula (2a), formula (3), or formula (4):

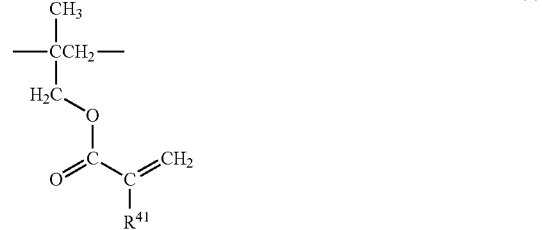

wherein, in formula (4), $R^{41}$ denotes a hydrogen atom or a methyl group;

wherein, in formula (2), X denotes a divalent linking group; each of $R^{101}$ and $R^{102}$ independently denotes an alkyl group containing at least one hydroxyl group and equal to or more than two carbon atoms or an aralkyl group containing at least one hydroxyl group and equal to or more than eight carbon atoms; and $M^1$ denotes a hydrogen atom or a cation; and the backcoat layer comprises filler particles with an average primary particle diameter, D50, ranging from 0.05 to 1.0 μm, the filler particles being selected from the group consisting of organic polymer particles and inorganic colloidal particles.

2. The magnetic recording medium according to claim 1, wherein the filler particles are present in the backcoat later as substantially primary particles.

3. The magnetic recording medium according to claim 1, wherein the particle size distribution value, D25/D75, of the filler particles is equal to or lower than 2.0.

4. The magnetic recording medium according to claim 1, wherein the inorganic colloidal particles are silica colloidal particles.

5. The magnetic recording medium according to claim 1, wherein the organic polymer particles are those comprising as a structural component at least one selected from the group consisting of acrylic, styrene, divinylbenzene, benzoguanamine, melamine, formaldehyde, butadiene, acrylonitrile, and chloroprene.

6. The magnetic recording medium according to claim 1, wherein the organic polymer particles are those obtained by conducting emulsification polymerization while inducing adsorption of a crosslinkable or polymerizable monomer to seed particles in an aqueous dispersion containing seed particles.

7. The magnetic recording medium according to claim 1, wherein the radiation-curable vinyl chloride copolymer further comprises a structural unit denoted by formula (5):

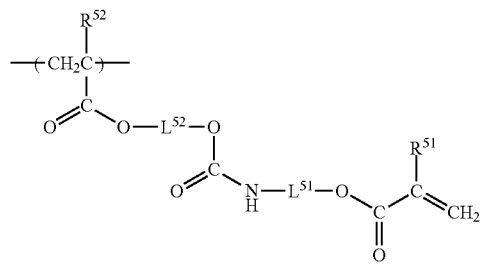

(5)

wherein, in formula (5), each of $R^{51}$ and $R^{52}$ independently denotes a hydrogen atom or a methyl group, $L^{51}$ denotes the divalent linking group denoted by the above formula (2a), formula (3), or formula (4), and $L^{52}$ denotes a divalent linking group.

8. The magnetic recording medium according to claim 1, wherein the radiation-curable vinyl chloride copolymer further comprises a cyclic ether structure.

9. The magnetic recording medium according to claim 1, wherein the radiation-curable vinyl chloride copolymer further comprises a polar group selected from the group consisting of a sulfonic acid group, a sulfonate group, a sulfuric acid group, and a sulfate group.

10. The magnetic recording medium according to claim 1, wherein the backcoat layer has a thickness ranging from 0.2 to 0.6 μm.

11. The magnetic recording medium according to claim 1, wherein the nonmagnetic layer further comprises a lubricant component.

12. The magnetic recording medium according to claim 1, wherein the lubricant component is selected from the group consisting of fatty acids and their derivatives.

\* \* \* \* \*